US012767463B2

(12) United States Patent
Holmes et al.

(10) Patent No.: US 12,767,463 B2
(45) Date of Patent: Oct. 20, 2026

(54) BULK MATERIAL DISCHARGING

(71) Applicant: Owens-Brockway Glass Container Inc., Perrysburg, OH (US)

(72) Inventors: Kirk Holmes, Perrysburg, OH (US); Steven Will, Sylvania, OH (US); Manfred Robert Romstöck, Freudenberg (DE); Guenther Josef Mlynar, Wertheim-Bettingen (DE)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 1314 days.

(21) Appl. No.: 17/492,550

(22) Filed: Oct. 1, 2021

(65) Prior Publication Data

US 2022/0106135 A1 Apr. 7, 2022

Related U.S. Application Data

(63) Continuation-in-part of application No. 17/061,302, filed on Oct. 1, 2020, now Pat. No. 11,912,608.

(51) Int. Cl.
*B65G 53/04* (2006.01)
*B65G 3/04* (2006.01)
(Continued)

(52) U.S. Cl.
CPC ............... *B65G 53/04* (2013.01); *B65G 3/04* (2013.01); *B65G 63/008* (2013.01); *B65G 65/30* (2013.01)

(58) Field of Classification Search
CPC ........ B65G 53/04; B65G 3/04; B65G 63/047; B65G 63/037; B65G 63/008; B65G 65/30;
(Continued)

(56) References Cited

U.S. PATENT DOCUMENTS 2,684,870 A 7/1954 Berg
2,903,301 A * 9/1959 Pfening .................. B65G 53/06 406/28
(Continued)

FOREIGN PATENT DOCUMENTS

CN 107555764 A 1/2018
CN 109970350 A 7/2019
(Continued)

OTHER PUBLICATIONS

European Office Action, Application No. 21 806 869.0-1017, Applicant: Owens-Brockway Glass Container Inc., Dated: Feb. 18, 2025.
(Continued)

*Primary Examiner* — Glenn F Myers

(57) ABSTRACT

A bulk material discharging system includes a transmission station including a transmitting vessel having a transmitting vessel inlet configured to receive bulk material from an outlet of a bulk material transporter, and a transmitting vessel outlet to transmit bulk material therefrom. The system also includes a transporter handling station located operatively upstream of the transmission station and including at least a portion of a transporter handler including at least one carriage with transporter couplings configured to engage corresponding carriage couplings of the bulk material transporter and configured to convey the bulk material transporter over the transmitting vessel.

35 Claims, 40 Drawing Sheets

(51) Int. Cl.
*B65G 63/00* (2006.01)
*B65G 65/30* (2006.01)

(58) Field of Classification Search
CPC ...... B65G 65/40; B65G 67/06; B65G 63/027; B65D 90/623; B65D 90/66; B65D 88/26; B65D 88/30; B65D 88/54; B65D 2590/666
USPC .................................................... 414/21, 414
See application file for complete search history.

(56) References Cited

U.S. PATENT DOCUMENTS 3,186,770 A * 6/1965 O'Neal .................. B65G 53/66 406/75
4,005,908 A * 2/1977 Freeman ................ B65G 53/28 55/482
4,220,425 A * 9/1980 Jacobson ............... B65G 53/24 406/86
RE30,674 E 7/1981 Wenda et al.
4,340,160 A 7/1982 Van Geel et al.
4,953,752 A 9/1990 Tousignant et al.
5,269,472 A * 12/1993 Koenig ..................... B09B 3/32 110/232
5,388,773 A * 2/1995 Perry ..................... C09K 11/01 241/101.8
5,415,323 A 5/1995 Fenelon
6,269,852 B1 8/2001 Muhr
7,165,927 B2 1/2007 Doherty et al.
7,384,230 B2 6/2008 Pfeiffer et al.
7,441,999 B2 10/2008 Nakao et al.
7,682,123 B2 3/2010 Bachrach
7,753,639 B2 7/2010 Hoshino
7,771,153 B2 8/2010 Doherty et al.
7,972,104 B2 7/2011 Shiwaku et al.
8,197,172 B2 6/2012 Doherty et al.
8,561,652 B2 10/2013 Bordere et al.
8,585,341 B1 11/2013 Oren et al.
8,864,365 B2 10/2014 Rodgers
8,985,932 B1 * 3/2015 Hawkins .............. B65D 90/587 414/292
9,073,692 B2 7/2015 Morimoto et al.
9,428,330 B2 8/2016 Lopez
9,505,556 B2 11/2016 Razumov
9,592,959 B2 3/2017 Kinugawa et al.
9,617,075 B2 4/2017 Porat
9,620,397 B2 4/2017 Doherty et al.
9,700,175 B2 7/2017 King
9,752,998 B1 9/2017 Raju et al.
9,810,363 B2 11/2017 Ganzer et al.
9,881,823 B2 1/2018 Doherty et al.
9,988,215 B2 * 6/2018 Glynn ................... B65G 65/42
10,141,212 B2 11/2018 Doherty et al.
10,147,627 B2 12/2018 Doherty et al.
10,202,239 B2 2/2019 Razumov
10,280,001 B2 5/2019 Oki et al.
10,381,251 B2 8/2019 Doherty et al.
10,526,136 B2 1/2020 Hawkins et al.
11,691,684 B2 * 7/2023 Liet ........................ B62D 63/08 414/21
11,691,831 B2 * 7/2023 Sleeman ................ B65G 47/58 198/538
2002/0025244 A1 2/2002 Kim
2002/0110625 A1 8/2002 Garwood
2004/0185156 A1 9/2004 Garwood
2010/0034599 A1 * 2/2010 Snowdon ............... B65G 53/66 406/12
2011/0056964 A1 3/2011 Ambriz
2014/0377042 A1 * 12/2014 McMahon ........... B65G 63/008 414/293
2015/0225187 A1 8/2015 Razumov
2015/0360856 A1 12/2015 Oren et al.
2016/0122127 A1 5/2016 Ruge et al.
2016/0130095 A1 * 5/2016 Oren ...................... B65D 88/28 220/23.91
2016/0244279 A1 8/2016 Oren et al.
2017/0022016 A1 1/2017 James
2017/0144825 A1 5/2017 Davila et al.
2018/0002120 A1 1/2018 Allegretti et al.
2018/0084242 A1 * 3/2018 Rublee .................... G06F 18/22
2018/0118459 A1 * 5/2018 Koenig ................... B66F 9/125
2019/0218044 A1 7/2019 Keskitalo et al.
2019/0276225 A1 9/2019 Warren et al.
2019/0284079 A1 9/2019 Wang et al.
2019/0316294 A1 * 10/2019 Medoff .................... C10G 1/02
2020/0079584 A1 3/2020 Hawkins et al.
2020/0095060 A1 3/2020 Hawkins et al.
2020/0118853 A1 4/2020 Harasaki
2020/0147659 A1 5/2020 Narvekar et al.
2020/0156979 A1 5/2020 Rashley et al.
2021/0165665 A1 * 6/2021 Subramanian ..... G05B 19/4184

FOREIGN PATENT DOCUMENTS

CO 6251219 A2 2/2011
EP 0555171 A2 8/1993
EP 1661824 A2 5/2006
EP 2607275 A1 6/2013
JP S61127627 A 6/1986
WO 2018094678 5/2018

OTHER PUBLICATIONS

PCT Int. Search Report and Written Opinion, PCT Int.Serial No. PCT/US2021/053261, Int. Filing Date: Oct. 1, 2021, Applicant: Owens-Brockway Glass Container Inc. Date:Apr. 12, 2022.
Australian Examination Report No. 1, Application No. 2021351723, Applicant: Owens-Brockway Glass Container Inc., Dated: Oct. 2, 2025.
Australian Examination Report No. 2, Application No. 2021351723, Applicant: Owens-Brockway Glass Container Inc., Dated: Jan. 22, 2026.
Colombia Office Action, Application No. NC2023/0009590, Applicant: Owens-Brockway Glass Container Inc., Dated Nov. 19, 2025.

* cited by examiner

BULK MATERIAL DISCHARGING

TECHNICAL FIELD

This patent application discloses innovations to material handling and, more particularly, to bulk material discharging including loading, conveying, gravity releasing, rejecting, and pneumatically transmitting bulk material.

BACKGROUND

A conventional glass "batch house" includes a custom architectural installation specifically designed for glass manufacturing, and a glass batch handling system supported and sheltered by the architectural installation. The batch house is generally configured to receive and store glass feedstock, or "glass batch" materials, including glassmaking raw materials, for example, sand, soda ash, and limestone, and also including cullet in the form of recycled, scrap, or waste glass. The conventional glass batch house requires a specialized, dedicated, and permanent architectural installation including a tall building and a covered unloading platform and pit to receive glass batch from underneath railcars or trucks that arrive loaded with glass batch materials. The batch house also includes multi-story silos to store the glass batch, and glass batch elevators and conveyors to move the glass batch from unloading systems at a bottom of the pit to tops of the silos. The batch house further includes cullet pads at ground level to receive and store cullet, crushers to crush cullet to a size suitable for melting, and cullet elevators and conveyors to move crushed cullet to one of the silos in the batch house. The batch house additionally includes a mixer to mix the glass batch received from the silos, conveyors integrated with scales to weigh and deliver each glass batch material from the silos to the mixer, mixer conveyors to move the glass batch from the mixers to the hot-end subsystem, and dust collectors to collect dust from the various equipment. The installation occupies a large footprint and a large volumetric envelope, takes about one to two years to construct, cannot be relocated from one location to another, and tends to be a dusty and dirty environment.

SUMMARY OF THE DISCLOSURE

The present disclosure embodies a number of aspects that can be implemented separately from or in combination with each other.

Embodiments of a bulk material discharging system includes a transmission station including a transmitting vessel having a transmitting vessel inlet configured to receive bulk material from an outlet of a bulk material transporter, and a transmitting vessel outlet to transmit bulk material therefrom. The system also includes a transporter handling station located operatively upstream of the transmission station and including at least a portion of a transporter handler including at least one carriage with transporter couplings configured to engage corresponding carriage couplings of the bulk material transporter and configured to convey the bulk material transporter over the transmitting vessel.

Embodiments of a bulk material transmission station includes a transmitting vessel having a vessel inlet configured to receive bulk material from an outlet of a bulk material transporter, a vessel outlet to transmit bulk material therefrom, a vessel inlet closure, and a vessel outlet closure. The station also includes a station outlet conduit in downstream fluid communication with the vessel outlet to receive bulk material from the vessel outlet, a station outlet pressurization conduit in fluid communication with the station outlet conduit to pressurize the station outlet conduit for pneumatic transmission of the bulk material through the station outlet conduit, and a station outlet pressurization valve to regulate opening of the station outlet pressurization conduit.

Embodiments of a bulk material transporter handler includes an elevator including vertical guides, an elevator carriage guided by the vertical guides and having a first set of transporter couplings, and one or more elevator actuators operatively coupled to the elevator carriage to raise and lower the elevator carriage along the vertical guides. The handler also includes a conveyor carriage operatively coupled with the elevator, and including horizontal guides, a conveyor carriage guided by the horizontal guides and having a second set of transporter couplings, and one or more conveyor actuators operatively coupled to the conveyor carriage to advance and retract the conveyor carriage along the horizontal guides.

Embodiments of a bulk material rejection station includes a rejection hopper including a rejection inlet to receive bulk material therein, and a rejection outlet to transmit bulk material therefrom, and an auger including an auger inlet in downstream communication with the rejection hopper outlet. The station also includes a recirculation conduit including a recirculation inlet in fluid communication with the auger at a location upstream of the auger outlet, and a recirculation outlet in fluid communication with an upper portion of an interior of the rejection hopper.

DETAILED DESCRIPTION

Figure 1A:
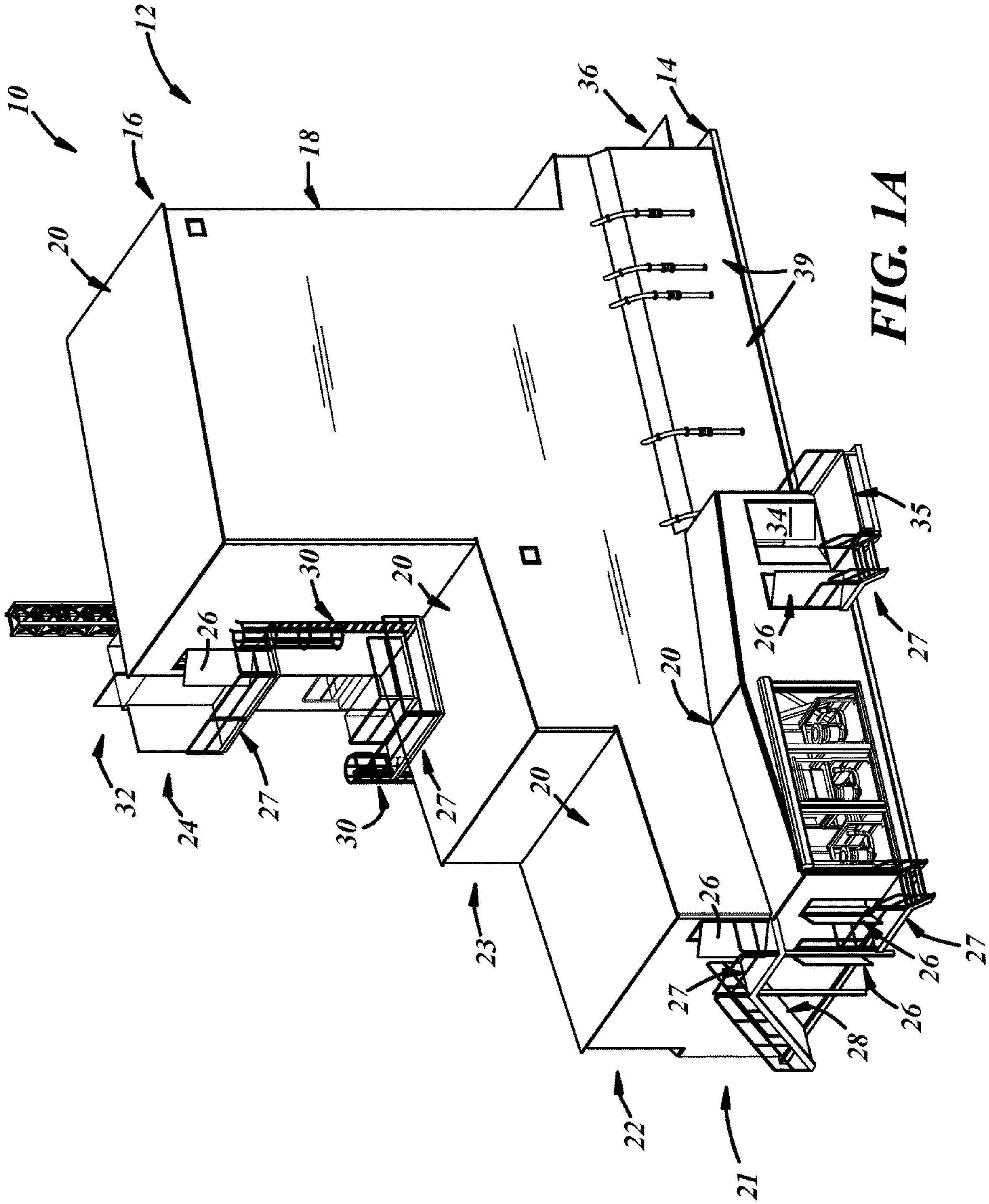
FIG. 1A is a perspective view of a bulk material handling system in accordance with another illustrative embodiment of the present disclosure, illustrating a building having a roof, cladding, elevator, stairs, ladders, and platforms.
Figure 1B:
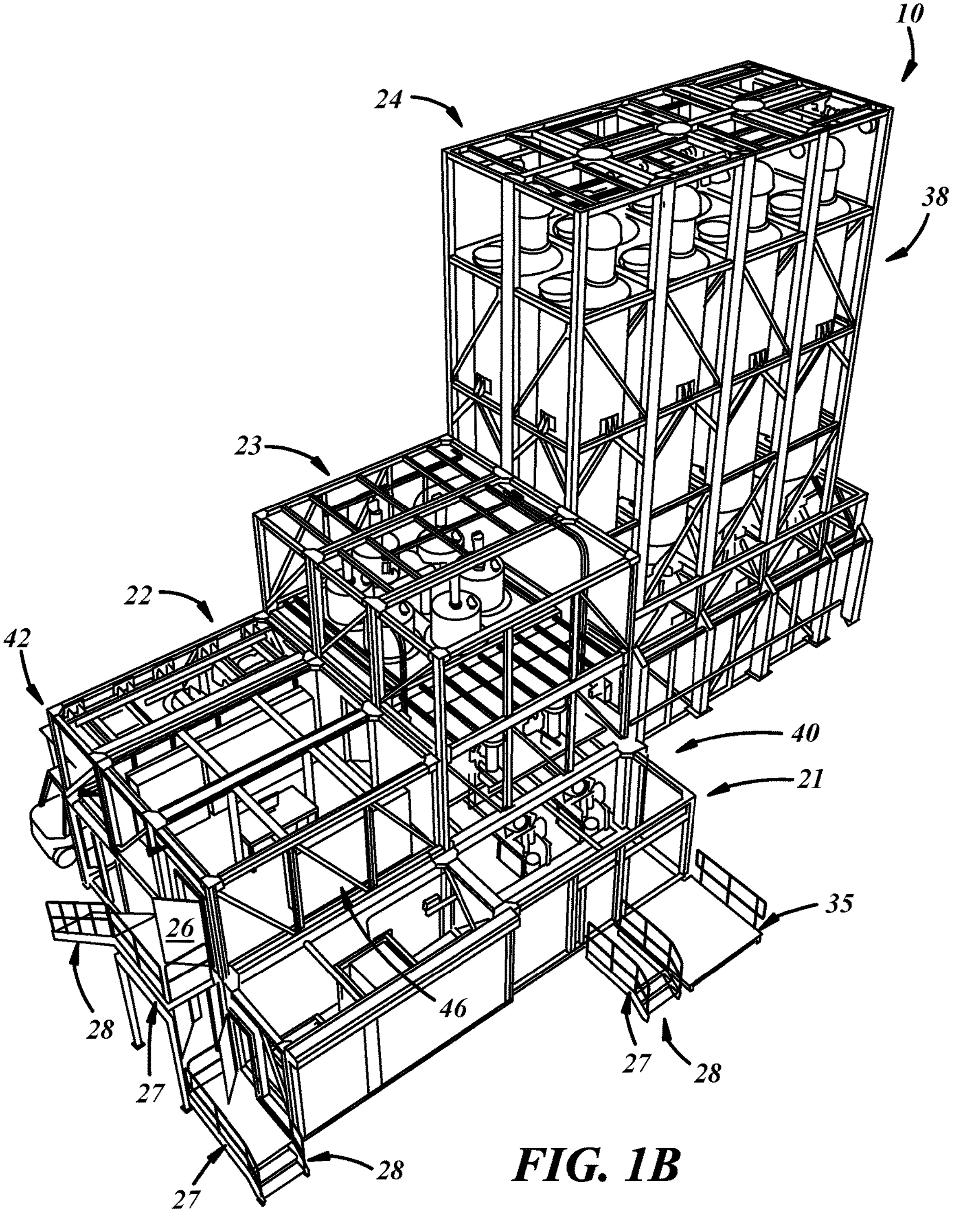
FIG. 1B is another perspective view of the system corresponding to FIG. 1A, without the roof, cladding, elevator, and ladders.
Figure 2A:
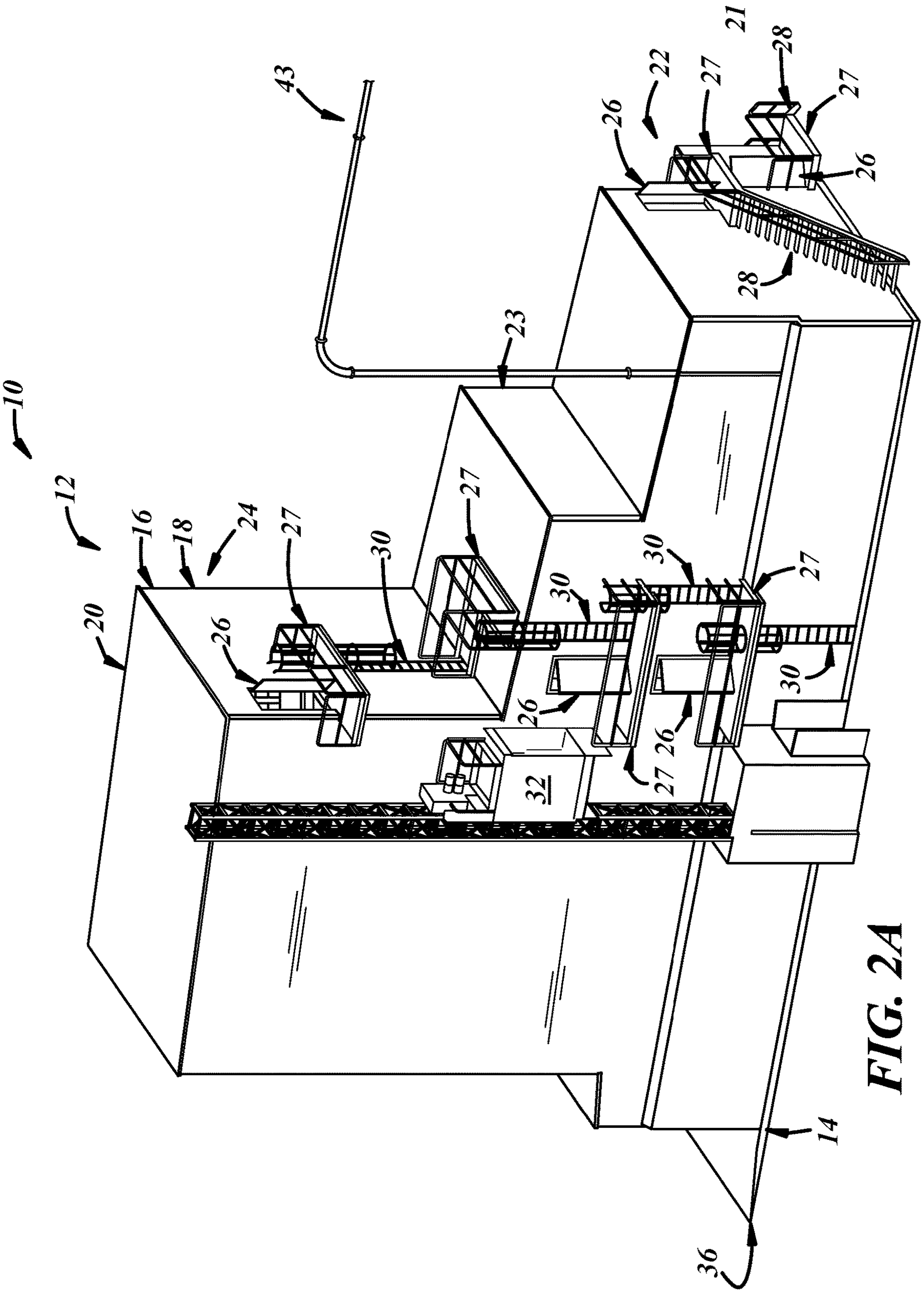
FIG. 2A is a different perspective view of the system of FIG. 1A, illustrating the building with the roof, cladding, elevator, stairs, ladders, and platforms.
Figure 2B:
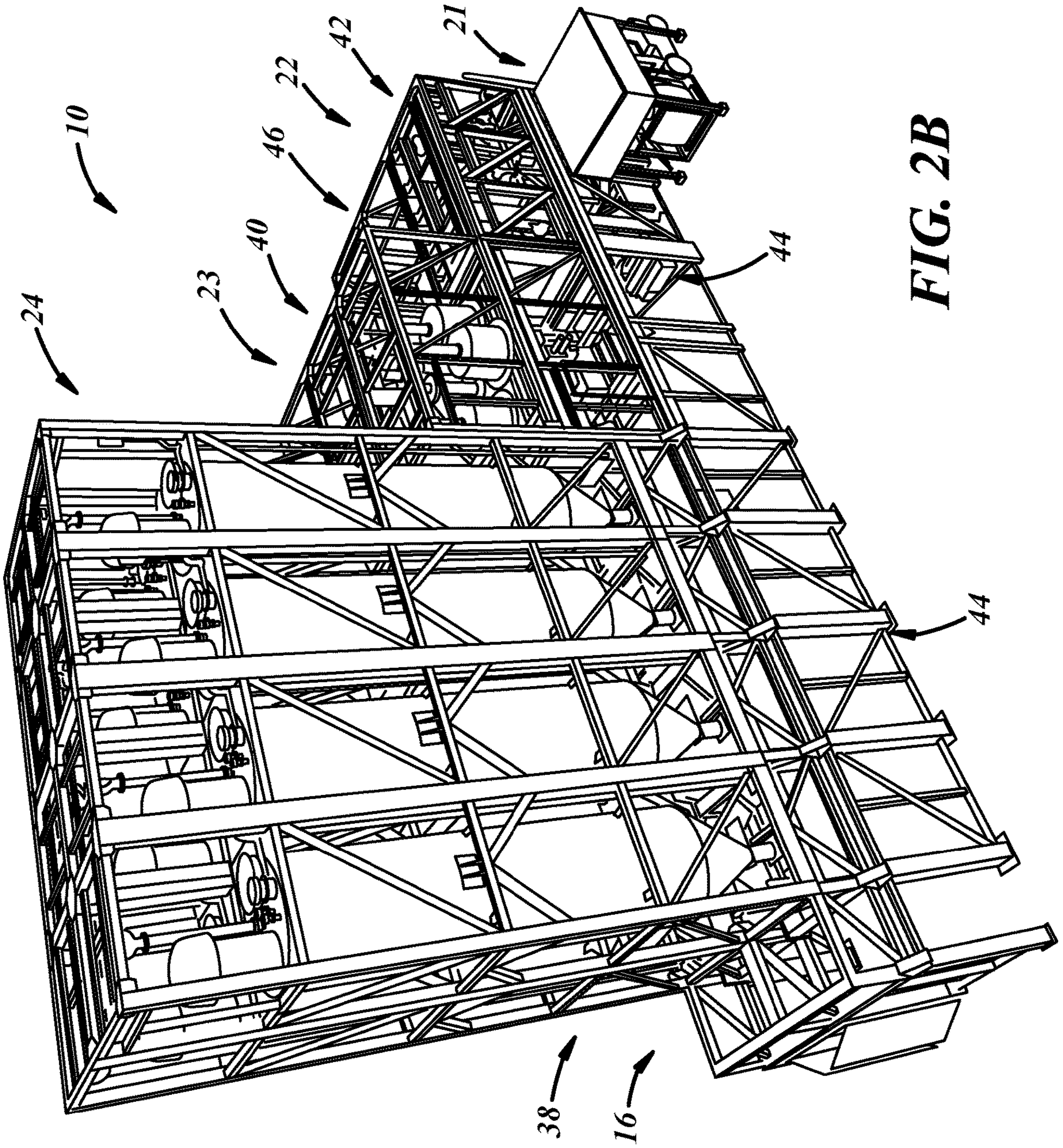
FIG. 2B is another perspective view of the system corresponding to FIG. 2A, without the roof, cladding, elevator, and ladders.
Figure 3:
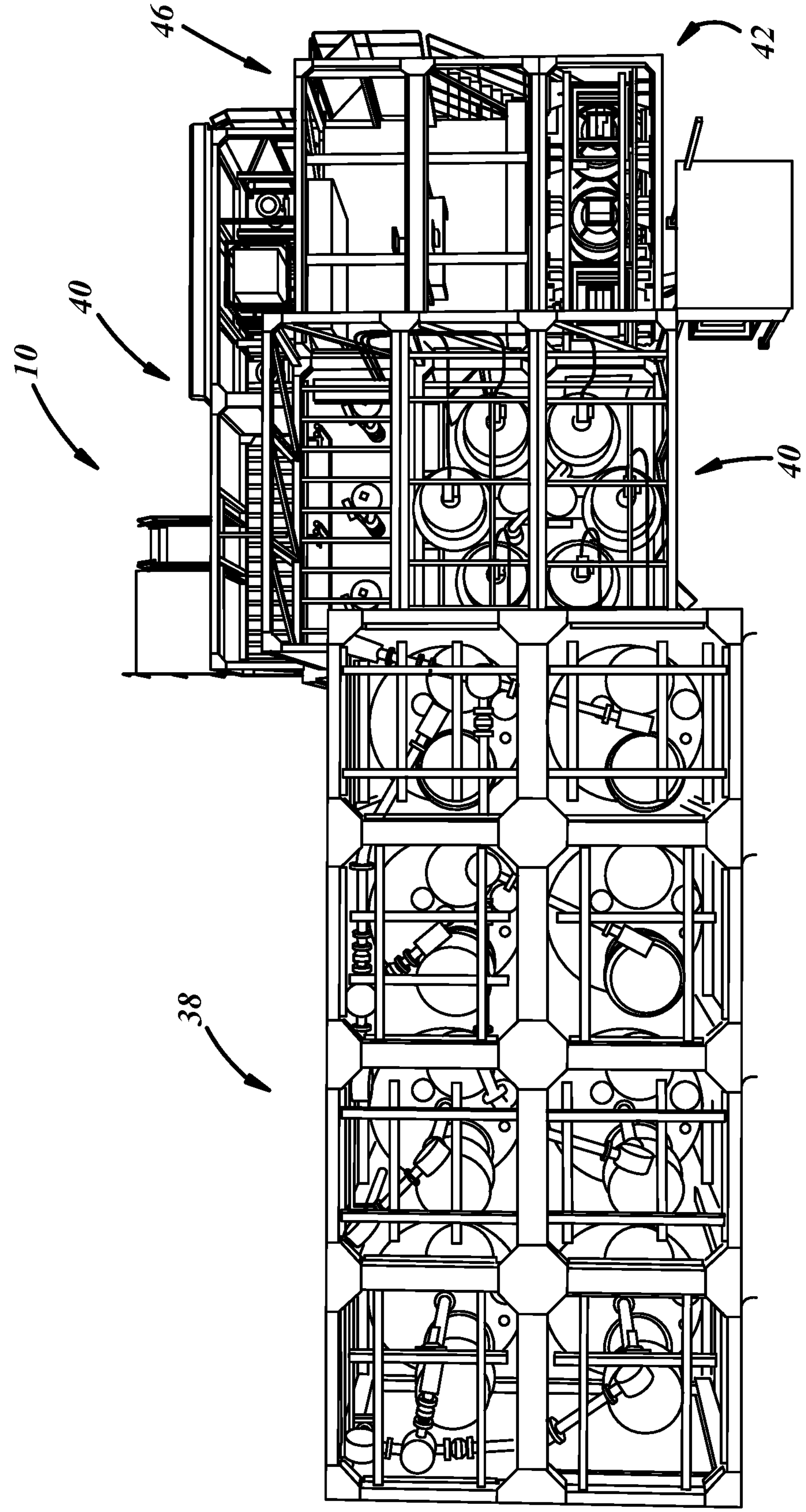
FIG. 3 is a top view of the system of FIG. 1A.
Figure 4:
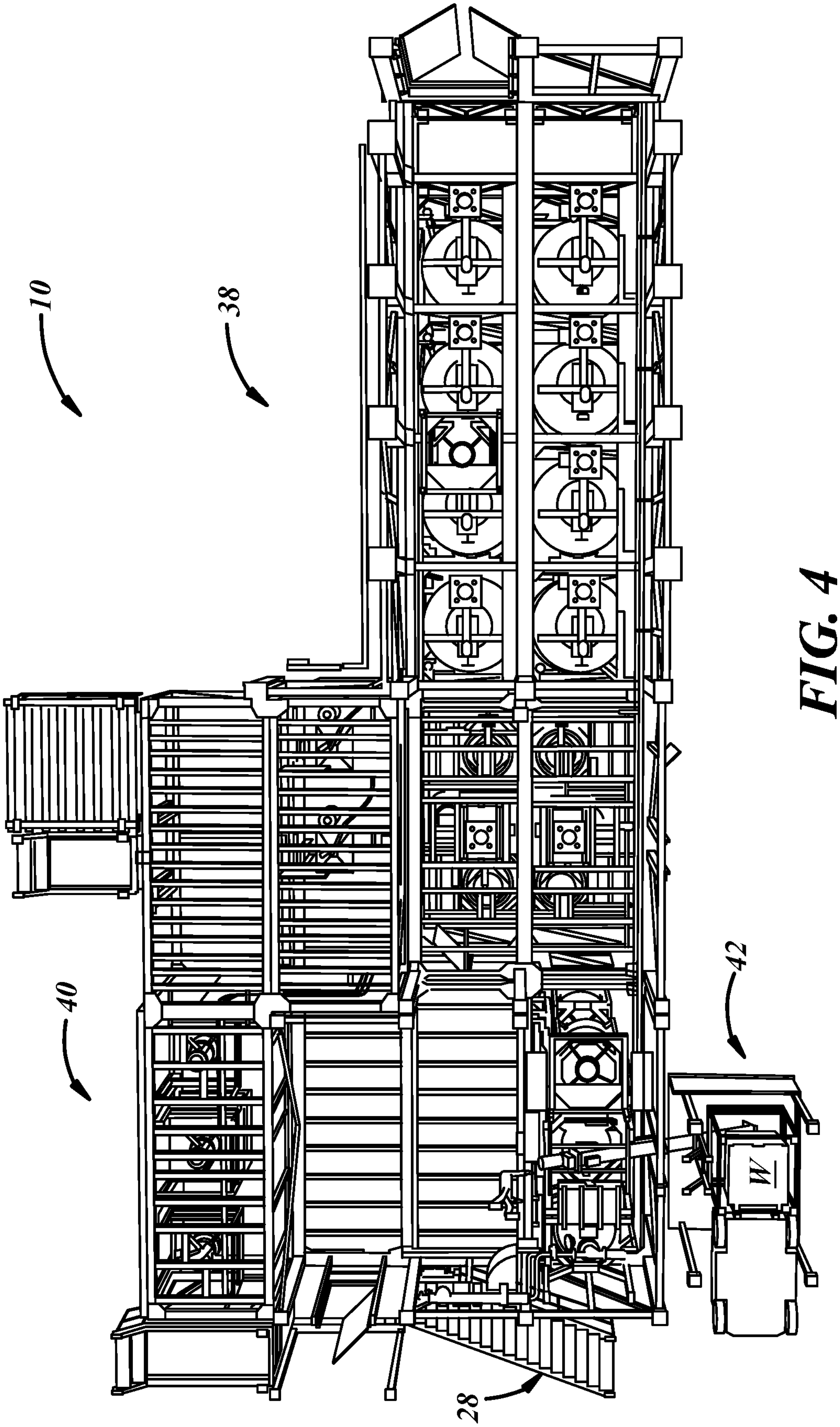
FIG. 4 is a bottom view of the system of FIG. 1A.
Figure 5:
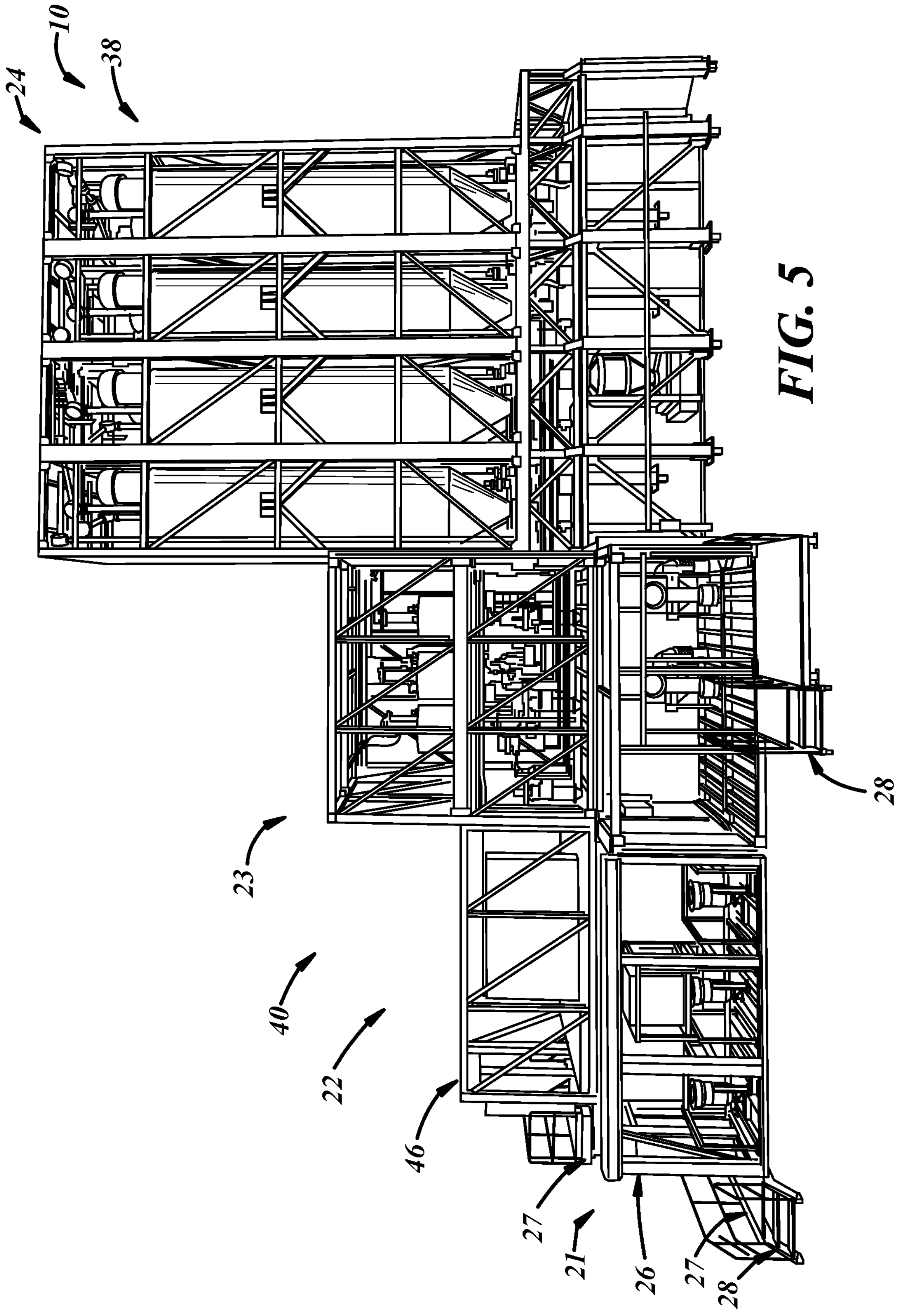
FIG. 5 is a side view of the system of FIG. 1A.
Figure 6:
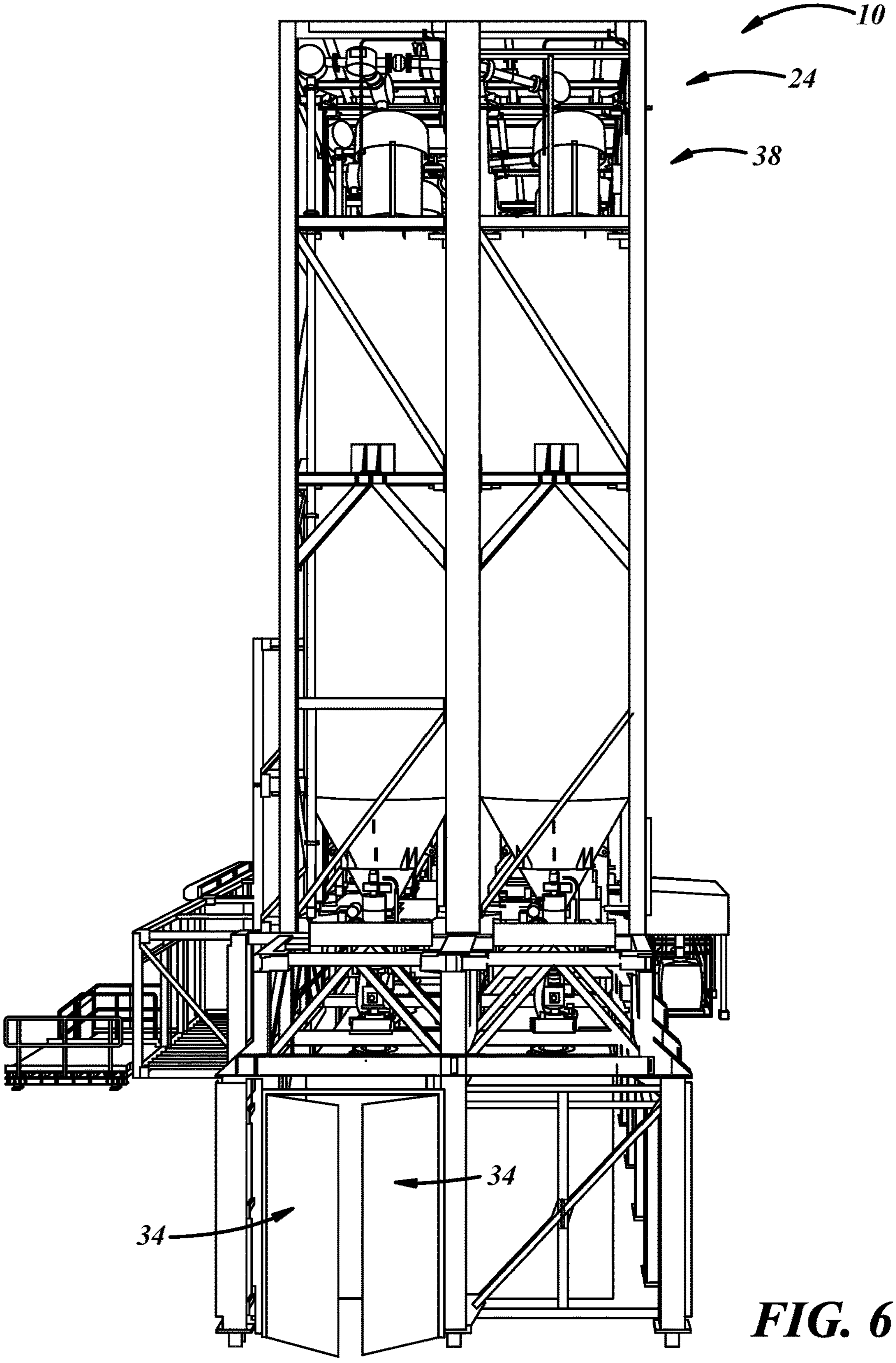
FIG. 6 is an upstream end view of the system of FIG. 1A.
Figure 7:
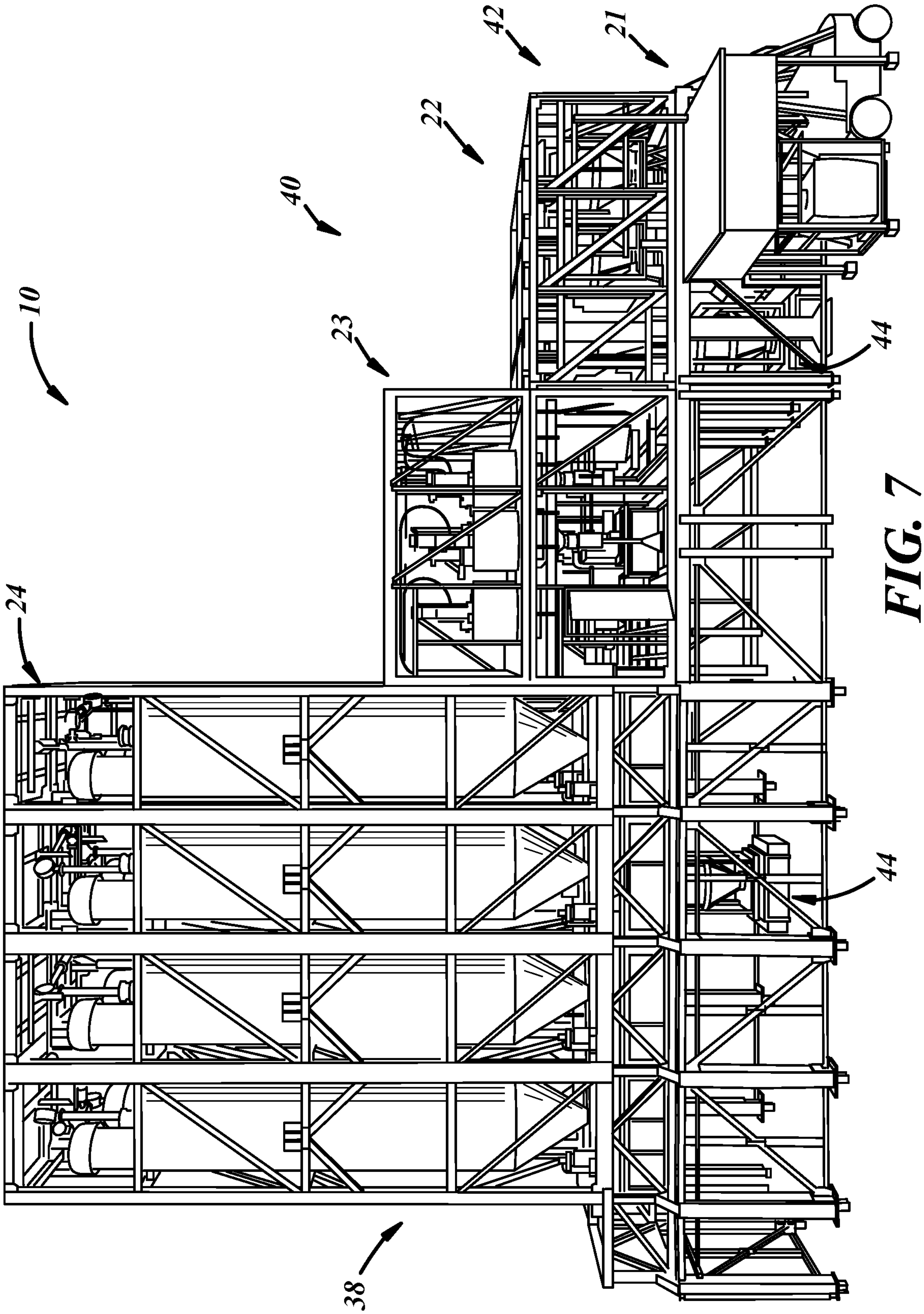
FIG. 7 is another side view of the system of FIG. 1A opposite that of FIG. 5.
Figure 8:
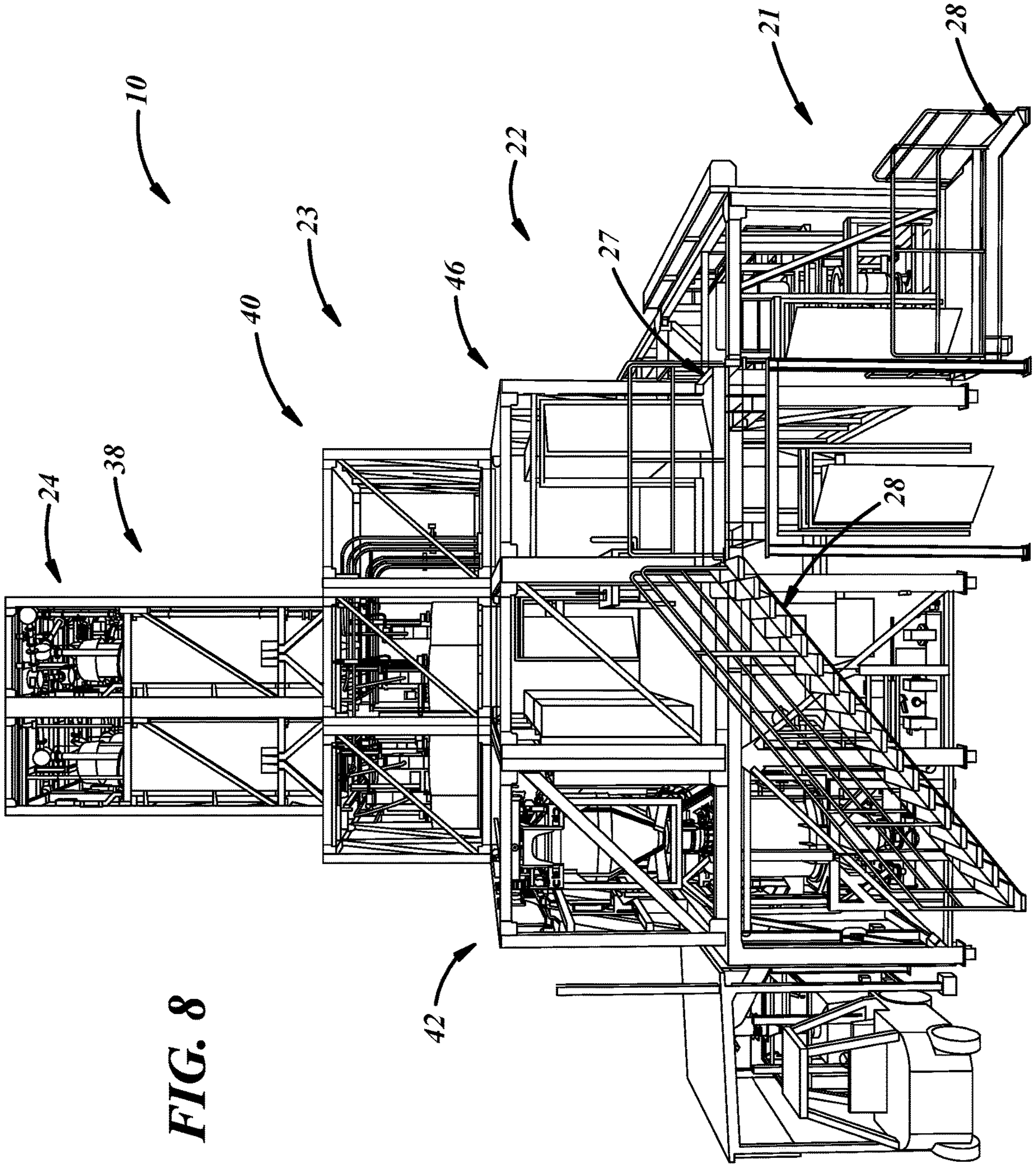
FIG. 8 is a downstream end view of the system of FIG. 1A opposite that of FIG. 6.

In general, a new bulk material handling system is illustrated and described with reference to a glass feedstock handling system for a glass container factory as an example. Those of ordinary skill in the art would recognize that other glass factories, for example, for producing glass fibers, glass display screens, architectural glass, vehicle glass, or any other glass products, share many aspects with a glass container factory. Accordingly, the presently disclosed and claimed subject matter is not limited to glass containers, glass container feedstock handling systems, and glass container factories and, instead, encompasses any glass products, glass product feedstock handling systems, and glass product factories. Moreover, the presently disclosed and claimed subject matter is not limited to bulk material handling for the glass industry and, instead, encompasses any products, bulk material handling systems, and factories in any industry in which bulk material handling is useful.

Although conventional glass batch houses and methods enable efficient production of high-quality products for large-scale production runs, the presently disclosed subject matter facilitates implementation of a revolutionary bulk material handling system that is simpler than a conventional batch house, is modular and mobile, and is more compact and economical at least for smaller scale production runs or incremental additions to existing large-scale production runs. More specifically, in accordance with an aspect of the present disclosure, a new bulk material handling system may include prefabricated modular equipment configurations to facilitate rapid and mobile production capacity expansion in smaller increments and at lower capital cost than conventional glass batch houses, and also may include techniques for handling bulk material in a dust-free or reduced dust manner. Further, the new system may omit one or more conventional glass batch house subsystems or aspects thereof, as described in further detail below.

With specific reference now to FIGS. 1A through 8, a new bulk material handling system 10 includes a new architectural installation 12 and new subsystems and equipment supported and sheltered by the installation 12. The installation 12 includes a concrete foundation 14 having a floor which may include, for example, a four to six-inch-thick slab, and a bulk material handling building 16 on the foundation including walls 18 and a roof 20. The installation 12 requires no basement and no pit below the floor, such that the concrete foundation has earthen material directly underneath, wherein the foundation slab establishes the floor. As used herein, the term "pit" includes an elevator pit, conveyor pit, loading pit, and the like, located below grade or below ground level and that may require excavation of earthen material to form. As used herein, the term "basement" includes the lowest habitable level of the bulk material handling building below a floor of the building and can include a first level or a below grade or below ground level portion that may require excavation of earthen material.

The installation 12 also includes multiple habitable levels, including a base or first level 21, an intermediate or second level 22, an upper or third level 23, and an attic or fourth level 24. Also, as used herein, the term "habitable" means that there is standing room for an adult human in the particular space involved and there is some means of ingress/egress to/from the space while walking such as a doorway, stairway, and/or the like. The installation 12 further includes egress doors 26, egress platforms 27, stairs 28, ladders 30, and an elevator 32 to facilitate access to the egress platforms 27 and doors 26. The installation 12 additionally includes loading doors 34 and loading platforms 35 and one or more ramps 36. Notably, the building 16 is constructed of many modules, including modular walls used to construct a base frame for the first level, and modular frames for the second, third, and fourth levels, as will be discussed in detail below.

With continued reference to FIGS. 1A through 8, the bulk material handling system 10 includes several subsystems that occupy a volumetric envelope much smaller than conventional batch houses such that the system 10 likewise requires a smaller volumetric envelope than conventional glass batch houses. The bulk material handling system 10 may be a glass bulk material handling system configured to receive and store glass feedstock or "glass batch." The glass batch includes glassmaking raw materials, including glass feedstock "majors" and "minors" and also may include cullet in the form of recycled, scrap, or waste glass. The bulk material handling system receives glass batch bulk materials and combines them into doses and provides the doses to a downstream hot-end system of a glass factory adjacent to or part of the bulk material handling system.

The bulk material handling system 10 includes one or more of the following subsystems. A first bulk material, or majors, subsystem 38 is configured to receive, pneumatically convey, store, and gravity dispense majors bulk material. Glassmaking majors may include sand, soda, limestone, alumina, saltcake, and, in some cases, dust recovery material. Similarly, a second bulk material, or minors, subsystem 40 is configured to receive, pneumatically convey, and store minors bulk material from individual bulk material bags. Glassmaking minors may include selenium, cobalt oxide, and any other colorants, decolorants, fining agents, and/or other minors materials suitable for glassmaking. A bulk material discharge subsystem 42 is configured to receive bulk material from the majors and minors subsystems 38, 40 and transmit the bulk material to downstream bulk material processing equipment, for example, a glass melting furnace separate from and downstream of the bulk material handling system 10. A bulk material transfer or transport subsystem 44 is configured to receive bulk material from the majors and minors subsystems 38, 40, and transport the bulk material within, to, and from, the majors and minors subsystems 38, 40, and to and from the discharge subsystem 42. A controls subsystem 46 is in communication with various equipment of one or more of the other subsystems 38, 40, 42, 44, and is configured to control various aspects of the system 10. Those of ordinary skill in the art would recognize that the system 10 can be supplied with utility or plant electrical power, and can include computers, sensors, actuators, electrical wiring, and the like to power and communicate different parts of the system 10 together. Likewise, the system 10 can be supplied with plant or compressor pneumatic power/pressure, and can include valves, lubricators, regulators, conduit, and other like pneumatic components to pressurize and communicate different parts of the system 10 together.

The system 10 may be pneumatically closed from pneumatic input or receiving conduit 39 of the majors subsystem 38 to pneumatic output or transmitting conduit 43 of the discharging subsystem 42. The pneumatic receiving conduit 39 may extend through one or more walls of the building for accessibility to bulk transporters, e.g., trucks or rail cars, that bring bulk materials and that may have pressurized vessels to assist with pneumatic receiving and conveying of bulk material. The receiving conduit 39 has any suitable couplings for coupling to bulk transporters in a pneumatically sealed manner, wherein the bulk transporters may have pumps, valves, and/or other equipment suitable to pressurize the receiving conduit to push bulk material into the majors subsystem 38 and/or the batch handling system 10 itself may include pumps, valves, pressurized plant air plumbing, and/or other equipment suitable to apply positive and/or negative (vacuum) pressure to the input conduit to push and/or pull bulk material into the majors and minors subsystems 38, 40.

The transmitting conduit 43 may extend through one or more walls or the roof of the building for transmission to downstream bulk material processing equipment, for instance, in a hot end subsystem of a glass manufacturing system (not shown). For example, the transmitting conduit 43 is pneumatically sealingly coupled to a receiver hopper at a glass melter in the hot end subsystem. The conduit 43 may have any suitable couplings for coupling to the receiver hopper in a pneumatically sealed manner. Those of ordinary skill in the art would recognize that the bulk material handling system is pneumatically closed between the pneumatic receiving conduit and the pneumatic transmitting conduit. This is in contrast to conventional systems where bulk material is open to the surrounding environment. The phrase "pneumatically closed" means that the path, and the bulk materials following that path, from receiving conduit to transmitting conduit is/are enclosed, and not openly exposed to the surrounding environment, although not necessarily always sealed air-tight.

Figure 9A:
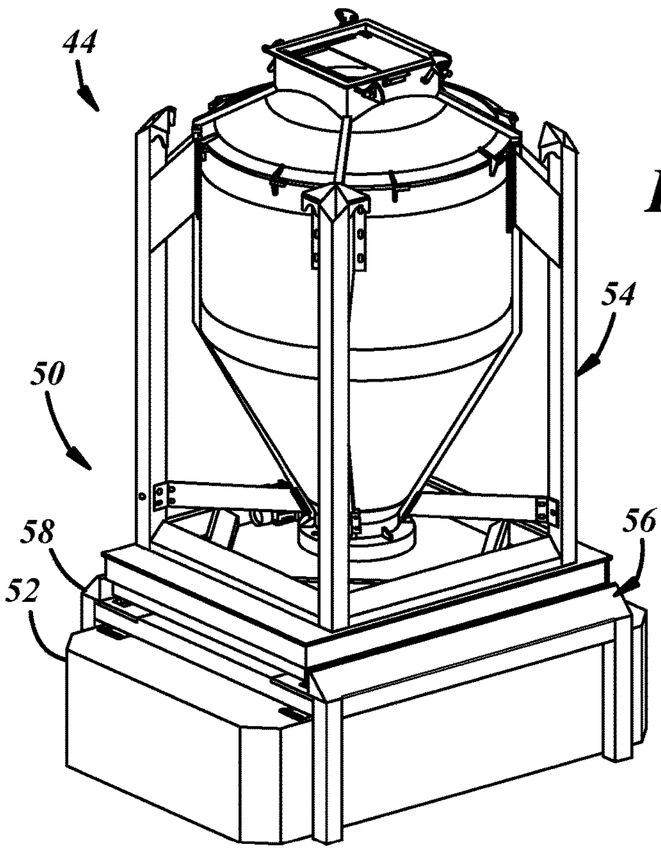
FIG. 9A is a perspective view of a bulk material transport assembly including a bulk material transporter and a vehicle.
Figure 9B:
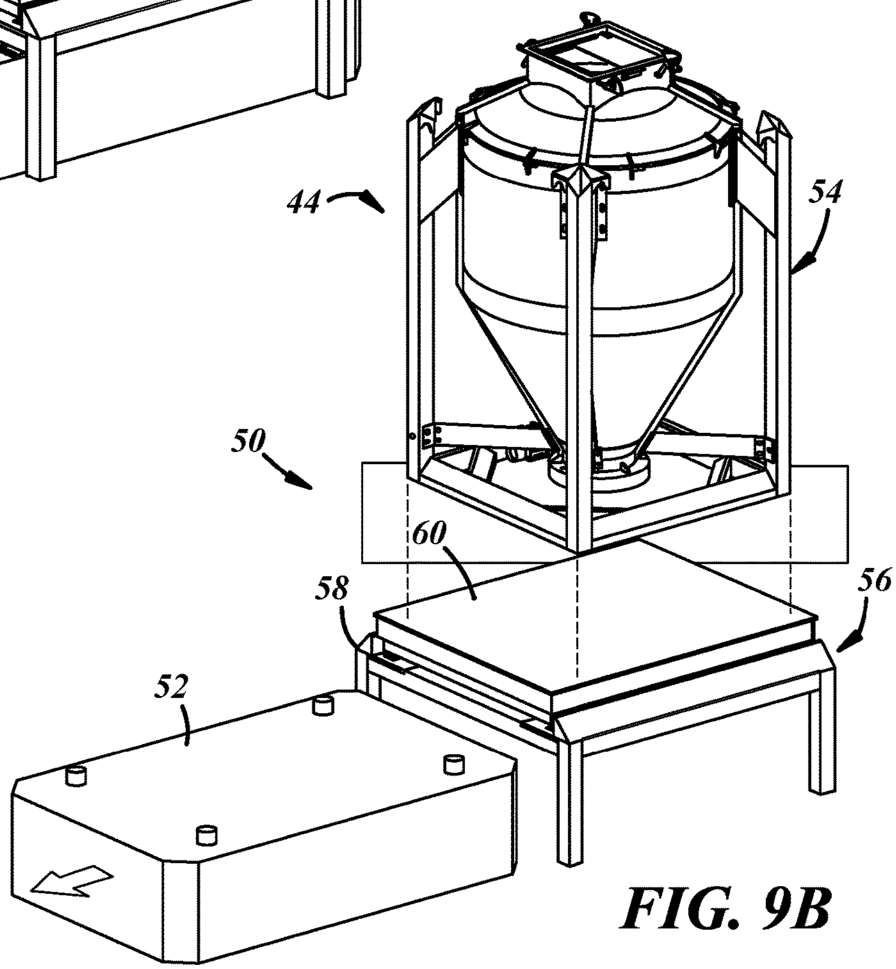
FIG. 9B is a perspective view of assembly and vehicle of FIG. 9A, illustrating the vehicle moving relative to the transport assembly.

FIGS. 9A and 9B are isometric views of an illustrative bulk material transport assembly 50 and vehicle 52 to carry the assembly 50 of the transport subsystem 44. The transport assembly 50 and vehicle 52 are configured to move together along the floor of the installation among a plurality of locations, but they are also separable from one another such that the vehicle 52 can move the transport assembly 50 to one location, detach itself from the transport assembly 50, and move itself to a different location, such as to the location of a different transport assembly 50 of the system to temporarily become part of a different transport apparatus.

The transport assembly 50 includes a transporter 54 supported by a weighing platform 56, which includes a table 58 and a scale 60. The scale 60 is supported by the table 58, and the transporter 54 is supported by the scale 60 when part of the transport assembly 50. The transporter 54 and vehicle platform 56 are configured to move together along the floor of the installation among a plurality of locations when supported by a vehicle 52, but they are also separable from one another such that the transporter 54 can be detached from the platform 56 at one location and the platform 56 can be moved by the vehicle 52 or other means to a different location.

The vehicle 52 may be an automated guided vehicle (AGV) that may have a platform that is vertically movable such that the AGV can maneuver beneath the transport assembly 52 and extend the platform upward from a retracted position to lift the transport assembly 52 off of the ground for relocation as a complete transport unit. The AGV may include one or more locators that mate with complimentary locators along a bottom side of the table 58 of the weighing platform 56. The AGV may have a power source charging system including a wireless battery charger, such as an inductive charger.

Figure 10A:
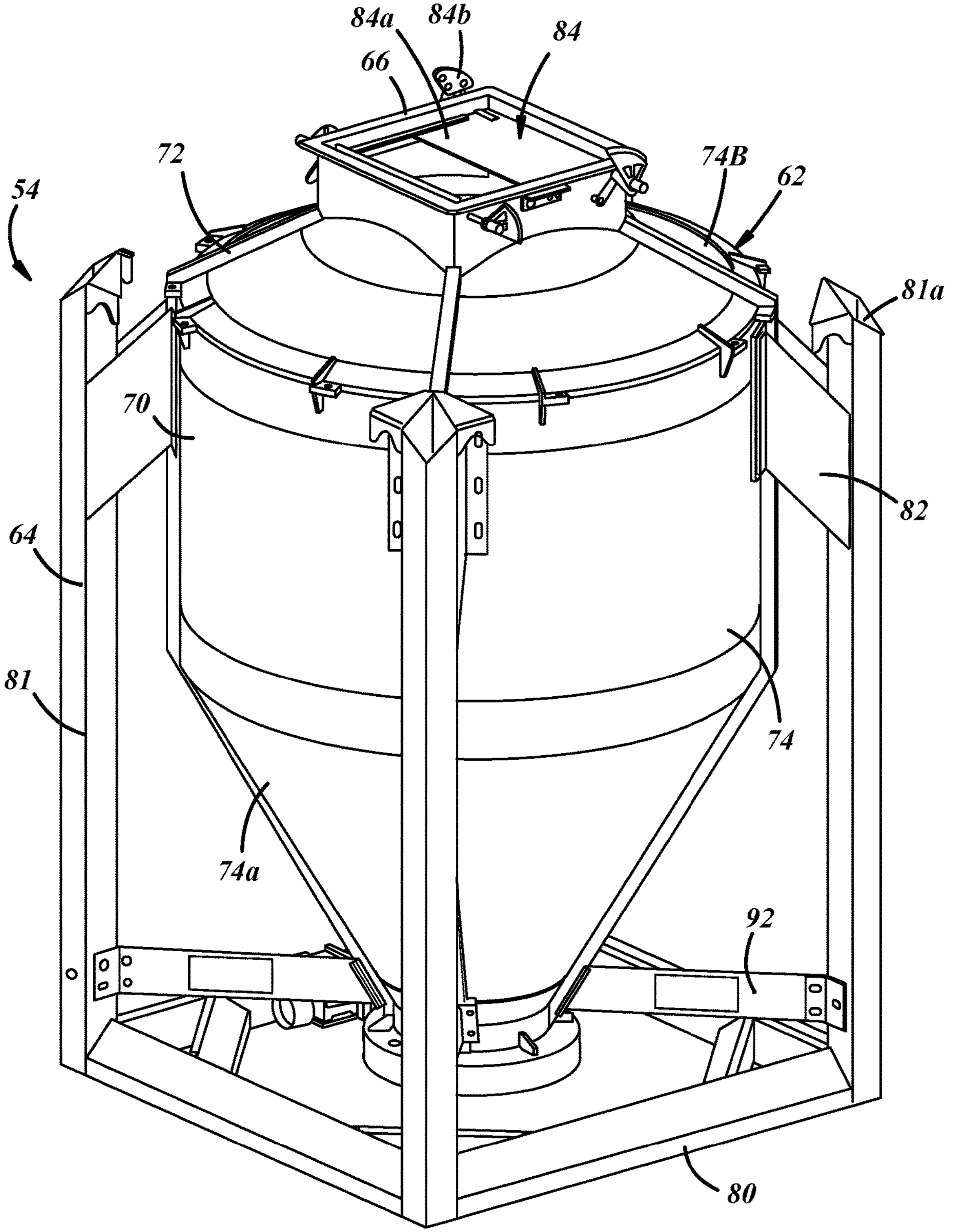
FIG. 10A is an enlarged perspective view of the transporter of FIG. 9A.
Figure 10B:
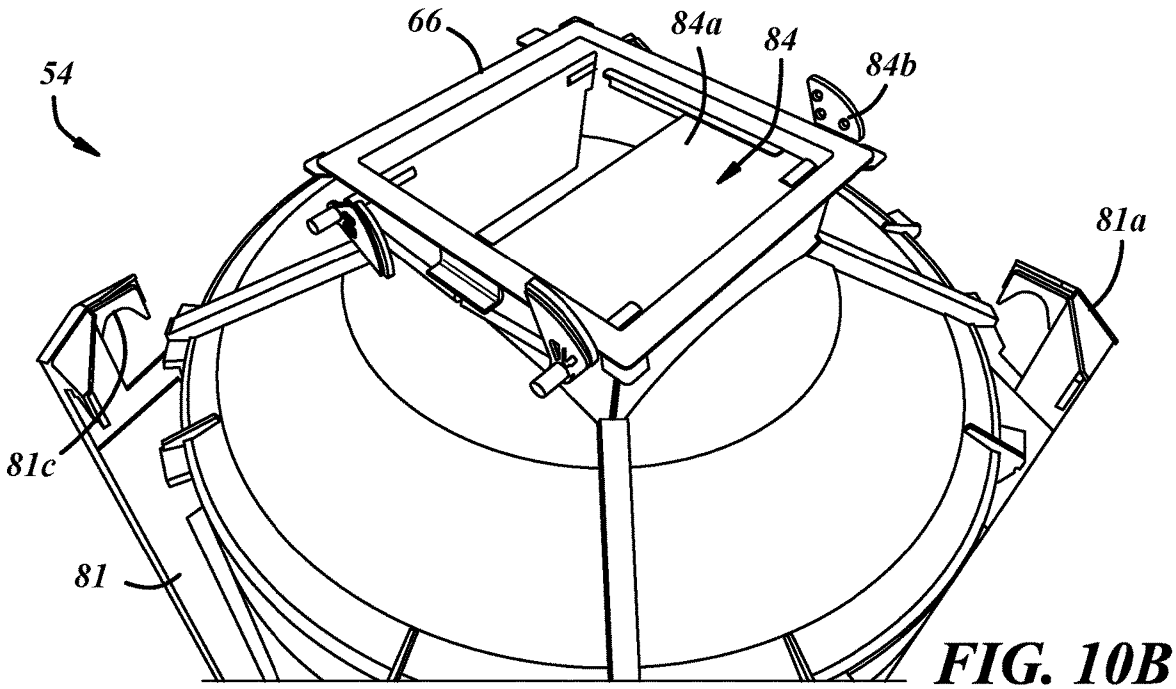
FIG. 10B is an enlarged, fragmentary, perspective view of an inlet end of the transporter of FIG. 9A.
Figure 10C:
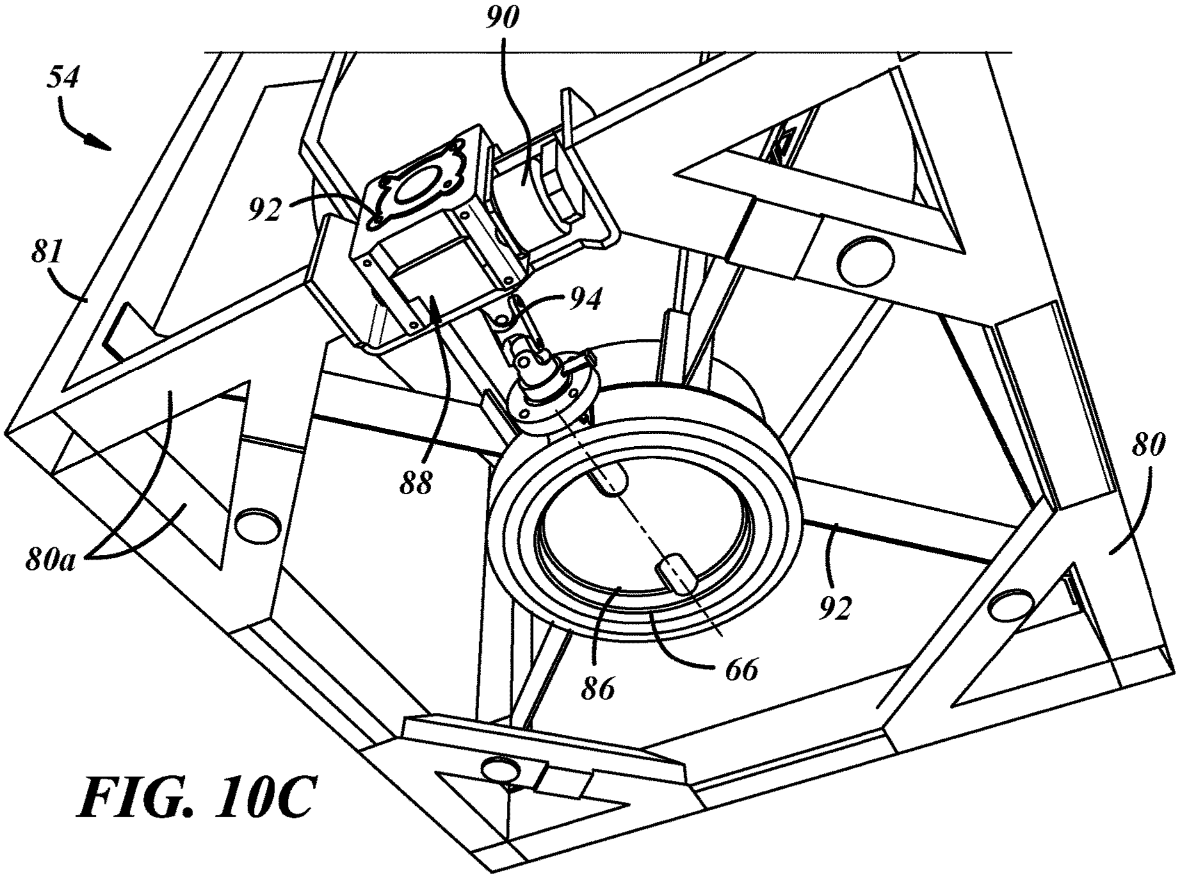
FIG. 10C is an enlarged, fragmentary, perspective view of an outlet end of the transporter of FIG. 9A.

With reference to FIGS. 10A-C, The bulk material transporter 54 may include a hollow transport bin 62 supported by a frame-like cradle 64 and having an inlet 66 at a first or top end, and an outlet 68 at a second or bottom end. The illustrated transport bin 62 is formed as a wall 70 that at least partially defines the hollow interior of the bin and an exoskeleton 72 that extends along an exterior of the wall 70 and interconnects the inlet 66 and outlet 68 of the bin. A central portion 74 of the wall 70 is cylindrical, a lower portion 74*a* of the wall is generally conical, tapering down toward the outlet 68, and an upper portion 74*b* of the wall 70 has a concave exterior or frustoconical shape and carries the inlet 66.

At least a portion of the wall 70 of the bin 62 is formed from a pliable material. Here, "pliable" means the material is elastically deformable in a flexural mode and will return to its original shape after deformation. The pliable material is preferably an elastomeric material, such as a vulcanized rubber material or a polyurethane rubber. Given the heavy loads of bulk material to be carried by the bin 62, it may have a substantial wall thickness on the order of 10-20 mm. Using polymeric materials for batch containers with such heavy bulk materials (e.g., sand, limestone, etc.) is unconventional. However, it has been found that use of a pliable wall material facilitates discharge of the bulk material from the bin after all bulk materials have been received by the bin. In particular, the pliable wall 70 can be purposefully and locally deformed to break-up the very dense conglomeration of particulate bulk material in the bin during discharge from the outlet. A traditional metal bin can of course not be elastically deformed—meaning that, if the heavy load of particulate bulk material is compacted too much to drain from the bin via gravity feed, the only way to break the compacted material away from the wall is scraping along the inside of the bin wall. Use of a pliable material in wall of the transport bin 62 is made possible in part by the exoskeleton 72. The exoskeleton 72 is formed from a rigid, non-pliable material such as a metallic material (e.g., steel) or a highly reinforced polymer composite (e.g., a fiberglass or carbon fiber composite).

The cradle 64 is frame-like in construction and may be constructed from tubular steel members or the like. The cradle 64 includes a bottom 80 having a polygonal (e.g., rectangular) perimeter formed from multiple bottom frame members 82 arranged end-to-end. The cradle 64 further includes upright members 81 extending from corners of the bottom 80 to a free end 81*a*. The free end 81*a* may have obliquely angled surfaces 81*b* for engaging cradle engagement features of a transporter handler described hereinafter. Carriage engagement features 81*c* are provided at the ends 81*a* of the uprights 81. In this example, the engagement features 81*c* are in the form of hooks or downward facing cut-outs and can be used by other machinery of the larger system 10 to lift the transporter 54, such as a transporter handler e.g., elevator and/or conveyor of the discharging module. Other engagement features are possible, including but not limited to pins or posts, pin-receiving apertures, latches, pulleys, etc. Finally, the illustrated cradle 64 includes radial braces 82 extending from each upright 81 to interconnect the cradle 64 with the transport bin 62. Additional bracing may be provided between the cradle 64 and the exoskeleton 72 near the outlet 66 of the transporter 54.

Notably the cradle 64 is constructed such that it fully supports the weight of the transport bin 62 only along the perimeter of the bin, and the upper end of the cradle is open—i.e., there are no cross-members boxing off the ends 81*a* of the uprights 81 as with a traditional support frame. The illustrated construction permits the inlet 66 to be located above the cradle 64 so that the cradle does not interfere with dosing or docking equipment, yet still provides structure for lifting the transporter 54 when not receiving bulk material from a material dispenser. As shown in FIG. 10C, a central portion of the bottom 80 of the cradle 64 is also open and accessible for being coupled with a different receiving vessel in a relatively dust-free manner when discharging the contents of the bin 62.

The transporter 54 includes an inlet closure 84 at the inlet 66 and an outlet closure 86 at the outlet 130. Each closure 84, 86 has an open position and a closed position. When the inlet closure 84 is in the open position, the hollow inner volume of the bin 62 can be accessed through the inlet 66, and bulk material can be received into the bin from above. When the inlet closure 84 is in the closed position, access to the inner volume of the bin 62 is blocked by the closure. In the illustrated example, the inlet closure 84 comprises doors 84*a*. For purposes of illustration, one door 84*a* is illustrated in the closed position (horizontal and partially spanning the inlet 66), and the other door is illustrated in the open position (vertical and extending downward toward the internal volume of the bin). The doors 84*a* or other closure elements are biased toward the closed position (e.g., via a spring) or otherwise are normally kept in the closed condition until some action is taken to open the inlet 66. In this example, each door 84*a* is hinged and pivots about an axis near an edge of the inlet 66 against a bias. The closure 84 includes levers 84*b* fixed to the hinge pins of each door 84*a* that operate to open the respective door when pressed downward from above.

When the outlet closure 86 is in the closed position, as in FIG. 10C, access to the inner volume of the bin 62 is blocked by the closure, and any bulk material contained in the bin is not permitted to escape the bin under the influence of gravity. When the outlet closure 86 is in the open position, the inner volume of the bin 62 is connected with the space below the bin 62, and any bulk material contained in the bin 62 are permitted to escape through the outlet 66. As with the inlet closure 84, the outlet closure 86 may be biased toward or otherwise normally kept in the closed position until some action is taken to open the outlet 66. In the illustrated example, the outlet closure 86 is a hinged plate slightly recessed in the outlet 66. The hinge pins of the plate lie along a pivot axis extending through the center of the round plate. One side of the hinge pins is operatively coupled with a mechanical transmission 88.

The transmission 88 is carried by the cradle 64 and includes a driven wheel or rotational input 90, a gearbox 92, and a linkage 94. The rotational input 90 may be a friction wheel or gear that is accessible from below and/or from the transmission side of the cradle 64 and is configured to rotate about a horizontal axis. The gearbox 92 transmits rotation of the input 90 to the linkage 94 and changes the axis of rotation by about 90 degrees (e.g., via bevel gears or a worm gear). The rotating linkage 94 causes the closure to pivot about its axis to change the closure between the open and closed positions, depending on the direction of rotation of the rotational input. Where the rotational input 90 is a friction wheel, a mating friction wheel of another portion of the overall system can be pressed on the wheel and rotated in one direction to open the closure 86, to thereby discharge the contents of the bin 62 into an underlying receiving vessel, and in the opposite direction to close the closure to prepare the bin to be refilled. This is of course only one example of a suitable closure, as nearly any movable barrier can serve the same purpose of opening and closing the outlet 66 of the transporter 54.

Figure 11A:
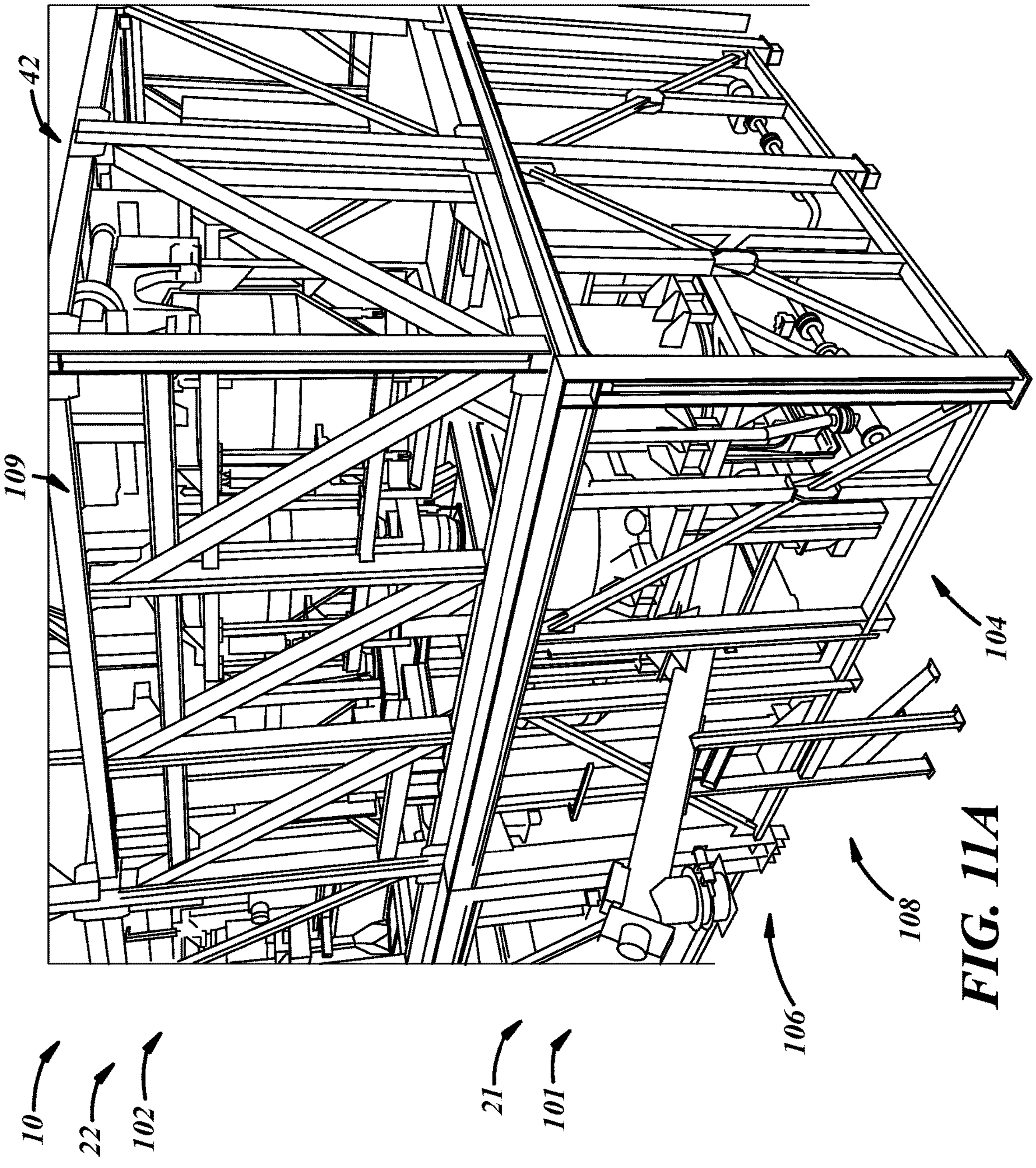
FIG. 11A is an enlarged perspective view of a downstream corner portion of the system of FIG. 1A, illustrating a bulk material discharging subsystem.

With reference now to FIG. 11A, the bulk material discharging system 42 occupies the first two levels 21, 22 of the system 10, including a first discharging level 101 and a second discharging level 102 that are habitable. The discharging system 42 includes a transmission station 104 to transmit bulk material out of the system 10, a transporter handling station 106 to load and unload the transporter 54 (FIGS. 10A-C) and move the transporter 54 to the transmission station 104 and being located operatively upstream of the transmission station 104. The system 42 also may include a rejection station 108 to reject bulk material from the system 10 and may be located between the handling station 106 and the transmission station 104. As will be discussed in further detail below, the discharging system 42 also includes a modular frame 109 to carry portions of the transport handling station 106. Although not shown, those of ordinary skill in the art would recognize, that the subsystem 42 may include any suitable controllers, sensors, actuators, electrical wiring, and the like that may be used to carry out automatic operation of the subsystem 42.

Figure 11B:
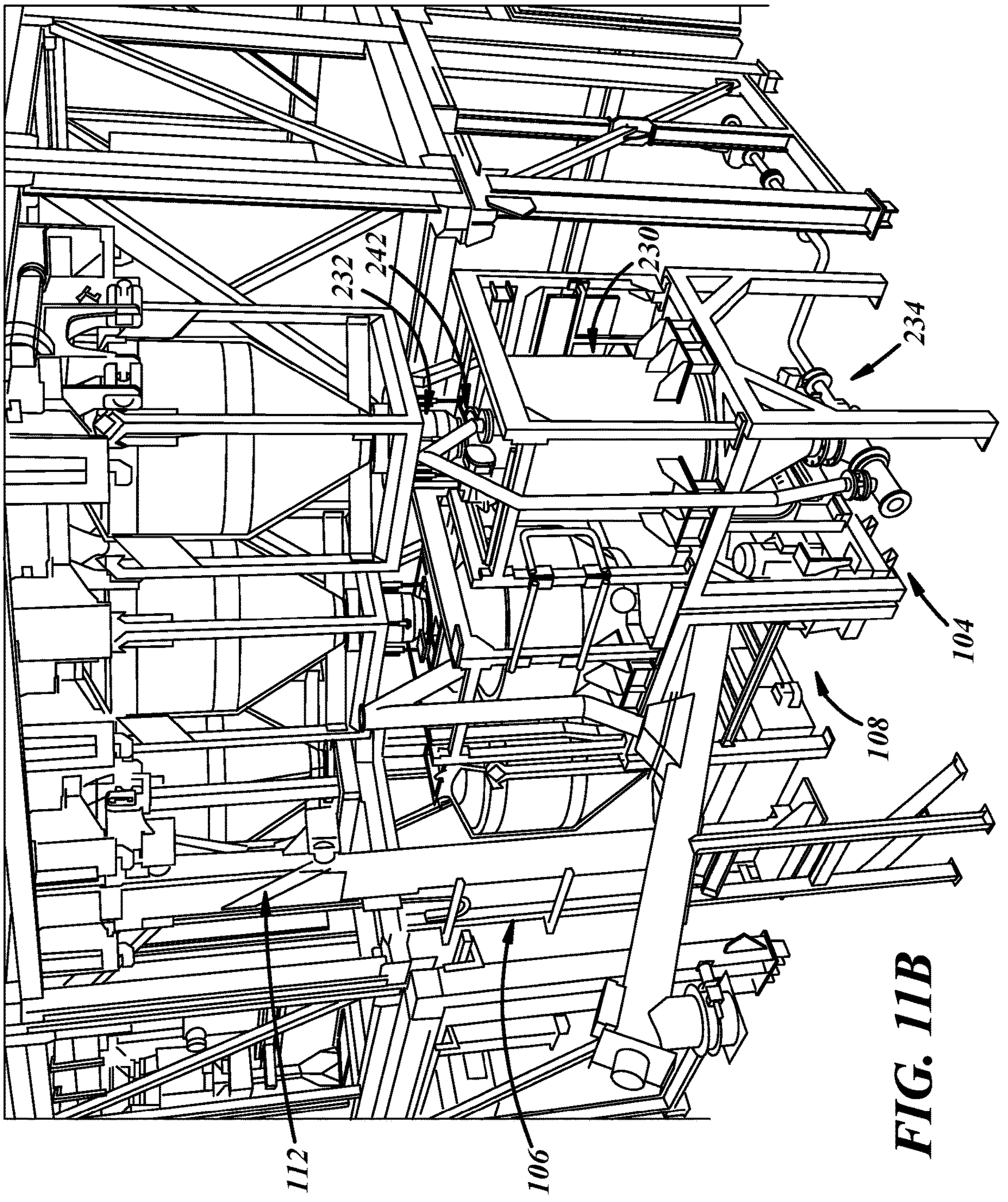
FIG. 11B is an enlarged fragmentary perspective view of the downstream corner portion shown in FIG. 11A.
Figure 11C:
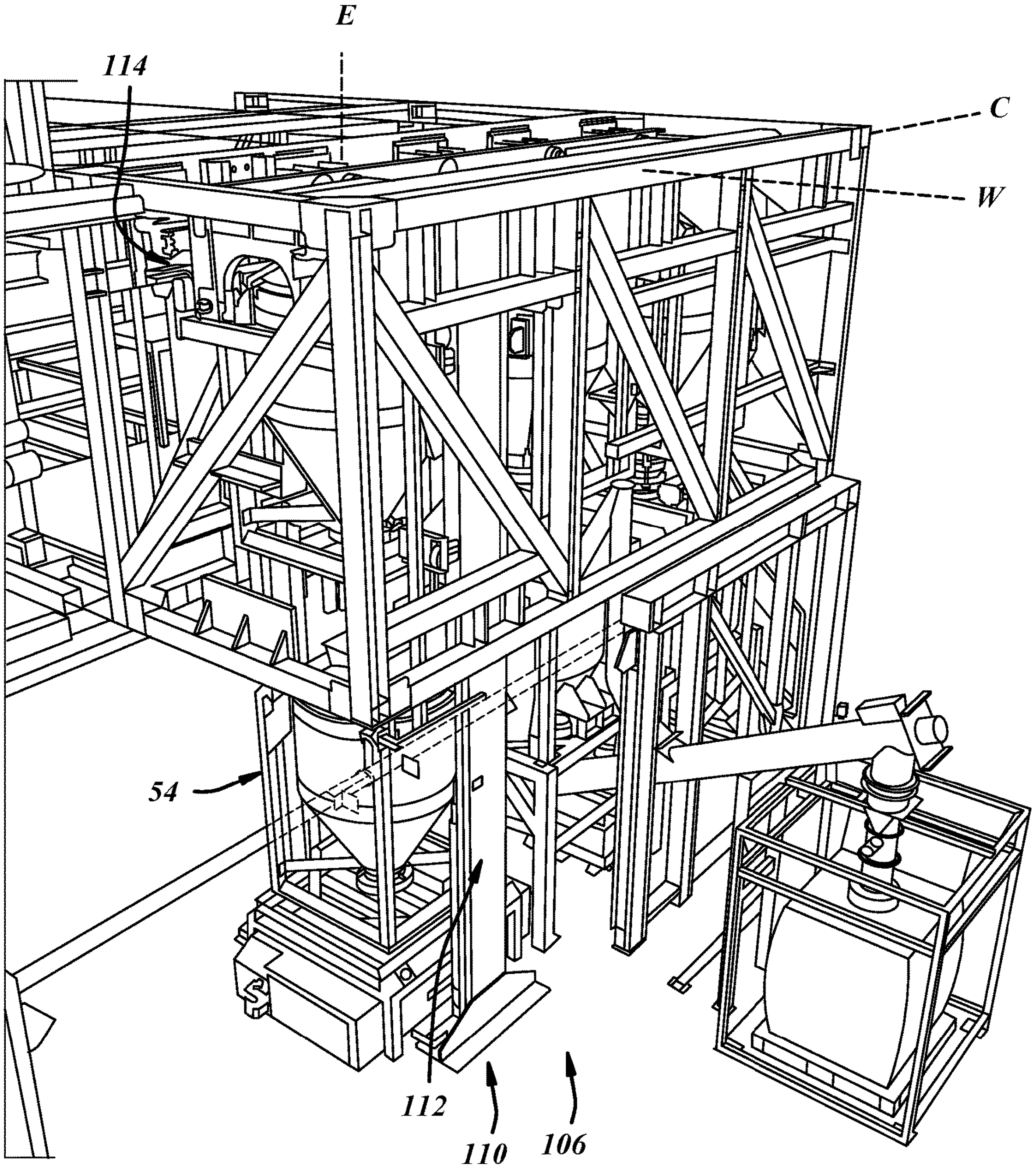
FIG. 11C is another enlarged fragmentary perspective view, from a different angle, of the bulk material discharging subsystem of FIG. 11A.

With reference now to FIGS. 11B and 11C, the handling station 106 may be located at an upstream end of the discharging system 42 and is configured to receive the transporter 54, raise the transporter 54, convey the transporter 54 toward the transmission station 104, receive the transporter 54 en route back from the transmission station 104, and lower the transporter 54 back to the first discharging level 101 for unloading of the transporter 54 out of the transmission station 104 by, for example, an AGV. The handling station 106 includes at least a portion of a transporter handler 110 that raises and lowers the transporter 54 and conveys the transporter 54 back and forth. The transporter handler 110 includes an elevator 112 located at the transporter handling station 106 and a conveyor 114 that cooperates with the elevator 112 and extends between the loading area and transmission station 104, with an upstream end at the transporter handling station 106 and a downstream end at the transmission station 104 and an intermediate portion at the rejection station 108. The elevator 112 raises and lowers the transporter 54 between the lower and upper levels of the discharging system 42, and the conveyor 114 conveys the transporter 54 back and forth to and from the transmission station 104 and to and from the rejection station 108 at the second discharging level 102 of the discharging system 42. The transporter handler 110 includes a vertical elevator axis E along which the elevator 112 operates, a horizontal conveyor axis C along which the conveyor 114 travels downstream and upstream, and a lateral or width axis W. As will be discussed in detail below, the elevator 112 and conveyor 114 cooperate to exchange the transporter 54 between the elevator 112 and the conveyor 114.

Figure 12:
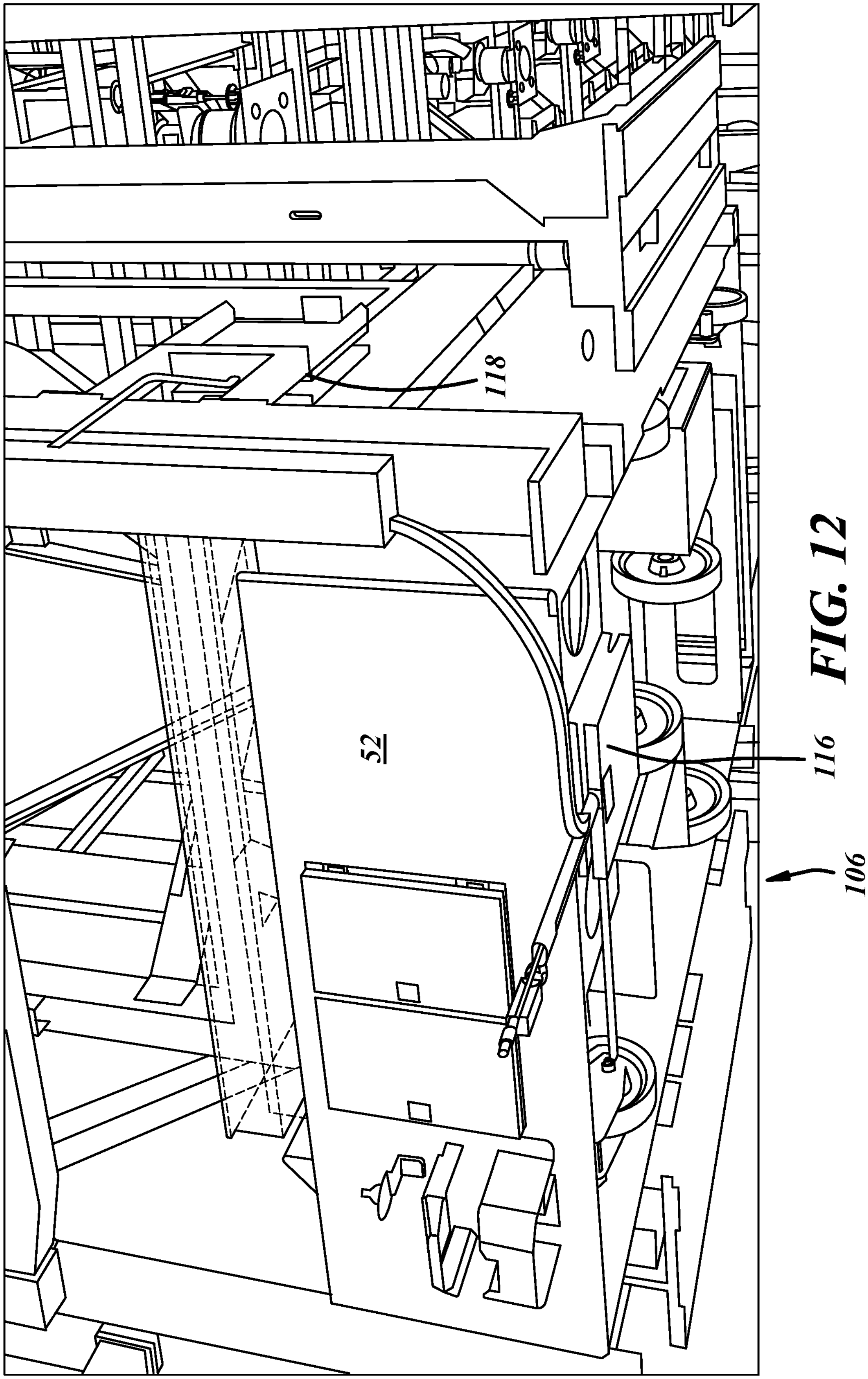
FIG. 12 is an enlarged fragmentary perspective view of a portion of a handling station of the bulk material discharging subsystem of FIG. 11A, showing chargers for an AGV and a weigh scale carried by the AGV.

With reference to FIG. 12, while the bulk material transport assembly 50 is located in the transporter handling station 106, the AGV 52 may be charged and/or the weigh scale may be charged. For example, the handling station 106 may include an AGV charger 116 that may be floor-mounted and located in a position that corresponds to an on-board AGV charger when the AGV 52 is in a transporter unloading/loading position. In another example, the transporter handling station 106 may include a scale charger 118 located in a position that corresponds to an on-board scale charger when the AGV is in the transporter unloading/loading position. The scale charger 118 may be mounted to a bracket coupled to a corresponding structural member of the rejection station 108 or to any other suitable nearby structure. Those of ordinary skill in the art would recognize that the chargers 116, 118 may be supplied with electrical power via wires or cables coupled to any suitable power source and in any suitable manner.

Figure 13A:
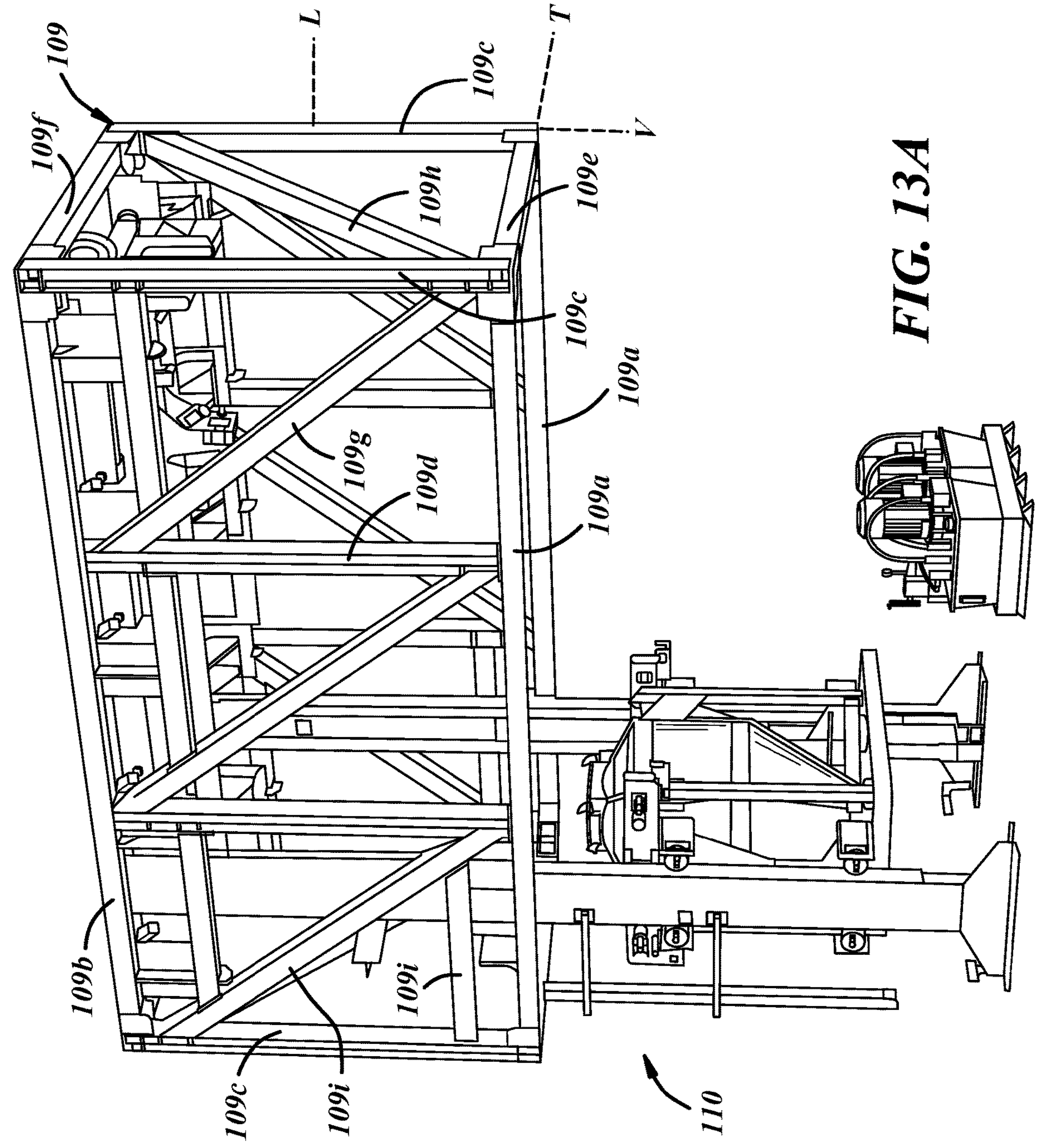
FIG. 13A is a perspective view of a transporter handler coupled to a modular frame.

With reference now to FIG. 13A, the transporter handler 110 may be coupled to a modular frame 109. The modular frame 109 is constructed as a rectangular box truss, having a longitudinal axis L, a transverse or lateral axis T, and a vertical axis V, and including lower beams **109*a* extending longitudinally, and being laterally opposed from one another, and upper beams 109*b* extending longitudinally, and being laterally opposed from one another. The frame 109 also includes posts 109*c,d* extending vertically between the lower and upper beams 109*a,b*. The posts 109*c,d* may include corner posts 109*c* extending vertically between ends of the lower and upper beams 109*a,b*, and intermediate posts 109*d* extending vertically between intermediate portions of the lower and upper beams 109*a,b* between the ends thereof. The frame 109 also includes lower end cross-members 109*e* extending laterally between the lower beams 109*a*, and upper end cross-members 109*f* extending laterally between the upper beams 109*b*. Although not shown, the frame 109 also may include lower intermediate cross-members extending between intermediate portions of the lower beams 109*a* between the ends thereof. The frame 109 may also include one or more struts 109*g,h* extending obliquely between the lower and upper beams 109*a,b*, for example, side struts 109*g* extending between lower and upper beams 109*a,b* on opposite lateral sides of the frame 109 and may be coupled to the beams 109*a,b* and/or posts 109*c,d*, and/or may include end struts 109*h* extending between lower and upper end cross-members 109*e,f* on one or both longitudinal ends of the frame 109. Moreover, the frame 109 further may include one or more braces 109*i* extending longitudinally between respective portions of one or more of the side struts 109*g* and respective portions of one or more of the posts 109*c,d*. The braces 109*i* may provide additional structure to carry portions of the elevator and the conveyor. More specifically, the elevator guides and the conveyor guides may be fastened or otherwise coupled to the braces 109*i***.

The modular frame 109 may share identical exterior dimensions with other modular frames of the system 10 and may be intramodular and intermodular, such that each of different types of modular frames of the system 10 are modular amongst their own kind and are additionally modular across different kinds. The intramodularity of the modular frames is by virtue of dimensions of respective frames being identical among their own kind. The intermodularity of the modular frames is by virtue of certain dimensions of the frames being the same. For example, some frames may have identical height and width, but different lengths. Such modularity facilitates scalability of the system 10 or portions thereof. Additionally, any given modular frame can be lengthened, for example, to add stations and corresponding equipment within each modular frame, or can be shortened, for instance, to omit stations and corresponding equipment.

Figure 13B:
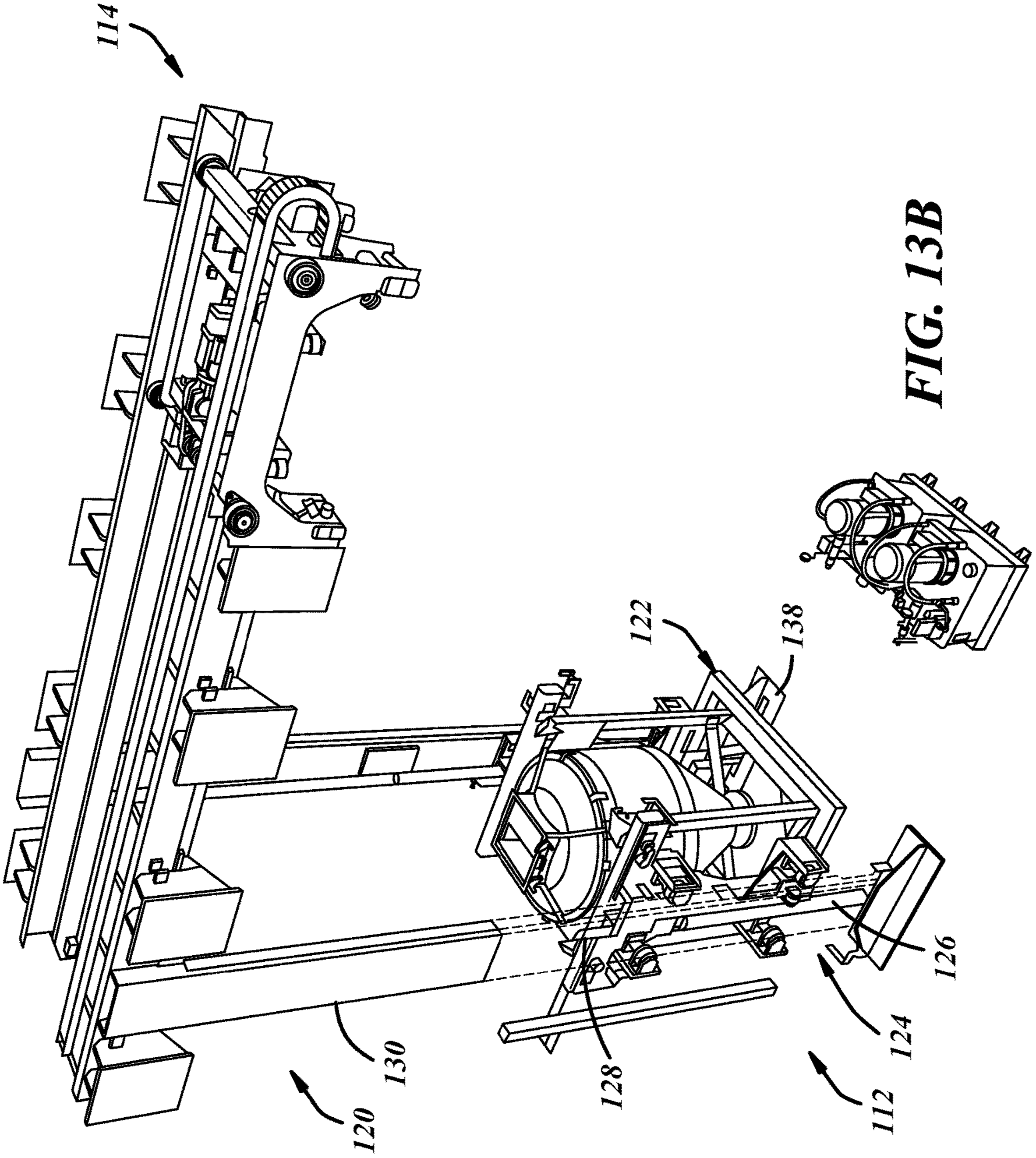
FIG. 13B is a perspective view of a transporter handler of the bulk material discharging subsystem of FIG. 11A, illustrating a conveyor and an elevator having an elevator carriage carrying a bulk material transporter.

With reference to FIG. 13B, the elevator 112 includes vertical guides 120, an elevator carriage 122 guided by the vertical guides 120, and one or more elevator actuators 124 operatively coupled to the elevator carriage 122 to raise and lower the elevator carriage 122 along the vertical guides 120. The elevator actuators 124 may include a set of hydraulic cylinders having cylinder housings 126 coupled to the vertical guides 120 and pistons 128 coupled to the elevator carriage 122.

Figure 14A:
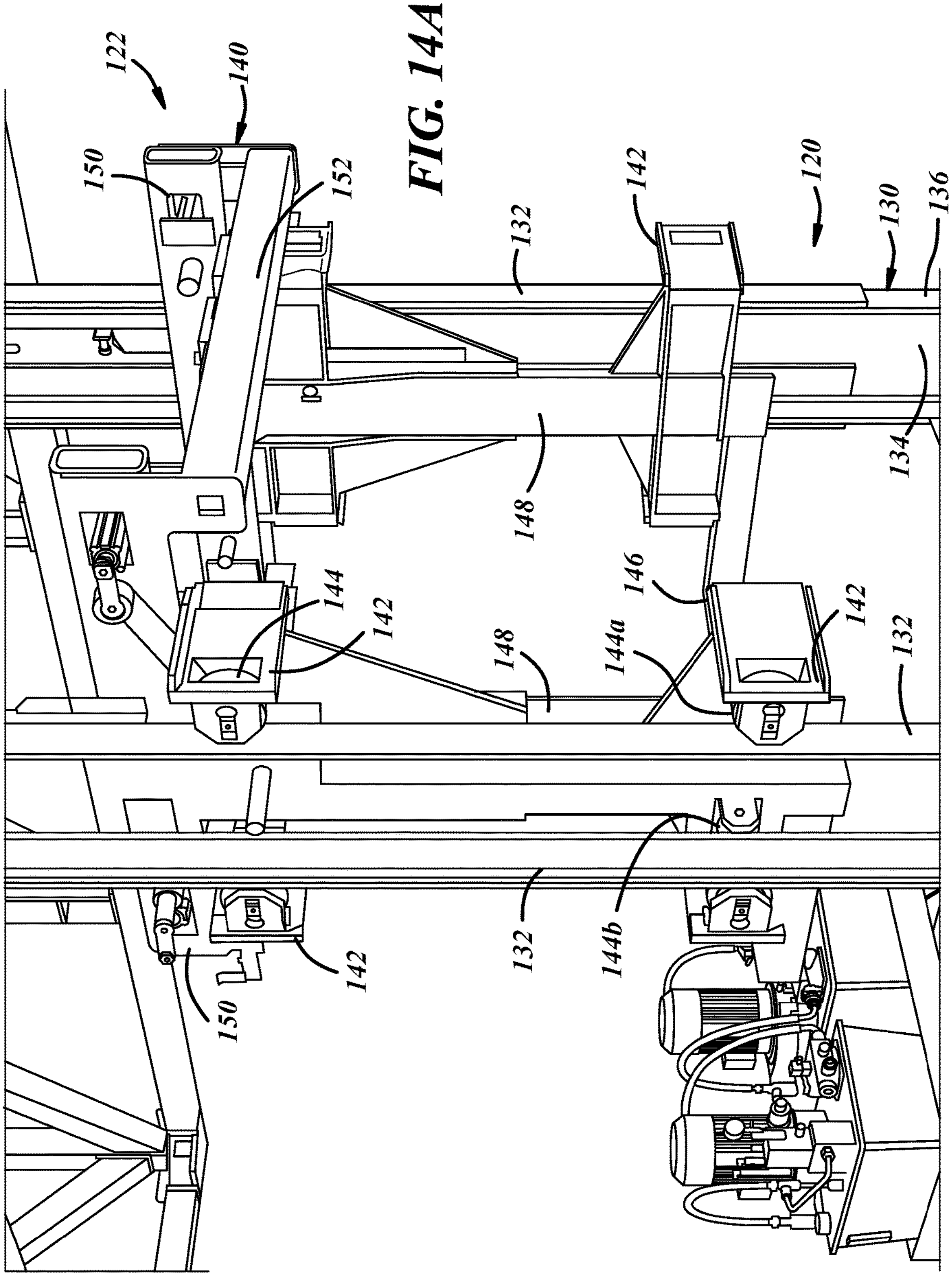
FIG. 14A is an enlarged fragmentary perspective view of the transporter handler of FIG. 13, illustrating the elevator carriage without the transporter.

With reference to FIG. 14A, the vertical guides 120 include beams 130 and wear rails 132 carried on the beams 130. The beams 130 may be C-shaped as shown, or I-shaped, or of any other suitable transverse cross-sectional shape and may have base walls 134 and flanges 136 that establish channels between the flanges 136. The channels may accommodate the hydraulic cylinders therein. The wearable rails may be composed of a wear-resistant polymeric material of any suitable type. Lower ends of the beams 130 may be coupled to feet 138 (FIG. 13B) that, in turn, are coupled to the foundation by fastening, staking, or in any other suitable manner. Upper ends of the beams 130 may be coupled to the interior portions of one or more of the lower and upper beams 109*a,b* (FIG. 13A) of the modular frame 109 by fastening, welding, or in any other suitable manner. The elevator 112 may include hydraulic power supplies to power the cylinders and, although not shown, may include suitable fluid hoses, fittings, and the like coupled between the power supplies and the cylinders.

With reference to FIG. 14A, the elevator carriage 122 includes a frame 140 including upper and lower sets of roller arms 142 at opposite lateral sides and configured to extend over upstream and downstream sides of the vertical guides 120 and carry upstream and downstream rollers 144*a* to engage corresponding wear rails 132 on the upstream and downstream sides of the vertical guides 120 and outboard facing rollers 144*b* to engage corresponding wear rails 132 on inboard facing surfaces of the vertical guides 120. The frame 140 also includes a lower transporter restraint rail 146 extending between lower sets of roller arms 142 on either side of the frame. The frame 140 further includes side walls 148 extending between and coupling together upper and lower sets of roller arms 142 on either side of the frame 140. The frame 140 additionally includes cradle arms 150 coupled to upper ends of the side walls 148 and connected together at an upstream end by an upper transporter restraint rail 152.

Figure 14B:
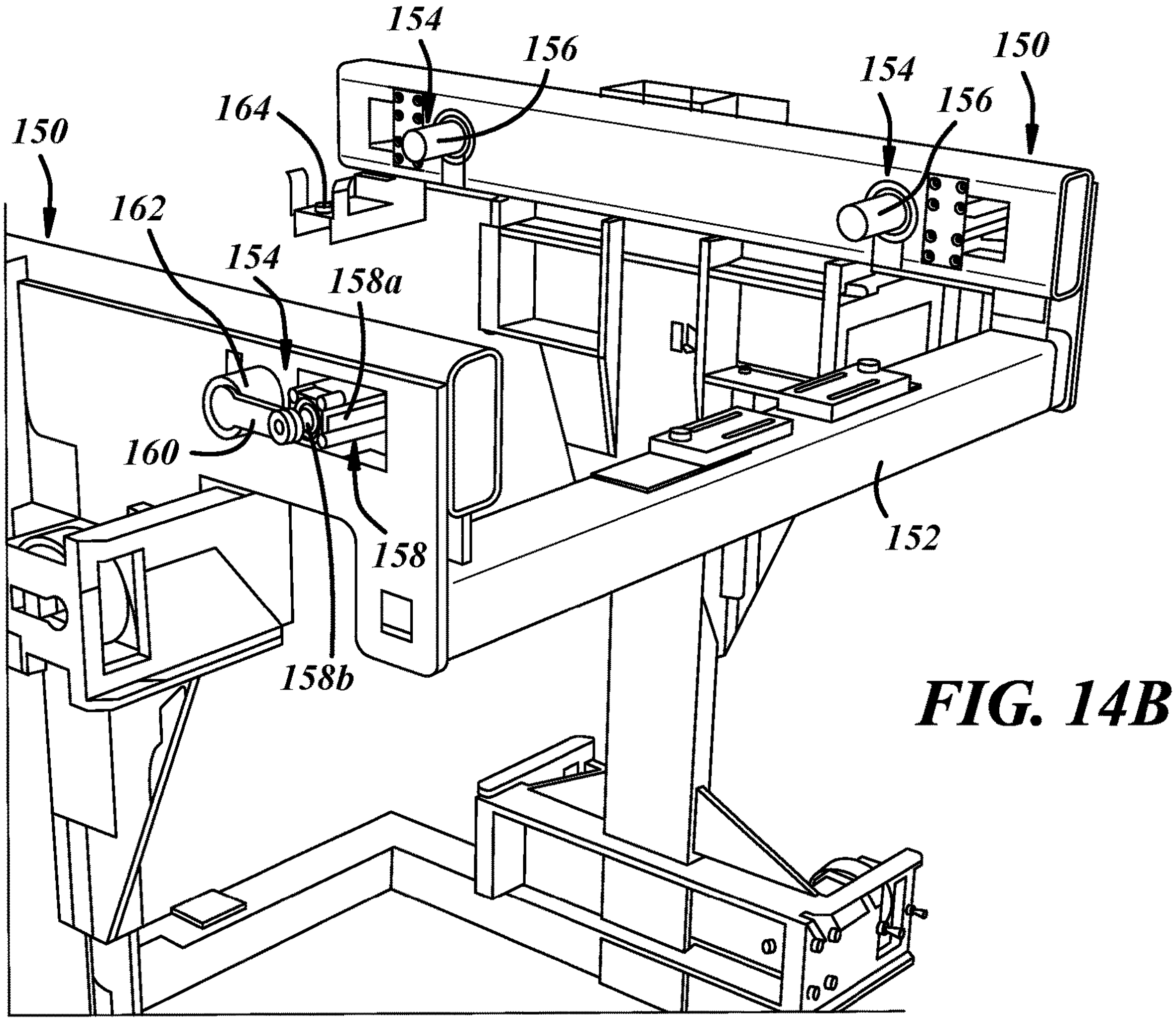
FIG. 14B is an enlarged fragmentary perspective view of the elevator carriage illustrated in FIG. 14A.
Figure 14C:
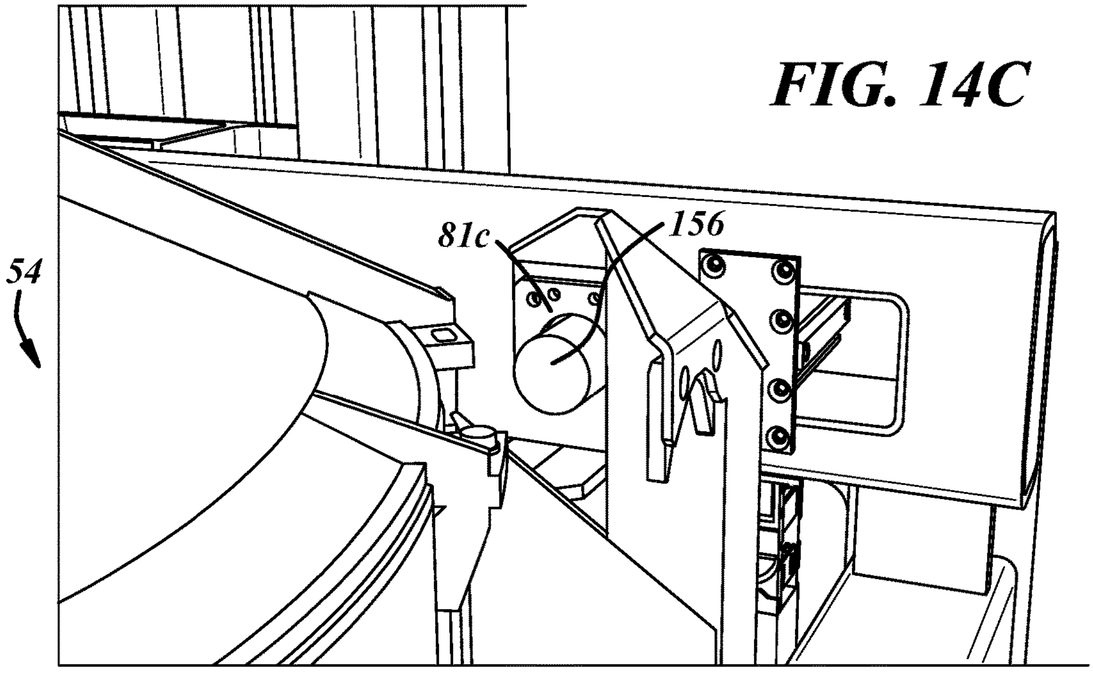
FIG. 14C is an enlarged fragmentary perspective view of the elevator carriage and the transporter illustrated in FIG. 13.

With reference now to FIG. 14B, the cradle arms 150 carry transporter couplings 154 configured to engage the corresponding carriage couplings of the bulk material transporter 54. The transporter couplings 154 are arranged proximate upstream and downstream ends of the cradle arms 150. The transporter couplings 154 include a first set of actuatable pins 156 that are actuatable into and out of engagement with the first set of hooks of the transporter 54. FIG. 14C, illustrates an example of engagement between one of the pins 156 and one of the transporter hooks 81*c*. As shown in FIG. 14B, the pins 156 may be actuated by pneumatic or hydraulic cylinders 158 having cylinder housings 158*a* coupled to the cradle arms 150 and pistons 158*b* extending out of the cylinder housings 158*a* in an outboard direction along the width axis, brackets 162 coupled to the pistons 158*b* and to the pins 156 and pin guide 162 coupled to outboard sides of the cradle arms 150. In other embodiments, the pins 162 may be actuated by electromechanical devices, for example, solenoids or the like. The elevator carriage 122 also may include one or more transporter sensors 164 that may be coupled to one or both cradle arms 150 by a bracket or in any suitable manner.

Figure 15A:
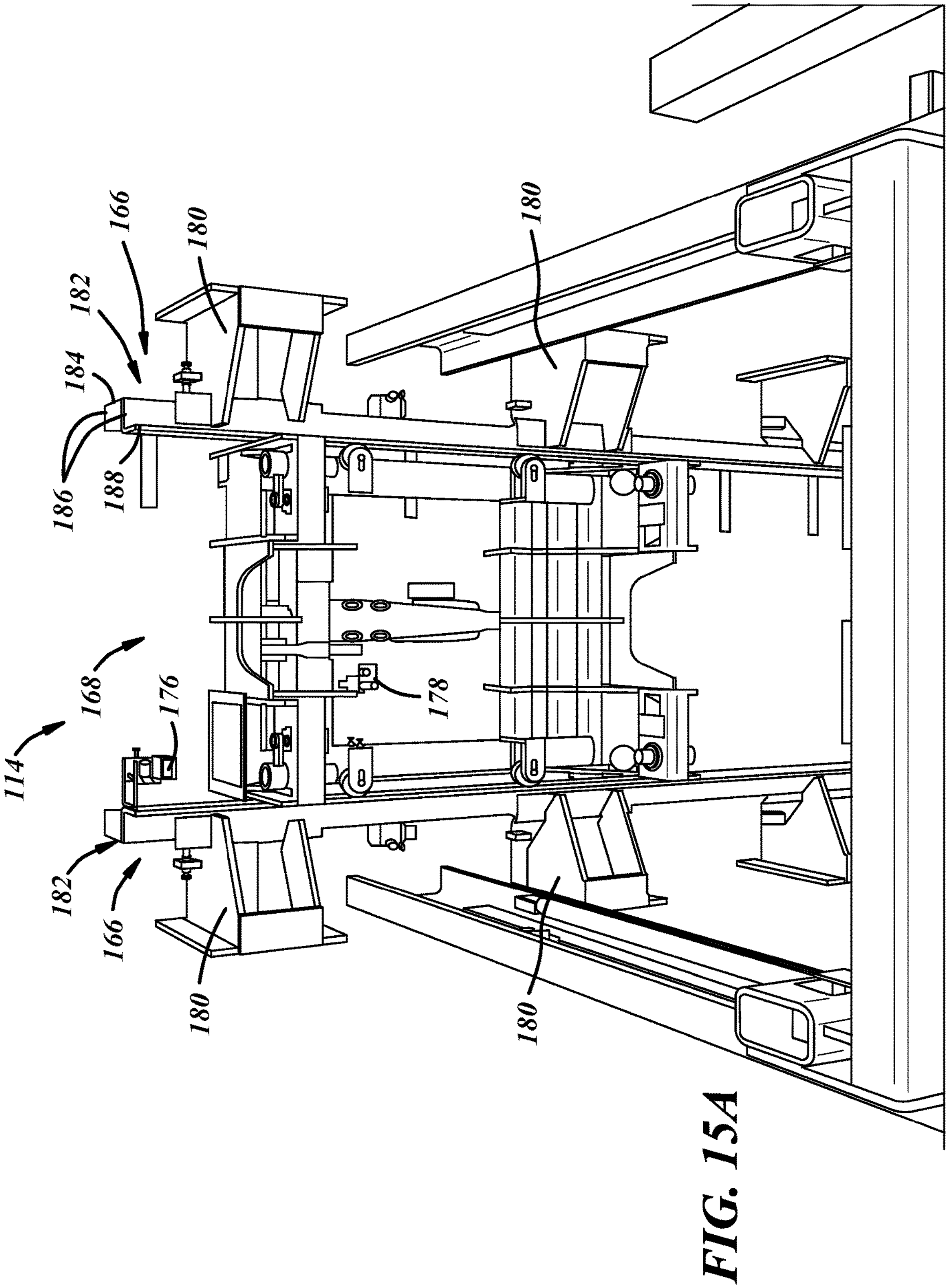
FIG. 15A is an enlarged fragmentary lower perspective view of a portion of the conveyor illustrated in FIG. 13, illustrating a conveyor carriage.
Figure 15B:
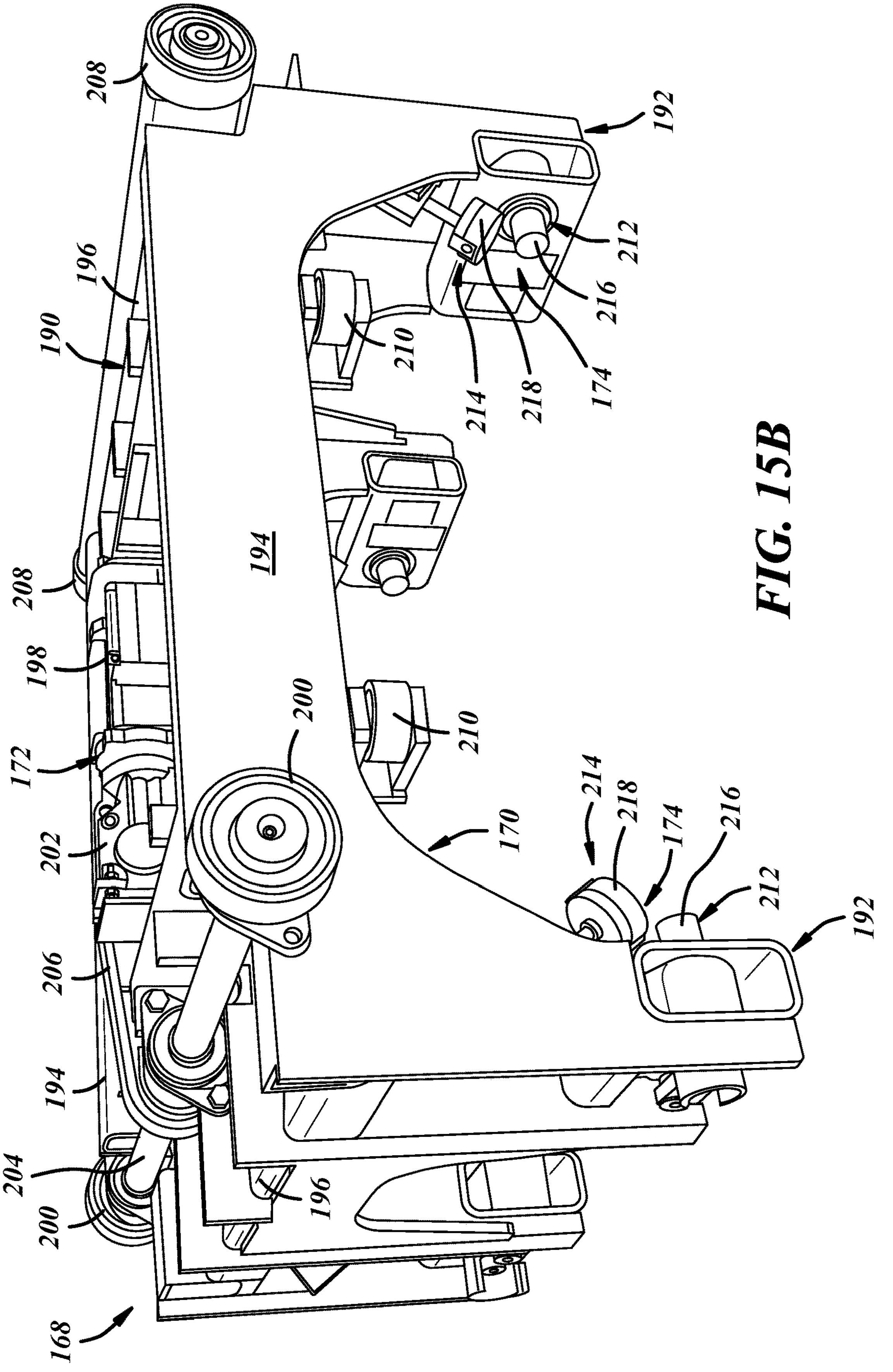
FIG. 15B is a further enlarged perspective view of the conveyor carriage of FIG. 15A.

With reference to FIGS. 15A-B, the conveyor 114 is operatively coupled with the elevator 112, and includes horizontal guides 166, and a conveyor carriage 168 guided by the horizontal guides 166 and including a frame 170, and a conveyor actuator 172 operatively coupled to the frame 170 and to the horizontal guides 166 to advance and retract the conveyor carriage 168 along the horizontal guides 166, and a second set of transporter couplings 174. The conveyor 114 also may include one or more conveyor carriage sensors 176 that may be carried by the horizontal guides 166 in any suitable manner, and/or one or more transporter sensors 178 that may be carried by the frame 170 of the conveyor carriage 168 in any suitable manner.

The horizontal guides 166 may be coupled to the modular frame 109 (FIG. 13A) and, more particularly, may be coupled to the modular frame 109 by brackets 180 extending laterally between the horizontal guides 166 and the modular frame 109 and coupled to interior portions of the upper beams of the modular frame 109. The horizontal guides 166 include beams 182 and wear rails (not shown) carried on the beams 182. The beams 182 may be C-shaped as shown, or I-shaped, or of any other suitable transverse cross-sectional shape and may have base walls 184 and flanges 186 that establish channels between the flanges 186, and vertically extending flanges 188.

With reference to FIG. 15B, the frame 170 generally includes a base 190, and cradle arms 192 depending downwardly at upstream and downstream portions of the base 190 on opposite lateral sides of the base 190 and configured to extend over corresponding portions of the transporter 54. More specifically, the base 190 may include side rails 194 that may be laterally spaced apart, and longitudinally extending, cross-members 196 extending laterally between the side rails 194. The base 190 may be a weldment constructed of various plates and tubing, or may be constructed in any other fashion suitable for lifting a bulk material transporter.

The conveyor actuator 172 may include a motor 198 carried by the frame 170, one or more suspension drive rollers 200 rotatably coupled to the frame 170 about a horizontal axis and operatively coupled to the motor 198, a transmission 202 coupled to the motor 198 and coupled to the driver roller(s) 200 via a drive shaft 204 and a belt 206 or a chain, or the like coupled to the drive shaft 204 and to the transmission 202. The suspension drive rollers 200 cooperate with corresponding portions of the horizontal guides 166, for example, lower horizontal flanges of the beams 182 inside the channels of the beams 182. Similarly, the conveyor carriage 168 may include suspension guide rollers 208 that may be rotatable about a forward or downstream horizontal axis and coupled proximate a downstream end of the frame 170. For example, two laterally opposed passive rollers 208 may be provided at a front or downstream end of the frame 170, and two laterally opposed drive rollers 200 may be provided at a rear or downstream end of the frame 170 although the passive and drive rollers 208,200 could be swapped between front and rear, or all the rollers could be drive rollers. Additionally, the conveyor carriage 168 may include lateral stabilization guide rollers 210 that may be rotatable about vertical axes and coupled to the frame 170 at sides of the frame 170 to cooperate with corresponding portions of the horizontal guides 166, for example, the vertical flanges 188 of the beams 182.

Figure 15C:
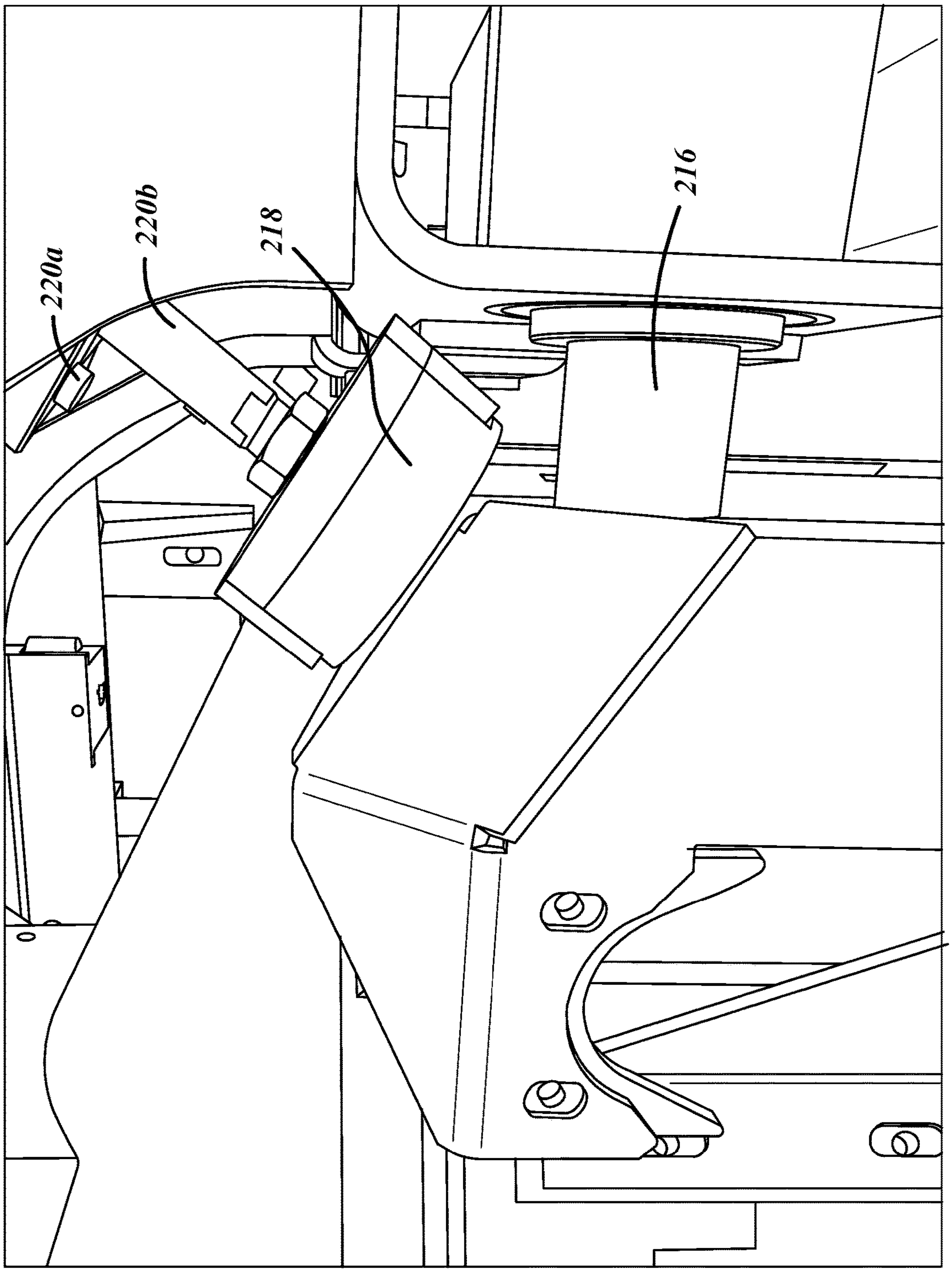
FIG. 15C is a fragmentary perspective view of a stabilizer coupling and a suspension coupling coupled to a corresponding portion of a bulk material transporter.
Figure 15D:
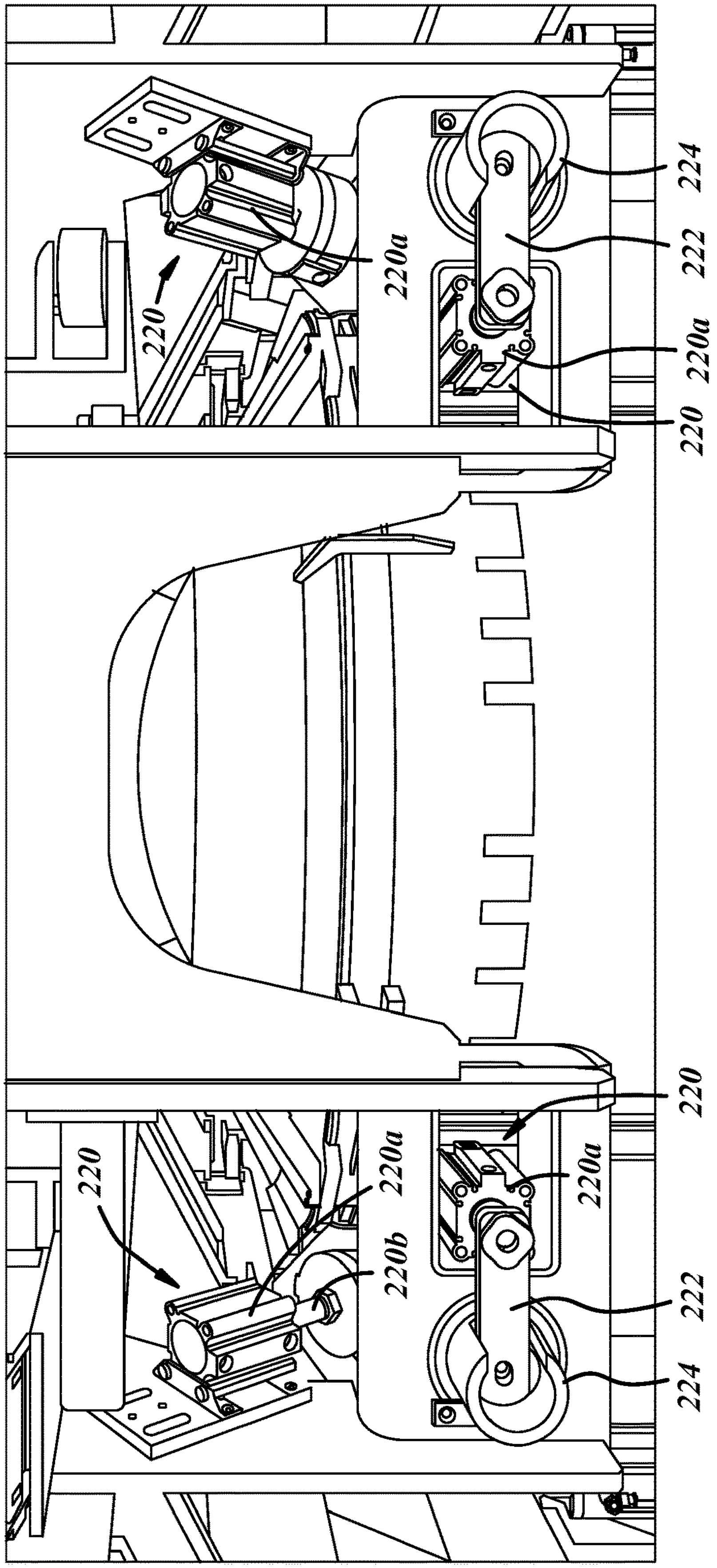
FIG. 15D is a fragmentary perspective end view of the conveyor carriage carrying a transporter, illustrating transporter couplings.
Figure 15E:
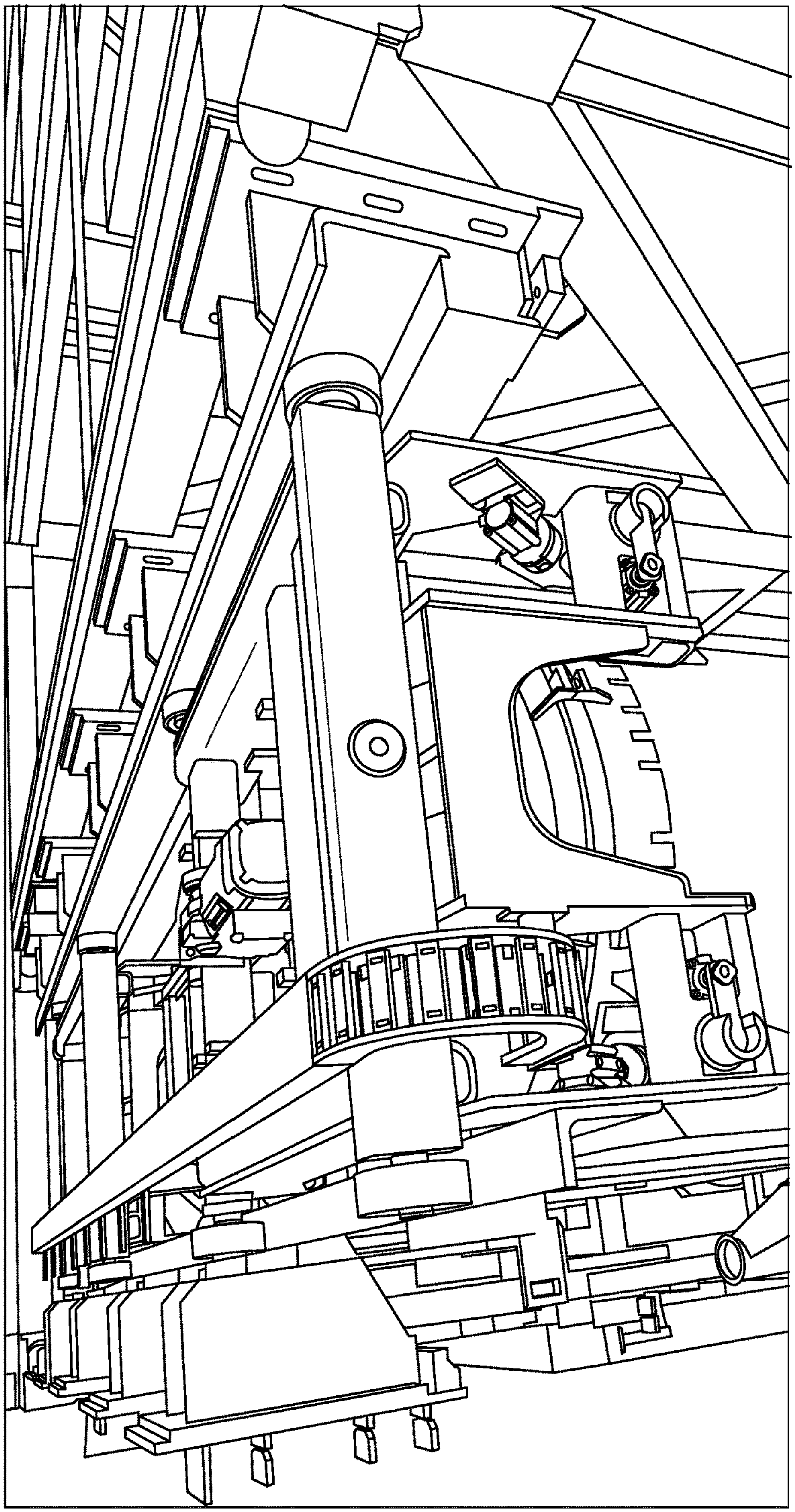
FIG. 15E is another fragmentary perspective view of the conveyor carriage and transporter of FIG. 15D, illustrating transporter couplings.

The transporter couplings may include suspension couplings 212 and also may include stabilization couplings 214. The suspension couplings 212 are configured to suspend the transporter 54 from the frame 170 of the conveyor carriage 168, and may include, for example, a second set of actuatable pins 216 carried by the conveyor carriage frame 170 and actuatable along a longitudinal axis. The suspension couplings 212 are arranged proximate upstream and downstream ends of the cradle arms 192. The actuatable pins 216 are actuatable into and out of engagement with the second set of hooks of the transporter 54. The stabilization couplings 214 are configured to stabilize the transporter 54 when the suspension couplings 212 are coupled to the transporter 54, and may include, for instance, one or more stabilizer pads 218 carried by the conveyor carriage frame 170 and actuatable along an oblique axis. More specifically, the stabilization couplings 214 may include four transporter stabilizers, one proximate each inside corner of the conveyor carriage frame 170, and configured to be actuatable into and out of engagement with obliquely angled surfaces of the carriage couplings of the transporter 54. FIG. 15C, illustrates an example of engagement between one of the pins 216 and one of the transporter hooks. As shown in FIGS. 15D and 15E, the pins 216 may be actuated by pneumatic or hydraulic cylinders 220 having cylinder housings 220*a* coupled to the cradle arms 192 and pistons 220*b* extending out of the cylinder housings 220*a* in a longitudinal direction along the horizontal conveyor axis C, brackets 222 coupled to the pistons 220*b* and to the pins 216 and pin guides 224 coupled to outboard sides of the cradle arms 192. In other embodiments, the pins 216 may be actuated by electromechanical devices, for example, solenoids or the like, or by any other suitable actuators. The stabilizer pads 218 may be actuated by pneumatic or hydraulic cylinders 220 having cylinder housings 220*a* coupled to the cradle arms 192 and pistons 220*b* extending out of the cylinder housings 220*a* in an oblique direction relative to the longitudinal and lateral axes of the conveyor 114.

Figure 16:
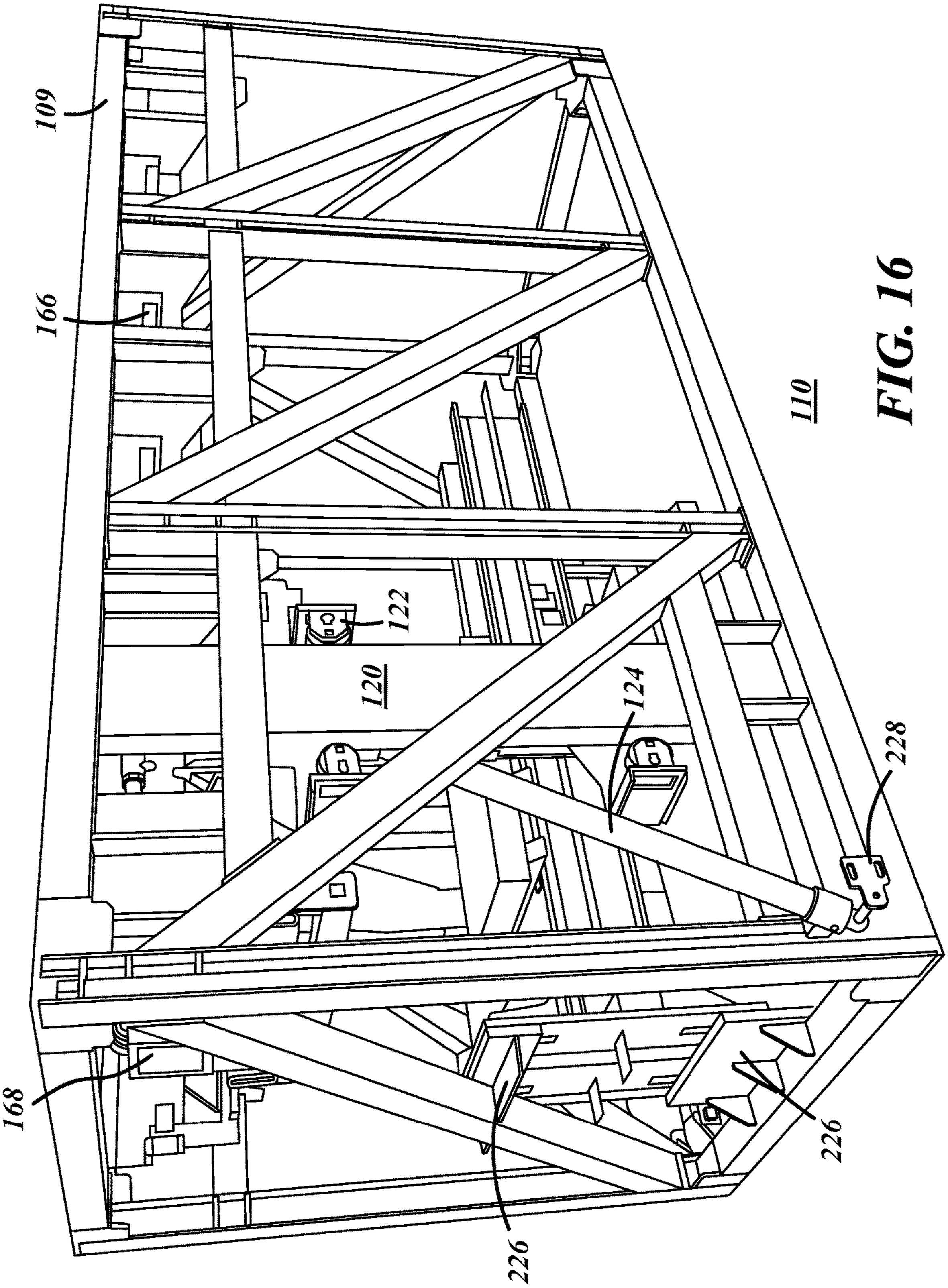
FIG. 16 is a perspective view of a transporter handler module including the modular frame carrying the transporter handler illustrated in FIG. 13B.

With reference now to FIG. 16, a transporter handler module or the transporter handler 110 includes the modular frame 109, and the transporter handler 110 including the vertical and horizontal guides 120, 166, the elevator carriage 122, the conveyor carriage 168, the elevator actuators 124, the conveyor actuator (not shown), all carried within the modular frame 109 during shipment to an application site. For this purpose, the modular frame 109 additionally may include any suitable bracketry, couplings (e.g. fasteners or straps), and the like to secure the various portions of the transporter handler 110 to the frame 109. For example, the modular frame 109 may include elevator guide brackets 226 coupled to the modular frame 109 and to the elevator guides 120, and elevator actuator brackets 228 coupled to the modular frame 109 and to the actuators 124. The modular frame 109 may have exterior dimensions less than or equal to exterior dimensions of an intermodal freight container, more specifically, a height less than or equal to 9' 6" (2.896 m), a width less than or equal to 8' 6" (2.591 m), and a length less than or equal to 20' (6.096 m).

Figure 18A:
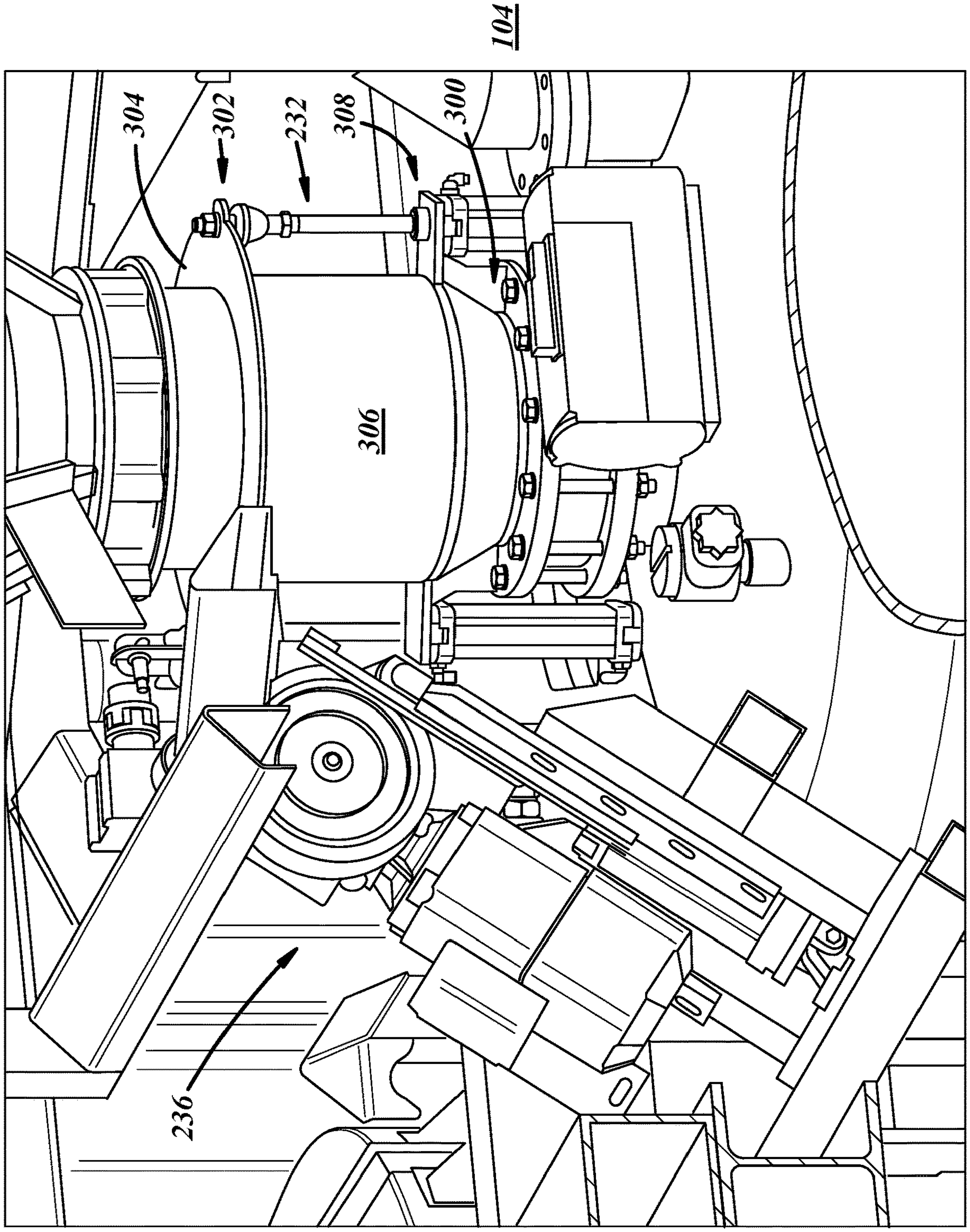
FIG. 18A is a fragmentary upper perspective view of a transporter closure actuator.

With reference again to FIG. 11B, the bulk material transmission station 104 generally includes a transmitting vessel 230 to receive, hold, and release bulk material, an inlet dock 232 in communication with a vessel inlet 242 to facilitate communication with the bulk material transporter 54, and pneumatic transmission conduit 234 to receive bulk material from the transmitting vessel 230 and facilitate transmission of the bulk material out of the system. With reference to FIG. 18A, the transmission station 104 also may include a transporter closure driver 236 to facilitate release of bulk material out of the transporter 54 and into the transmitting vessel 230, and, with reference to FIG. 19B, a transporter massaging apparatus 238 that massages sidewalls of the transporter to coax bulk material out of the transporter.

Figure 17A:
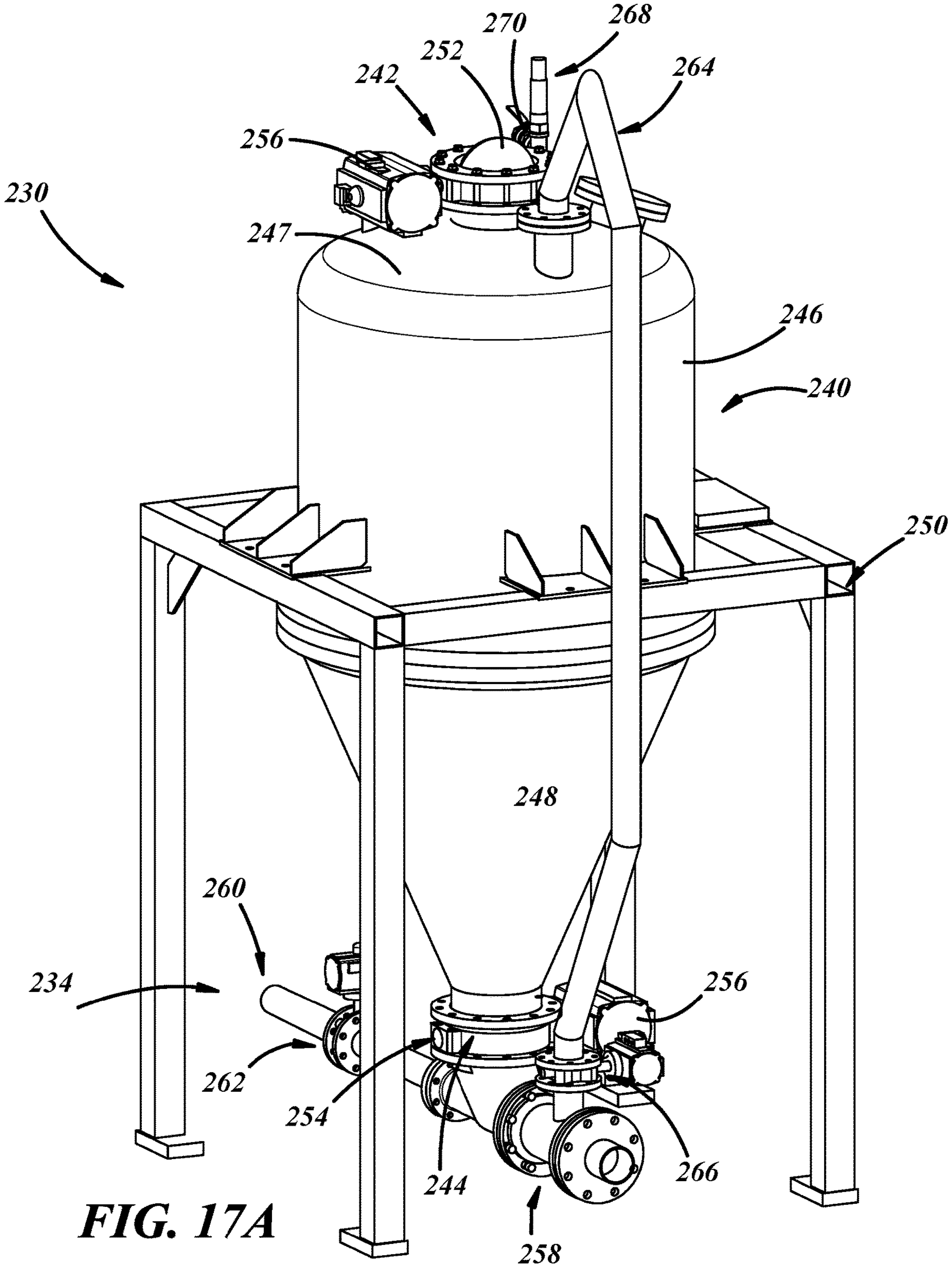
FIG. 17A is an enlarged perspective view of a transmitting vessel and related equipment of the bulk material discharging system of FIGS. 11A and 11B.

With reference now to FIG. 17A, the transmitting vessel 230 may include a body 240 having the vessel inlet 242 configured to receive bulk material from an outlet of the transporter 54 and a vessel outlet 244 to transmit bulk material out of the transmitting vessel 230. The body 240 may have a cylindrical upper portion 246 with a domed upper end 247 that may have the vessel inlet 242, and a lower hopper portion 248 that may have the vessel outlet 244. The lower hopper portion 248 may be a fluidization cone to assist with movement and transmission of bulk material. The transmitting vessel 230 may be suspended by a frame 250 on the foundation 14, or may be suspended in any other manner. The transmitting vessel 230 may include a vessel inlet valve or closure 252 to selectively seal the vessel inlet 242, and a vessel outlet valve or closure 254 to selectively seal the vessel outlet 244. The closures 252, 254 may include actuators 256, which may be electrically, pneumatically, or hydraulically powered to move one or more valves or other valve or closure elements. The transmitting vessel 230 may be pressurizable and the vessel inlet 242 sealingly closeable such that the transmitting vessel 230 may be used to assist with pressurized pneumatic transmission of bulk material out of the system. Accordingly, the transmitting vessel 230 may have an interior that is volumetrically larger than that of the transporter 54 so as to define a sealable pressurizable headspace.

With continued reference to FIG. 17A, the pneumatic transmission conduit 234 includes a station outlet conduit 258 in downstream fluid communication with the vessel outlet 244 to receive bulk material from the vessel outlet 244, and a station outlet pressurization conduit 260 in fluid communication with the station outlet conduit 258 to pressurize the station outlet conduit 258 for pneumatic transmission of the bulk material through the station outlet conduit 258, and a station outlet pressurization closure or valve 262 that may be upstream of the vessel outlet 244 to open, close, or otherwise regulate flow through, the station outlet pressurization conduit 260. The pneumatic transmission conduit 234 further includes a vessel vent conduit 264 in fluid communication between an interior of the station outlet conduit 258 and an upper portion of an interior of the transmitting vessel 230, and a vessel vent conduit closure or valve 266 to close, open, and otherwise regulate flow through, the vessel vent conduit 264. The pneumatic transmission conduit 234 additionally includes a vessel pressurization conduit 268 in fluid communication with the upper portion of the interior of the transmitting vessel 230, and a vessel pressurization conduit closure valve 270 to open, close, and otherwise regulate flow through, the vessel pressurization conduit 268. The transmission station 104 is operated to transmit bulk material according to the following sequencing: a) pressurizing, wherein the inlet closure 252 is closed, the vent conduit valve is closed, and the vessel pressurization conduit valve 270 is opened; b) transmitting, wherein the station outlet pressurization valve 262 is opened to transmit bulk material out of the station outlet conduit 258; and venting, wherein the vessel pressurization conduit valve 270 is closed, the vessel outlet closure 254 is closed, the vent conduit valve is opened.

Figure 17B:
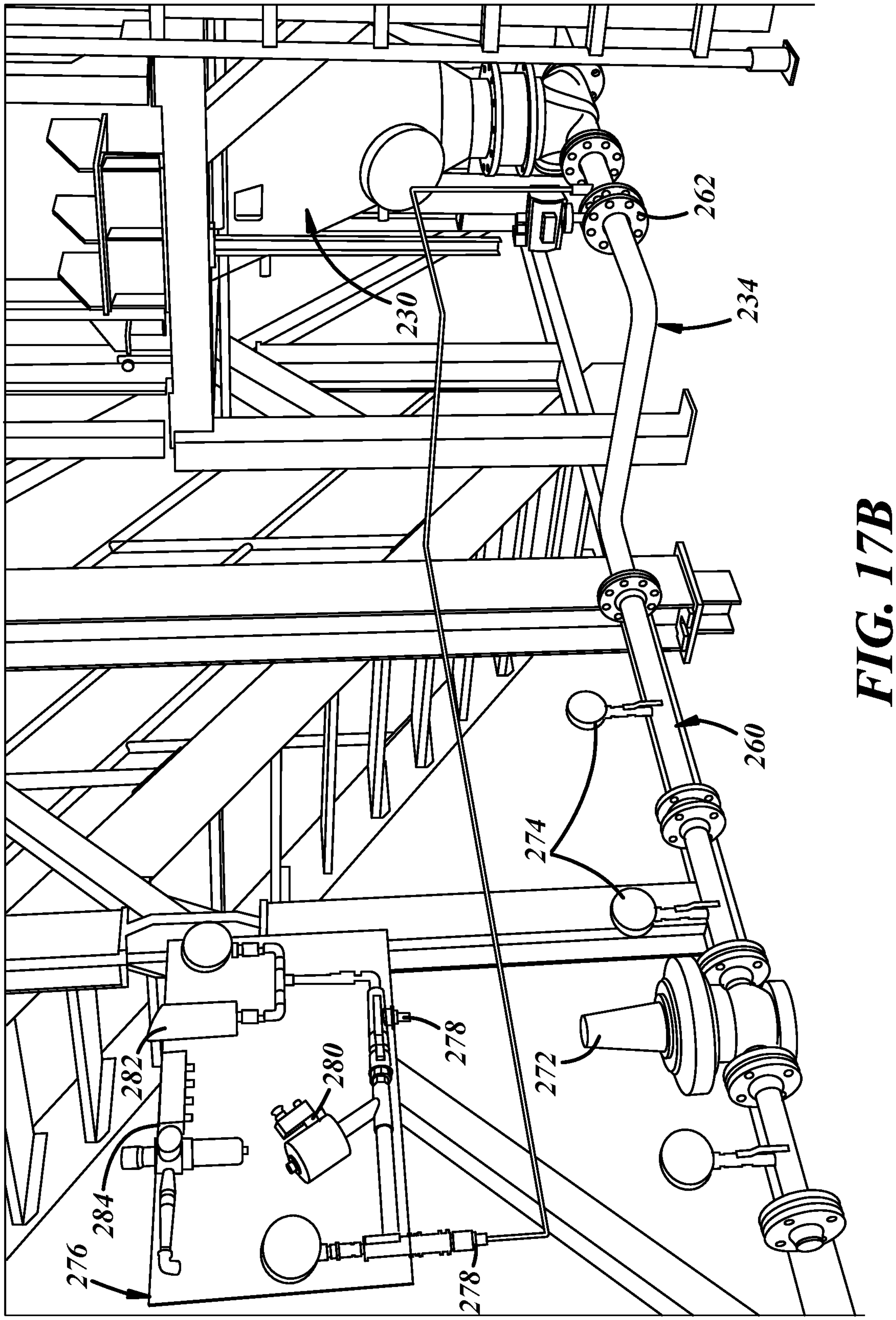
FIG. 17B is a fragmentary perspective view of a portion of the transmitting vessel and related equipment of FIG. 19A, and illustrating a pneumatic supply line and equipment in communication therewith.

With reference now to FIG. 17B, the station outlet pressurization conduit 260 may be coupled to a pressurized airline, which may be powered by a plant-wide compressor, a local system compressor, or by any other suitable apparatus (not shown). The conduit 260 may include a pressure and flow regulator 272 as well as one or more pressure gauges 274 for monitoring pressure as the conveying pressure is regulated to ensure the bulk material does not clog the transmission line. The station outlet pressurization valve 262 is downstream of the regulator 272. A fluidization control panel 276 is coupled with the outlet pressurization conduit 260 downstream from the pressurization valve 262. An air inlet 278 of the panel is pressurized by the same source as the station outlet pressurization conduit 260. A fluidization control valve 280 opens and closes, depending on whether the transmitting vessel requires fluidization. A pressure sensor 282 is in communication with a controller that monitors pressure at the panel 276. A manifold 284 provides air to pneumatically controlled valves of the panel 276. Based on monitored pressure in the pressurization conduit 260, which will rise and fall based on whether or not downstream bulk material begins to obstruct the transmission conduit 234, the control panel 276 operates to periodically pressurize the fluidization portion of the transmitting vessel 230 to break up the material near the outlet 244 and keep the bulk material moving through the transmission conduit. The resulting bulk material flow in the transmission conduit is in a state between dense phase conveying and dilute phase conveying. It is higher pressure and lower velocity than dilute phase conveying, but the velocity is maintained sufficiently high to prevent the bulk material in the transmission conduit from being packed together as dense slugs of material, thus striking a balance between reducing wear in the transmission conduit (via lower velocity) and the complexity of a true dense phase conveying system in which boost pressure points are often needed along the full-length of the transmission conduit.

With reference now to FIG. 18A, the transmission station inlet dock 232 is shown in communication with the vessel inlet 242 and includes a fixed portion 300 fixed to the transmitting vessel 230 at the vessel inlet 242 thereof, and a movable portion 302 movable away from the transmitting vessel 230 and configured to dock with the outlet of the bulk material transporter 54. The movable portion 302 includes an inlet flange 304 configured to be engageable with the outlet of the bulk material transporter 54, a collapsible conduit 306 extending between the inlet flange 304 and the fixed portion 300, and at least one actuator 308 to move the movable portion 302. When the transporter 54 is in a position suitable to release bulk material into the transmitting vessel 230, the actuator 308 may be activated to move the inlet flange 304 against the outlet of the transporter 54 and then the transporter outlet valve may be opened.

Figure 18B:
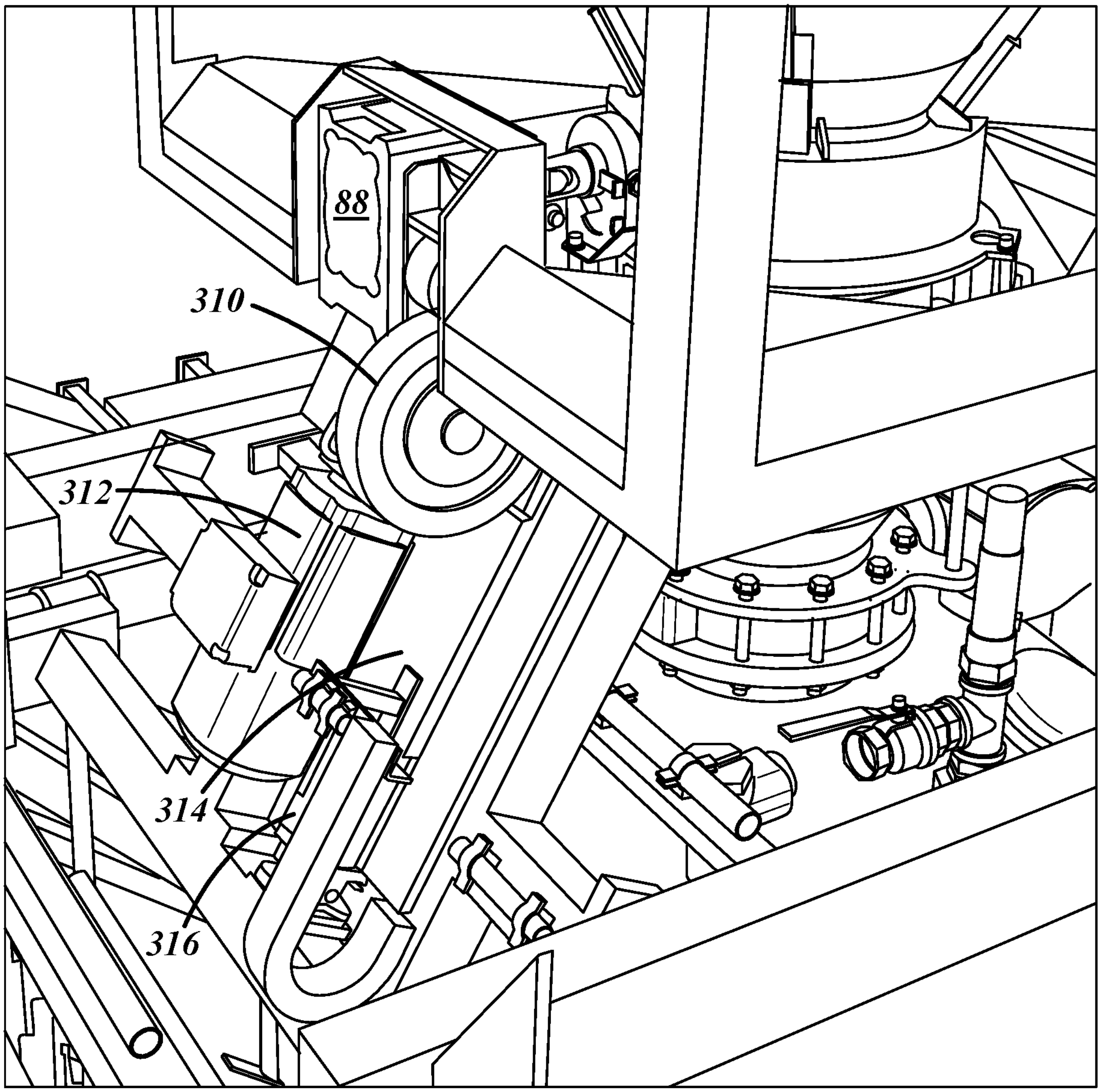
FIG. 18B is another fragmentary upper perspective view of the transporter closure actuator of FIG. 18A.
Figure 18C:
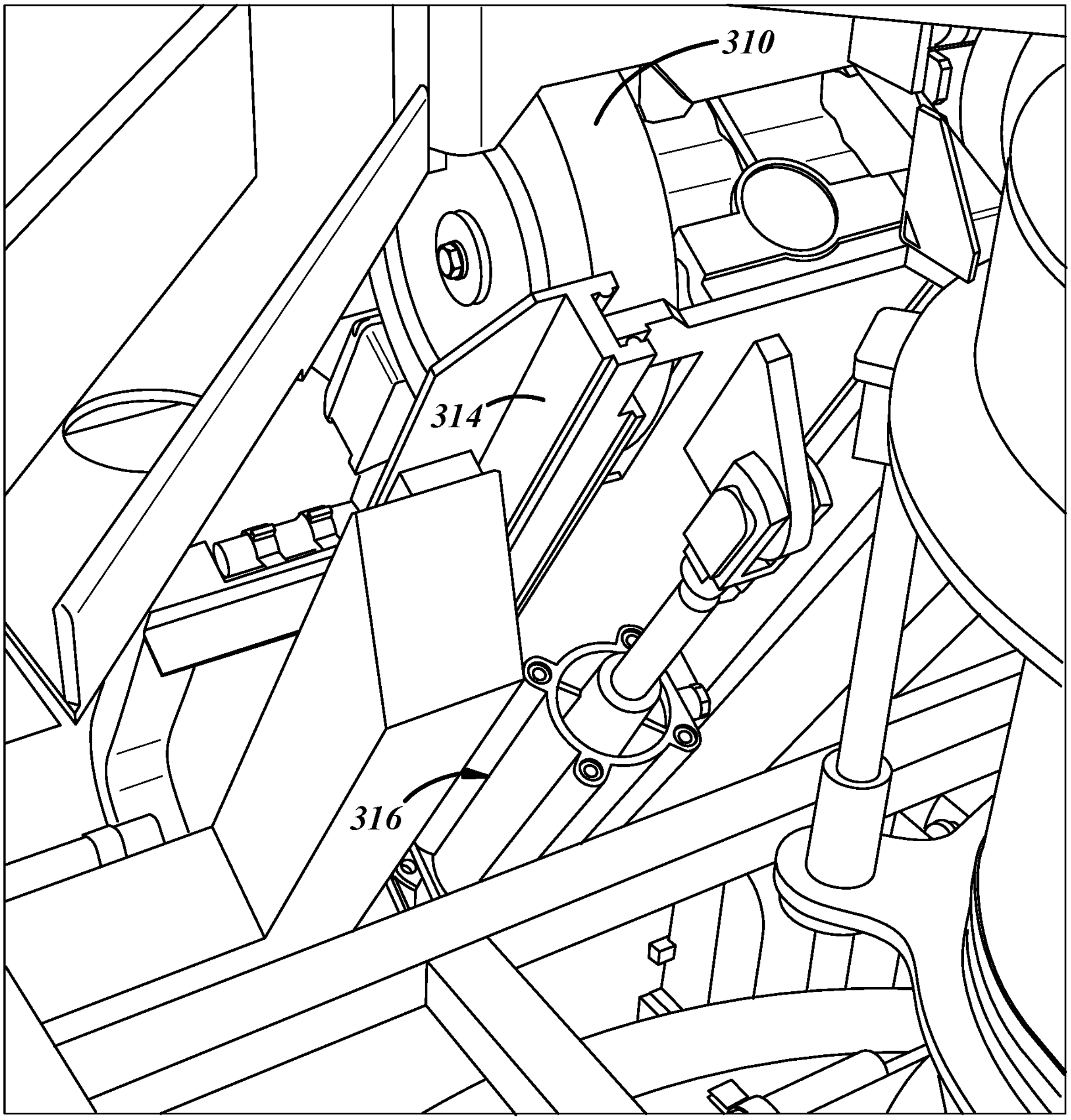
FIG. 18C is a fragmentary perspective view, from another angle, of the transporter closure actuator of FIG. 18A.
Figure 18D:
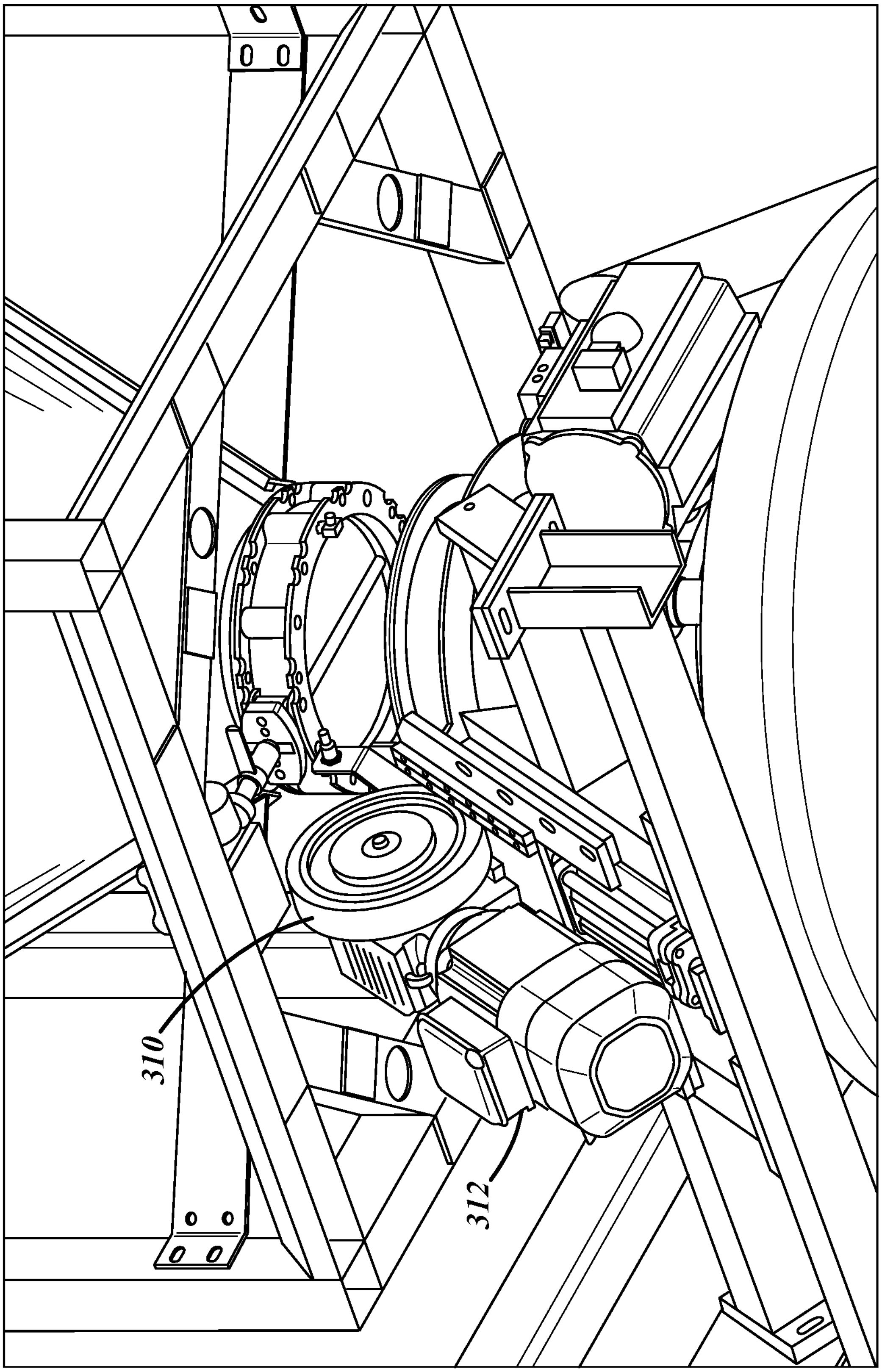
FIG. 18D is a fragmentary lower perspective view of the transporter closure actuator of FIG. 18A, illustrating the actuator in a disengaged state.
Figure 18E:
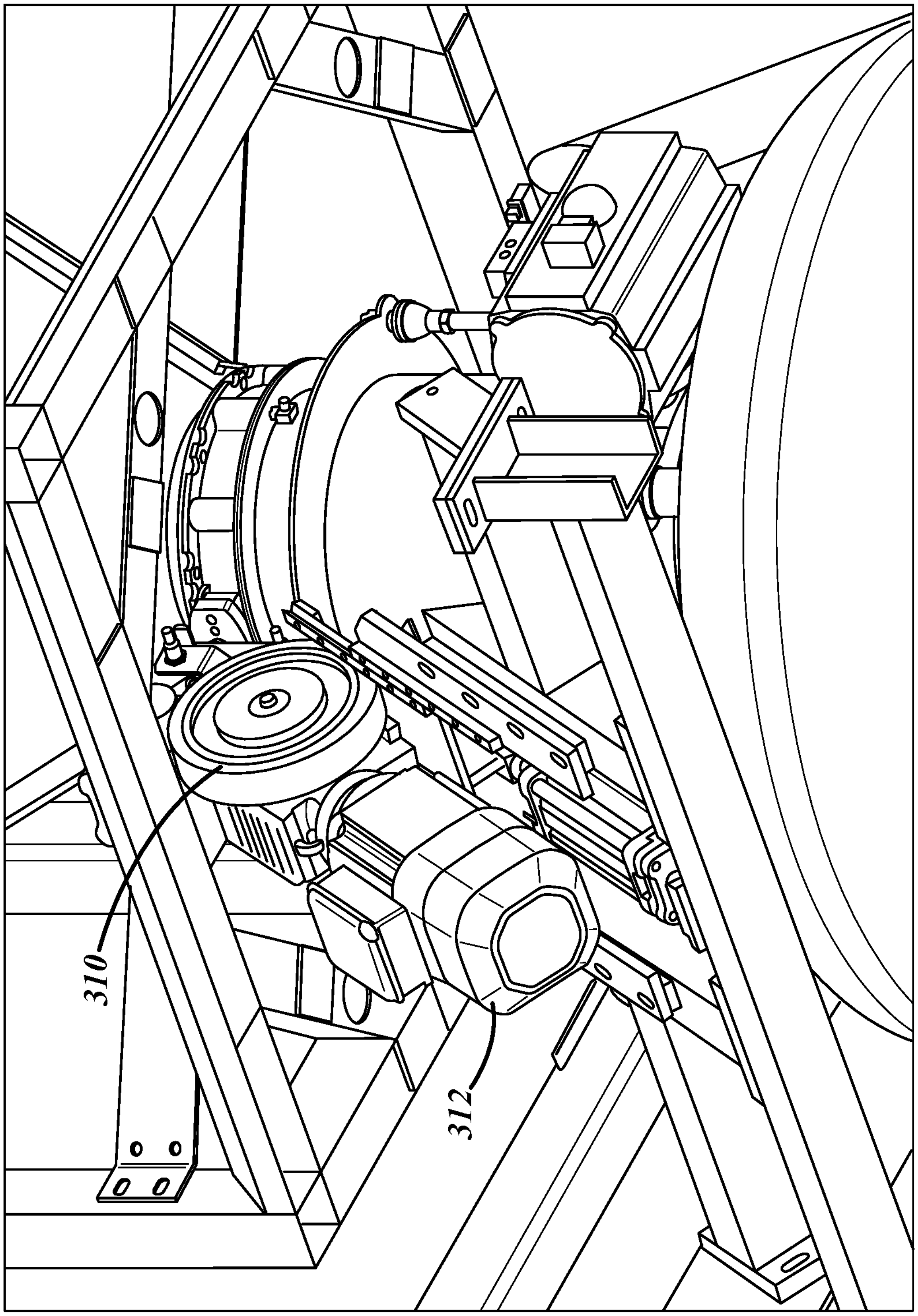
FIG. 18E is a fragmentary lower perspective view of the transporter closure actuator of FIG. 18A, illustrating the actuator in an engaged state.

With reference to FIGS. 18A and 18B, the transporter closure driver 236 is configured to drive the transmission 88 at the outlet of the transporter 54 from a closed state to an open state to release bulk material from the transporter 54 into the transmitting vessel 230. The closure driver 236 includes a drive wheel 310, and a motor 312 coupled to the drive wheel 310 to rotate the drive wheel 310. With additional reference to FIG. 18C, a motor carrier 314 carries the motor 312 and is translatable, and a motor carrier actuator 316 is coupled to the motor carrier 314 and is configured to translate the motor carrier 314, the motor 312, and the drive wheel 310 into and out of engagement with the driven closure 236 of the transporter 54, as depicted in FIGS. 18D and 18E.

Figure 19A:
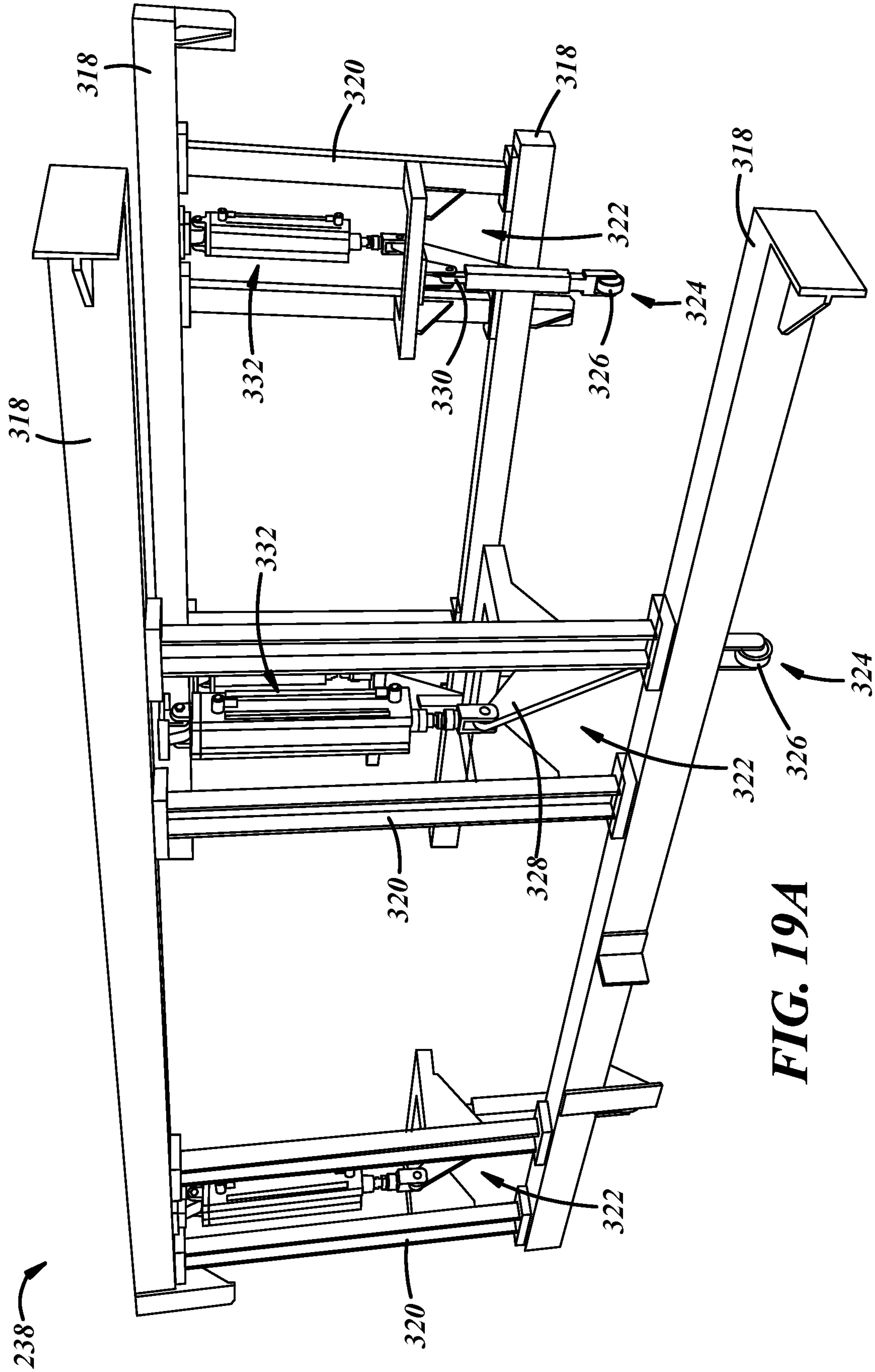
FIG. 19A is an enlarged perspective view of a transporter massager of the bulk material discharging system of FIG. 11A.
Figure 19B:
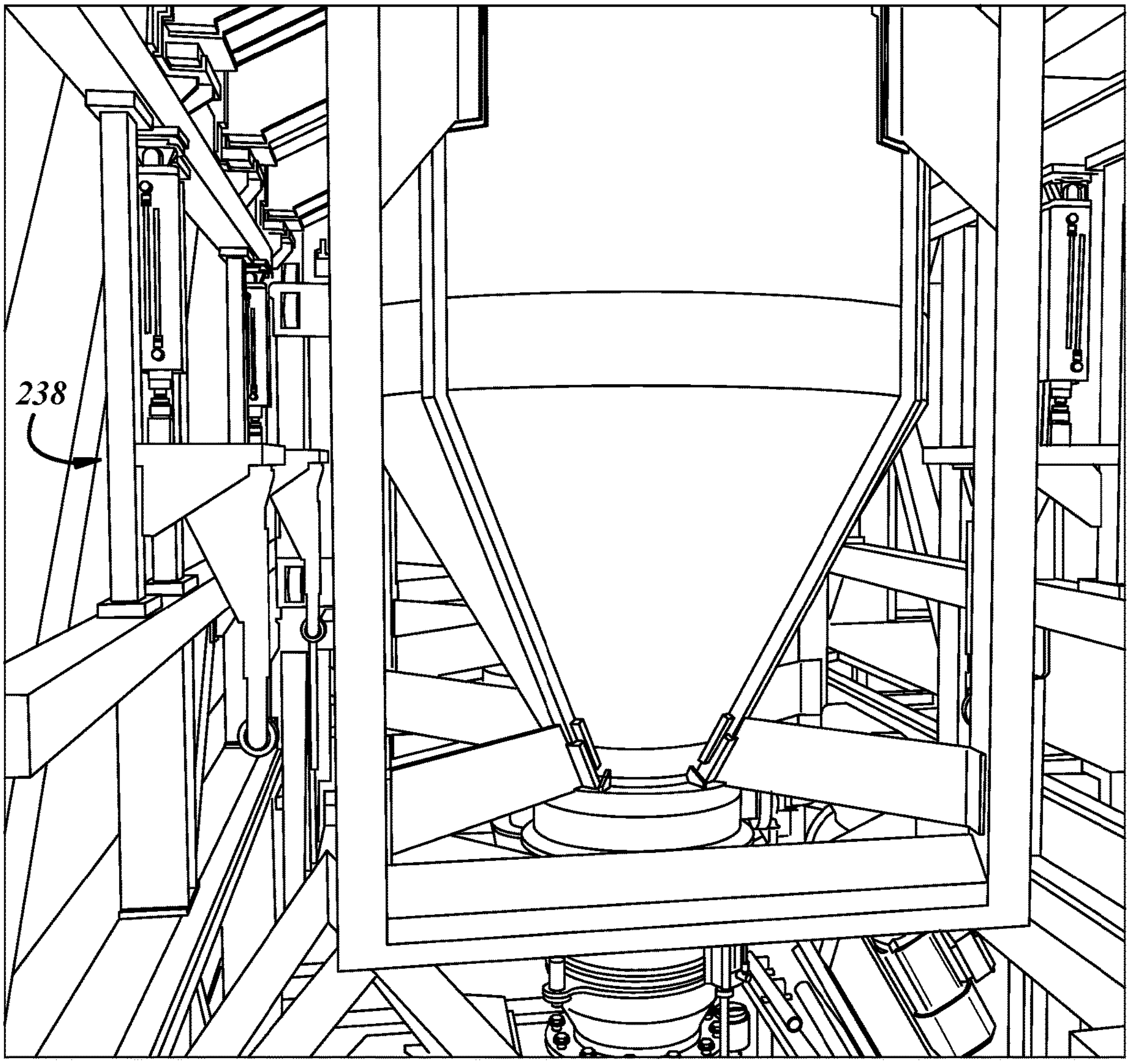
FIG. 19B is a fragmentary perspective view of a transmission station of the bulk material discharging system of FIG. 11A, illustrating the transporter massager of FIG. 19A adjacent to the transporter of FIG. 11A.

With reference now to FIGS. 19A and 19B, the transporter massaging apparatus 238 may be coupled to the modular frame 109 (FIG. 13A) and may include upper and lower mounting rails 318 on either side of the conveyor axis that may be coupled to the modular frame 109, and massager mounts 320 coupled between the upper and lower mounting rails 318 on either side of the conveyor axis. The apparatus includes massagers 322 that may be pivotably mounted to the mounts and having massaging ends 324 that may carry rollers 326, actuator ends 328, and pivots 330 pivotably mounted to horizontal portions of the massager mounts 320. The transporter massaging apparatus 238 also includes actuators 332 to move the massagers 322 into and out of engagement with the sidewalls of the transporter 54 and in massaging engagement with the transporter sidewalls to coax bulk material out of the transporter 54 during releasing of bulk material therefrom into the transmitting vessel 230. More specifically, the massagers 322 may engage and massage sidewalls of the conical lower portion of the transporter 54. In operation, the massagers 322 may deflect the sidewalls of the transporter 54, for instance, three to four inches, or any other suitable displacement.

Figure 20A:
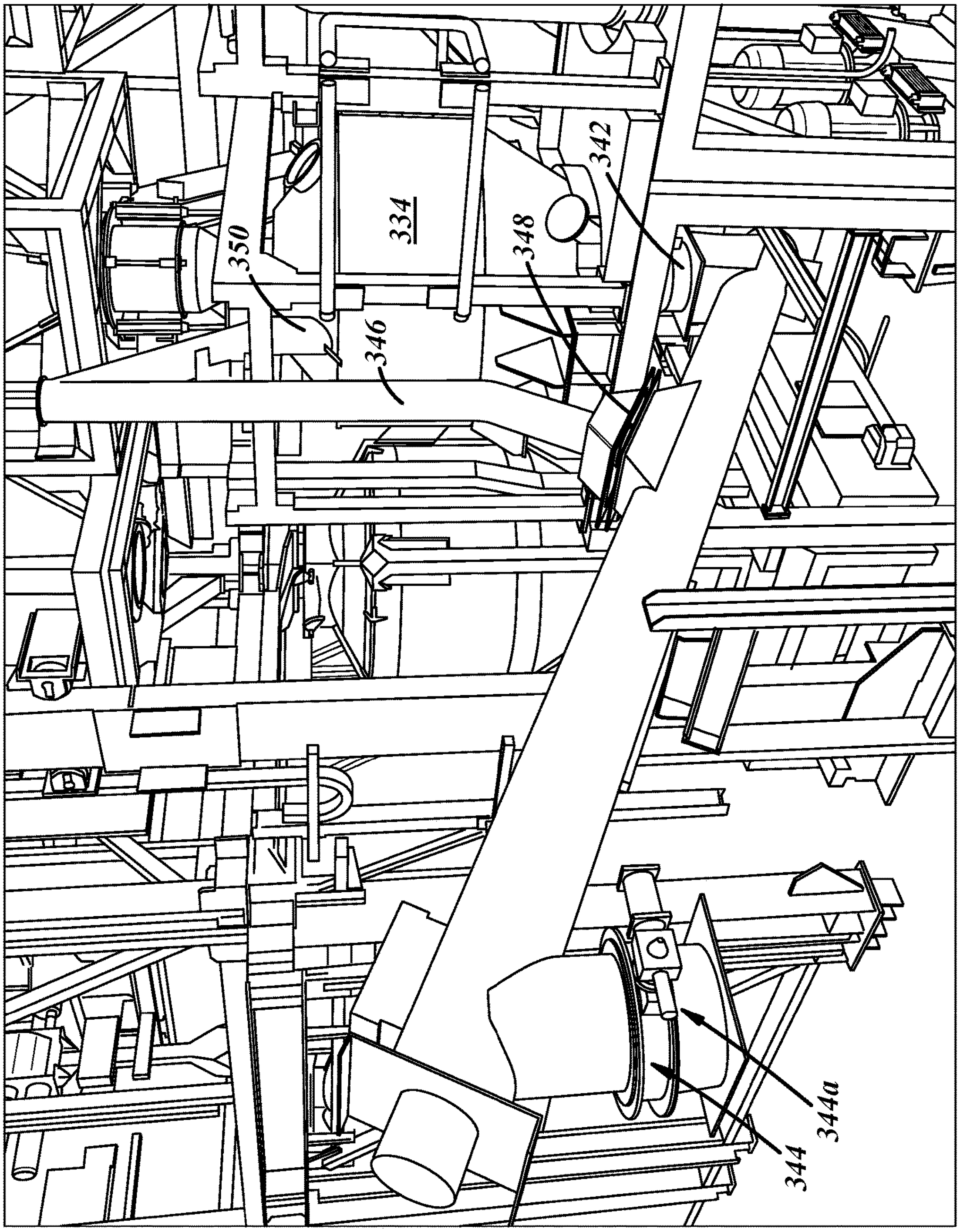
FIG. 20A is an enlarged fragmentary perspective view of a portion of a rejecting station of the bulk material discharging system of FIG. 11A.
Figure 20B:
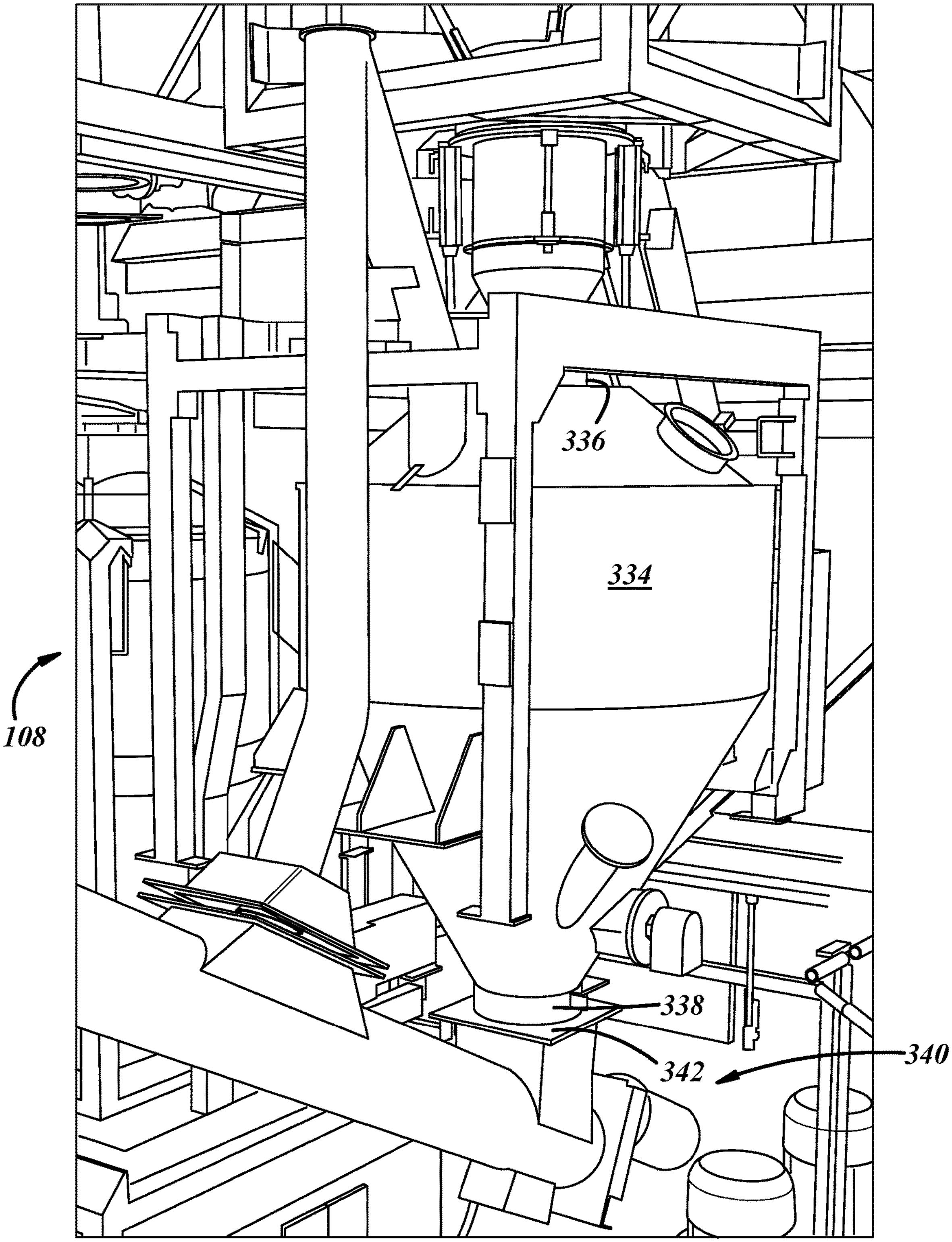
FIG. 20B is a further enlarged fragmentary perspective view of the rejection station shown in FIG. 20A.
Figure 20C:
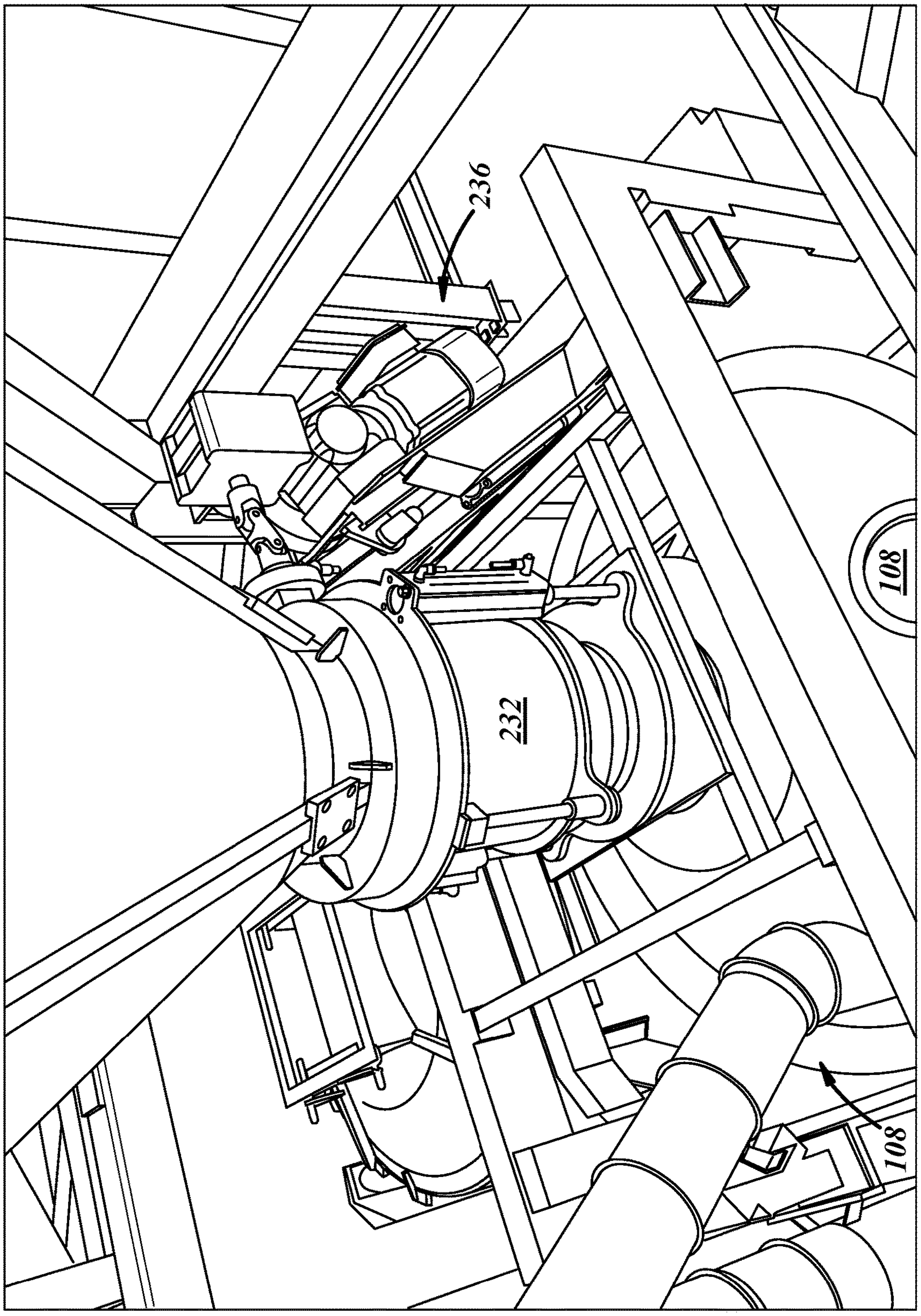
FIG. 20C is an enlarged fragmentary perspective view of the rejection station shown in FIG. 20A, illustrating transporter docking equipment and a transporter closure actuator.
Figure 20D:
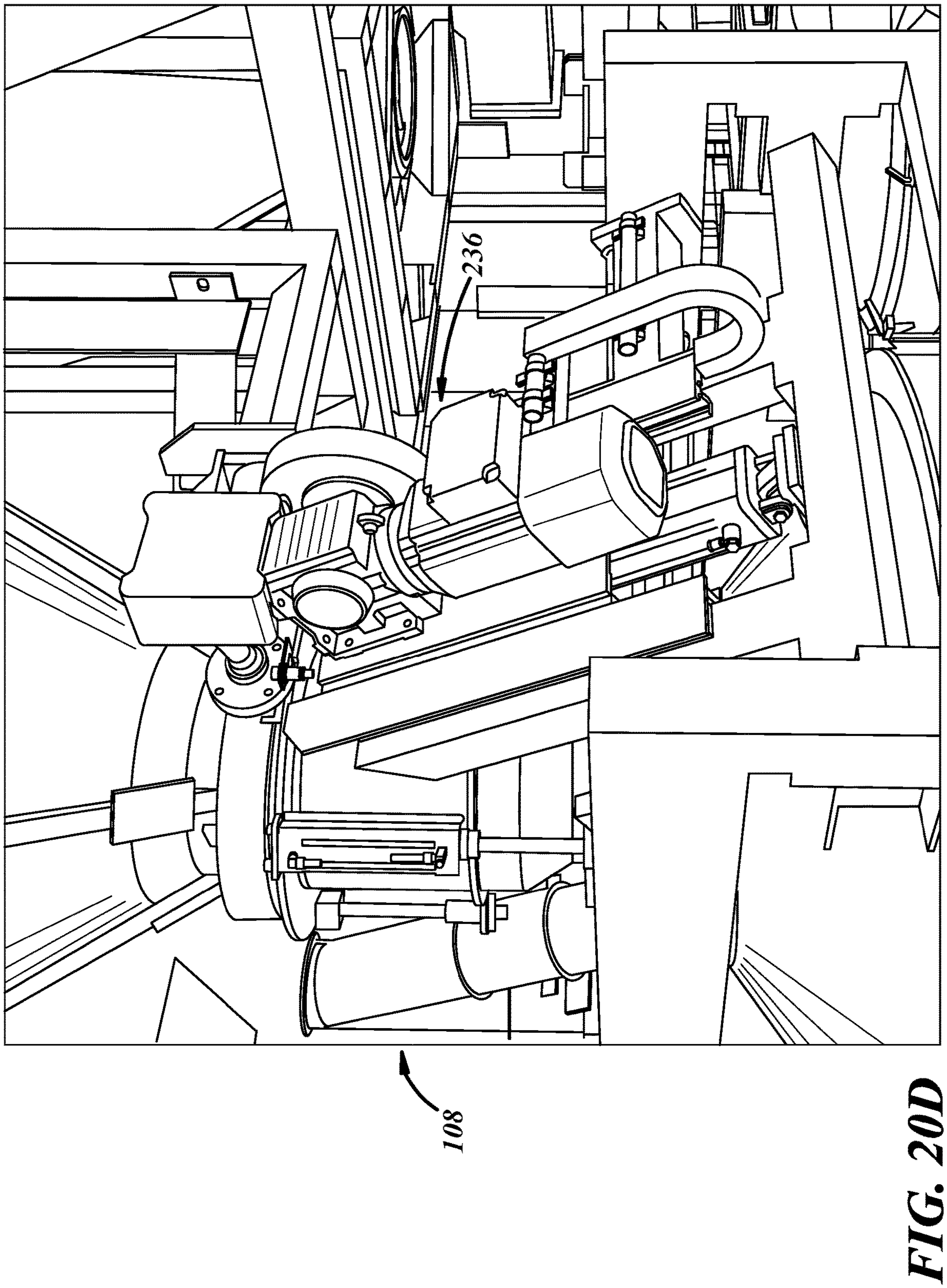
FIG. 20D is an enlarged fragmentary perspective view, taken from another angle, of the transporter docking equipment and transporter closure actuator shown in FIG. 20C.

With reference now to FIGS. 20A and 20B, the rejection station 108 rejects bulk material from the system 10 and includes a rejection hopper 334 having a rejection inlet 336 to receive bulk material therein and a rejection outlet 338 to transmit bulk material therefrom, an auger 340 having an auger inlet 342 in communication with the rejection hopper outlet to receive bulk material therefrom and an auger outlet 344 that may be equipped with an outlet valve **344*a*, and a recirculation conduit 346 having a recirculation inlet 348 in fluid communication with the auger at a location upstream of the auger outlet and also having a recirculation outlet 350 in fluid communication with an upper portion of an interior of the rejection hopper 334. A rejection station outlet 338 may be positioned below the auger outlet 44. With reference now to FIGS. 20C and 20D, the rejection station 108 also may include the inlet dock 232 and the transporter closure driver 236 previously described with respect to the transmission station. Moreover, and with additional reference again to FIG. 4, the rejection station 108 also may include a waste disposal vessel W located outside of the building 16 in which the rejection hopper 334 is located and having an inlet to receive bulk material from the outlet 344 of the auger 340. Incorporation of the rejection hopper 334 promotes good uptime and usage of the discharging subsystem, because it allows the transporter 540 to be quickly emptied to clear the transporter 540 from blocking or slowing down access to the transmission station 104**.

As used in herein, the terminology "for example," "e.g.," for instance," "like," "such as," "comprising," "having," "including," and the like, when used with a listing of one or more elements, is to be construed as open-ended, meaning that the listing does not exclude additional elements. Also, as used herein, the term "may" is an expedient merely to indicate optionality, for instance, of a disclosed embodiment, element, feature, or the like, and should not be construed as rendering indefinite any disclosure herein. Moreover, directional words such as front, rear, top, bottom, upper, lower, radial, circumferential, axial, lateral, longitudinal, vertical, horizontal, transverse, and/or the like are employed by way of example and not necessarily limitation.

Finally, the subject matter of this application is presently disclosed in conjunction with several explicit illustrative embodiments and modifications to those embodiments, using various terms. All terms used herein are intended to be merely descriptive, rather than necessarily limiting, and are to be interpreted and construed in accordance with their ordinary and customary meaning in the art, unless used in a context that requires a different interpretation. And for the sake of expedience, each explicit illustrative embodiment and modification is hereby incorporated by reference into one or more of the other explicit illustrative embodiments and modifications. As such, many other embodiments, modifications, and equivalents thereto, either exist now or are yet to be discovered and, thus, it is neither intended nor possible to presently describe all such subject matter, which will readily be suggested to persons of ordinary skill in the art in view of the present disclosure. Rather, the present disclosure is intended to embrace all such embodiments and modifications of the subject matter of this application, and equivalents thereto, as fall within the broad scope of the accompanying claims.

The invention claimed is:

1. A bulk material discharging system, comprising:
- a transmission station including
  - a pressurizable pneumatic transmitting vessel configured to be pressurized to pneumatically transmit bulk material therefrom, and having
    - a transmitting vessel inlet configured to receive bulk material from an outlet of a bulk material transporter, and
    - a transmitting vessel outlet configured to transmit bulk material therefrom; and
- a transporter handling station located operatively upstream of the transmission station and including
  - at least a portion of a transporter handler including
    - at least one carriage with transporter couplings configured to engage corresponding carriage couplings of the bulk material transporter and configured to convey the bulk material transporter over the pressurizable pneumatic transmitting vessel.

2. The system of claim 1, wherein the transporter handler also includes an elevator at the transporter handling station and including vertical guides, an elevator carriage guided by the vertical guides, and one or more elevator actuators operatively coupled to the elevator carriage to raise and lower the elevator carriage along the vertical guides, and wherein the transporter handler further includes a conveyor extending between the handling and transmission stations and including horizontal guides, a conveyor carriage guided by the horizontal guides, and one or more conveyor actuators operatively coupled to the conveyor carriage to advance and retract the conveyor carriage along the horizontal guides.

3. The system of claim 2, wherein the one or more elevator actuators include at least one set of hydraulic cylinders having cylinder housings coupled to the vertical guides and pistons coupled to the elevator carriage.

4. The system of claim 2, wherein the conveyor carriage includes a frame, at least one drive roller carried by the frame and configured to engage the horizontal guides, and the one or more conveyor actuators includes at least one motor coupled to the at least one drive roller.

5. The system of claim 4, wherein the conveyor carriage also includes at least one transporter stabilizer that is configured to stabilize the bulk material transporter.

6. The system of claim 1, wherein the carriage couplings of the bulk material transporter include a first and second set of hooks, and the transporter couplings of the transporter handler include a first set of actuatable pins carried by the at least one carriage that are actuatable into and out of engagement with the first set of hooks of the bulk material transporter and a second set of actuatable pins carried by the at least one carriage that are actuatable into and out of engagement with the second set of hooks of the bulk material transporter.

7. The system of claim 6, wherein the transporter couplings of the transporter handler include actuatable transporter stabilizers carried by the at least one carriage and configured to be actuatable into and out of engagement with obliquely angled surfaces of the carriage couplings of the bulk material transporter.

8. The system of claim 1, wherein the transporter handling station also includes an AGV charger.

9. The system of claim 1, wherein the transporter handling station also includes a weigh scale charger.

10. The system of claim 1, wherein the transmission station also includes a closure driver configured to drive a driven closure at the outlet of the bulk material transporter from a closed state to an open state to release bulk material from the bulk material transporter into the pressurizable pneumatic transmitting vessel.

11. The system of claim 10, wherein the closure driver includes a drive wheel, a motor coupled to the drive wheel to rotate the drive wheel, a motor carrier carrying the motor and being translatable, and a motor carrier actuator coupled to the motor carrier and configured to translate the motor carrier, the motor, and the drive wheel into and out of engagement with the driven closure of the bulk material transporter.

12. The system of claim 1, wherein the transmitting vessel inlet is pneumatically sealably closeable and the pressurizable pneumatic transmitting vessel has an interior that is volumetrically larger than that of the bulk material transporter so as to define a sealable pressurizable headspace.

13. An architectural installation, comprising:
- a foundation including a slab; and
- the system of claim 1 carried on the foundation slab,
- no pit or basement beneath at least that portion of the slab that carries the system.

14. The system of claim 1, wherein the transmission station further includes
- an inlet dock in communication with the transmitting vessel inlet including
  - a fixed portion fixed to the pressurizable pneumatic transmitting vessel,
  - a movable portion movable away from the pressurizable pneumatic transmitting vessel and configured to dock with the outlet of the bulk material transporter and including a flange configured to engage the bulk material transporter and a conduit extending between the flange and the fixed portion, and
  - at least one actuator to move the movable portion,
- a vessel inlet closure,
- a vessel outlet closure,
- a station outlet conduit in downstream fluid communication with the transmitting vessel outlet to receive bulk material from the transmitting vessel outlet,
- a station outlet pressurization conduit in fluid communication with the station outlet conduit to pressurize the station outlet conduit for pneumatic transmission of the bulk material through the station outlet conduit,
- a station outlet pressurization valve to regulate opening of the station outlet pressurization conduit,
- a vessel vent conduit in fluid communication between an interior of the station outlet conduit and an upper portion of an interior of the pressurizable pneumatic transmitting vessel,
- a vessel vent conduit closure to close and open the vessel vent conduit, and
- a vessel pressurization conduit in fluid communication with the upper portion of the interior of the pressurizable pneumatic transmitting vessel, and
- a vessel pressurization valve to regulate opening of the vessel pressurization conduit.

15. The system of claim 14, wherein the transmission station is configured to be operated to transmit bulk material according to the following sequencing:

pressurizing, wherein the vessel inlet closure is closed, the vessel vent conduit closure is closed, and the vessel pressurization valve is opened, transmitting, wherein the station outlet pressurization valve is opened to transmit bulk material out of the station outlet conduit, venting, wherein the vessel pressurization valve is closed, the vessel outlet closure is closed, the vessel vent conduit closure is opened.

16. The system of claim 1, further comprising:

a modular frame constructed as a rectangular box truss, having a longitudinal axis, a lateral axis, and a vertical axis, and including lower beams extending longitudinally and being laterally opposed from one another, upper beams extending longitudinally and being laterally opposed from one another, posts extending vertically between the lower and upper beams, upper cross-members extending laterally between the upper beams, and lower cross-members extending laterally between the lower beams;

wherein the transporter handler includes an elevator having vertical guides coupled to interior portions of one or more of the lower and upper beams, and wherein the transporter handler includes a conveyor having horizontal guides coupled to interior portions of the upper beams.

17. The system of claim 16, wherein the modular frame also includes one or more struts extending obliquely between the lower and upper beams.

18. The system of claim 1, further comprising:

a rejection station including a rejection hopper having a rejection inlet to receive bulk material therein and a rejection outlet to transmit bulk material therefrom, an auger having an auger inlet in communication with the rejection outlet of the rejection hopper to receive bulk material therefrom and an auger outlet, and a recirculation conduit having a recirculation inlet in fluid communication with the auger at a location upstream of the auger outlet and also having a recirculation outlet in fluid communication with an upper portion of an interior of the rejection hopper.

19. The system of claim 18, wherein the rejection station also includes a disposal vessel located outside of a building in which the rejection hopper is located and having an inlet to receive bulk material from the outlet of the auger.

20. The system of claim 18, wherein the rejection station is located between the transmission station and the transporter handling station.

21. The system of claim 1, wherein the transmission station also includes a pneumatic transmission conduit to receive bulk material from the pressurizable pneumatic transmitting vessel and facilitate pneumatic transmission of the bulk material.

22. The system of claim 1, wherein the transmission station further includes an inlet dock in communication with the transmitting vessel inlet including a fixed portion fixed to the pressurizable pneumatic transmitting vessel, a movable portion movable away from the pressurizable pneumatic transmitting vessel and configured to dock with the outlet of the bulk material transporter and including a flange configured to engage the bulk material transporter and a conduit extending between the flange and the fixed portion, and at least one actuator to move the movable portion.

23. The system of claim 1, wherein the transmission station further includes a station outlet conduit in downstream fluid communication with the transmitting vessel outlet to receive bulk material from the transmitting vessel outlet, a station outlet pressurization conduit in fluid communication with the station outlet conduit to pressurize the station outlet conduit for pneumatic transmission of the bulk material through the station outlet conduit, and a station outlet pressurization valve to regulate opening of the station outlet pressurization conduit.

24. The system of claim 1, wherein the transmission station further includes a vessel vent conduit in fluid communication with an upper portion of an interior of the pressurizable pneumatic transmitting vessel, and a vessel vent conduit closure to close and open the vessel vent conduit.

25. The system of claim 1, wherein the transmission station further includes a vessel pressurization conduit in fluid communication with an upper portion of an interior of the pressurizable pneumatic transmitting vessel, and a vessel pressurization valve to regulate opening of the vessel pressurization conduit.

26. The system of claim 1, further comprising:

a rejection station including a rejection hopper having a rejection inlet to receive bulk material therein and a rejection outlet to transmit bulk material therefrom.

27. The system of claim 1, further comprising:

a rejection station including an auger having an auger inlet and an auger outlet, and a recirculation conduit having a recirculation inlet in fluid communication with the auger at a location upstream of the auger outlet and also having a recirculation outlet.

28. A bulk material discharging system, comprising:

a transmission station including a pressurizable pneumatic transmitting vessel having a transmitting vessel inlet configured to receive bulk material from an outlet of a bulk material transporter, a transmitting vessel outlet to transmit bulk material therefrom, a vessel inlet closure, a vessel pressurization conduit in fluid communication with an upper portion of an interior of the pressurizable pneumatic transmitting vessel, and a vessel pressurization valve to regulate opening of the vessel pressurization conduit; and a station outlet conduit in downstream fluid communication with the transmitting vessel outlet to receive bulk material from the transmitting vessel outlet; and a transporter handling station located operatively upstream of the transmission station.

29. A bulk material discharging system, comprising:

a transmission station including a transmitting vessel having a transmitting vessel inlet configured to receive bulk material from an outlet of a bulk material transporter, and a transmitting vessel outlet to transmit bulk material therefrom, a station outlet conduit in downstream fluid communication with the transmitting vessel outlet to receive bulk material from the transmitting vessel outlet, and a station outlet pressurization conduit in fluid communication with the station outlet conduit to pressurize the station outlet conduit for pneumatic transmission of the bulk material through the station outlet conduit; and a transporter handling station located operatively upstream of the transmission station.

30. The system of claim 29, wherein the transmission station further includes a station outlet pressurization valve to regulate opening of the station outlet pressurization conduit.

31. The system of claim 28, wherein the transmission station further includes a station outlet pressurization conduit in fluid communication with the station outlet conduit to pressurize the station outlet conduit for pneumatic transmission of the bulk material through the station outlet conduit, and a station outlet pressurization valve to regulate opening of the station outlet pressurization conduit, wherein the transmission station is configured to be operated to transmit bulk material according to the following sequencing:

pressurizing, wherein the vessel inlet closure is closed and the vessel pressurization valve is opened, and transmitting, wherein the station outlet pressurization valve is opened to transmit bulk material out of the station outlet conduit.

32. The system of claim 31, wherein the transmission station further includes a vessel outlet closure, a vessel vent conduit in fluid communication between an interior of the station outlet conduit and an upper portion of an interior of the pressurizable pneumatic transmitting vessel, and a vessel vent conduit closure to close and open the vessel vent conduit, wherein the transmission station is further configured to be operated to transmit bulk material according to the following additional step:

venting, wherein the vessel pressurization valve is closed, the vessel outlet closure is closed, the vessel vent conduit closure is opened.

33. The system of claim 1, wherein the transporter handler further includes a conveyor including horizontal guides, the at least one carriage being guided by the horizontal guides and including a frame having cradle arms carrying the transporter couplings.

34. The system of claim 1, wherein the transmission station also includes a transporter massaging apparatus configured to massage a transporter to coax bulk material out of the transporter.

35. The system of claim 34, wherein the transporter massaging apparatus includes massagers having massaging ends, and actuators configured to move the massagers into and out of engagement with sidewalls of the transporter to deflect the sidewalls during releasing of bulk material therefrom into the transmitting vessel.

* * * * *